US009560058B2

(12) United States Patent
Kako

(10) Patent No.: US 9,560,058 B2
(45) Date of Patent: Jan. 31, 2017

(54) MONITORING DEVICE AND MONITORING METHOD

(71) Applicant: FUJITSU LIMITED, Kawasaki-shi, Kanagawa (JP)

(72) Inventor: Masaharu Kako, Toukai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/722,639

(22) Filed: May 27, 2015

(65) Prior Publication Data
US 2016/0006692 A1    Jan. 7, 2016

(30) Foreign Application Priority Data

Jul. 3, 2014 (JP) .................................. 2014-137663

(51) Int. Cl.
*H04L 29/06* (2006.01)
*H04L 12/18* (2006.01)

(52) U.S. Cl.
CPC ......... *H04L 63/1408* (2013.01); *H04L 12/185* (2013.01)

(58) Field of Classification Search
CPC ................................................ H04L 63/0227
USPC .......................................................... 726/13
See application file for complete search history.

(56) References Cited

U.S. PATENT DOCUMENTS 6,895,432 B2 * 5/2005 Ando ................... H04L 63/0236 709/220
2002/0078202 A1    6/2002 Ando et al.
2002/0147915 A1   10/2002 Chefalas et al.

FOREIGN PATENT DOCUMENTS

JP    2002-185539    6/2002
JP    2004-531812   10/2004

* cited by examiner

*Primary Examiner* — Longbit Chai
(74) *Attorney, Agent, or Firm* — Staas & Halsey LLP

(57) ABSTRACT

A monitoring device to operate as a first monitoring device in a network including communication devices and monitoring devices, the monitoring device includes: an acquisition unit to acquire information of packets transmitted or received by a first communication device monitored by the first monitoring device; a transmission unit to transmit a first join request message to a first multicast group in which a second monitoring device performs notification of communication information of a second communication device monitored by the second monitoring device, when the first communication device communicates with the second communication device, after the first communication device communicates with an external device not included in the network; and a determination unit to determine whether the external device is performing unauthorized access to the second communication device via the first communication device, based on packets transmitted from the second monitoring device to the first multicast group.

8 Claims, 41 Drawing Sheets

FIG. 6

| COMMUNICATION DEVICE | CONFIDENTIAL AREA DISPLAY | M-SOURCE ADDRESS | MONITORING DEVICE |
|---|---|---|---|
| COMMUNICATION DEVICE 10a | NO | IP_M#Agent | MONITORING DEVICE 30a |
| COMMUNICATION DEVICE 10e | NO | IP_M#Agent#1 | MONITORING DEVICE 30a |
| COMMUNICATION DEVICE 10b | NO | IP_M#Agent#2 | MONITORING DEVICE 30b |
| COMMUNICATION DEVICE 10f | NO | IP_M#Agent#3 | MONITORING DEVICE 30b |
| COMMUNICATION DEVICE 10c | NO | IP_M#Agent#31 | MONITORING DEVICE 30c |
| COMMUNICATION DEVICE 10g | NO | IP_M#Agent#32 | MONITORING DEVICE 30c |
| COMMUNICATION DEVICE 10h | NO | IP_M#Target | MONITORING DEVICE 30c |
| COMMUNICATION DEVICE 10d | YES | IP_M#Target#1 | MONITORING DEVICE 30d |
| COMMUNICATION DEVICE 10i | YES | IP_M#Target#2 | MONITORING DEVICE 30d |
| COMMUNICATION DEVICE 10k | YES | IP_M#Target#21 | MONITORING DEVICE 30e |
| COMMUNICATION DEVICE 10m | YES | IP_M#Target#22 | MONITORING DEVICE 30e |

FIG. 7

| COMMUNICATING DEVICES AMONG MONITORING TARGETS | PORT USED (MONITORING TARGET) | COMMUNICATION DESTINATION | PORT USED (COMMUNICATION DESTINATION) |
|---|---|---|---|
| COMMUNICATION DEVICE 10a | 80 | COMMUNICATION DEVICE 10b | 20021 |
| COMMUNICATION DEVICE 10a | 10000 | COMMUNICATION DEVICE 10c | 5080 |
| COMMUNICATION DEVICE 10a | 80 | COMMUNICATION DEVICE 10d | 10000 |
|  |  |  |  |
|  |  |  |  |

FIG. 8

| | |
|---|---|
| UDP | IDENTIFICATION INFORMATION OF DEVICE WHICH IS MONITORING TARGET |
| | IDENTIFICATION INFORMATION OF COMMUNICATION DESTINATION WHICH IS MONITORING TARGET |
| | COMMUNICATION STATE / COMMUNICATING/ALL COMMUNICATION ENDED |
| | timestamp / 3/20/2014 09:00:00.000 |
| IP | SA: IP_M#Agent#2, DA: Multicast Addr#m |
| L2 | L2 HEADER |

FIG. 14

| ICMPv6 | Type = Version 2 Multicast Listener Report | | |
|---|---|---|---|
| | Multicast Address Record | Record Type = Allow_New_Sources | |
| | | Multicast Address = Multicast Addr#m | |
| | | Source Address = IP_M#Agent#2 | |
| IP | SA: MONITORING DEVICE 30a, DA: FF02:0:0:0:0:0:0:16 | | |
| L2 | L2 HEADER | | |

FIG. 17

| EXTERNAL COMMUNICATION DESTINATION | MONITORING TARGET | MONITORING TARGET | COMMUNICATION DESTINATION IN NETWORK | SEARCH CONDITION TARGET DISPLAY | COMMUNICATION STATE NOTIFICATION-JOIN DESTINATION |
|---|---|---|---|---|---|
| COMMUNICATION DEVICE 5c | COMMUNICATION DEVICE 10c | COMMUNICATION DEVICE 10c | COMMUNICATION DEVICE 10b | NO | |
| | | | | | |
| | | | | | |
| | | | | | |

FIG. 24

| EXTERNAL COMMUNICATION DESTINATION | MONITORING TARGET | MONITORING TARGET | COMMUNICATION DESTINATION IN NETWORK | SEARCH CONDITION TARGET DISPLAY | COMMUNICATION STATE NOTIFICATION-JOIN DESTINATION |
|---|---|---|---|---|---|
|  |  | COMMUNICATION DEVICE 10a | COMMUNICATION DEVICE 10d | NO |  |
|  |  | COMMUNICATION DEVICE 10a | COMMUNICATION DEVICE 10b | NO |  |
|  |  |  |  |  |  |
|  |  |  |  |  |  |
|  |  |  |  |  |  |

| ICMPv6 | Type = Version 2 Multicast Listener Report | | |
|---|---|---|---|
| | Multicast Address Record | Record Type = Block_Old_Sources | |
| | | Multicast Address = Multicast Addr#m | |
| | | Source Address = IP_M#Agent#2 | |
| | | Source Address = IP_M#Target | |
| | | Source Address = IP_M#Target2 | |
| IP | SA: NETWORK SENSOR METHOD, DA: FF02:0:0:0:0:0:0:16 | | |
| L2 | L2 HEADER | | |

FIG. 27

| EXTERNAL COMMUNICATION DESTINATION | MONITORING TARGET | MONITORING TARGET | COMMUNICATION DESTINATION IN NETWORK | SEARCH CONDITION TARGET DISPLAY | COMMUNICATION STATE NOTIFICATION-JOIN DESTINATION |
|---|---|---|---|---|---|
| COMMUNICATION DEVICE 5a | COMMUNICATION DEVICE 10a | COMMUNICATION DEVICE 10a | COMMUNICATION DEVICE 10d | NO | |
| COMMUNICATION DEVICE 5b | COMMUNICATION DEVICE 10a | | | | |
| COMMUNICATION DEVICE 5c | COMMUNICATION DEVICE 10a | | | | |
| | | | | | |
| | | | | | |
| 52a-4 | | 53a-7 | | | 54a-6 |

30a

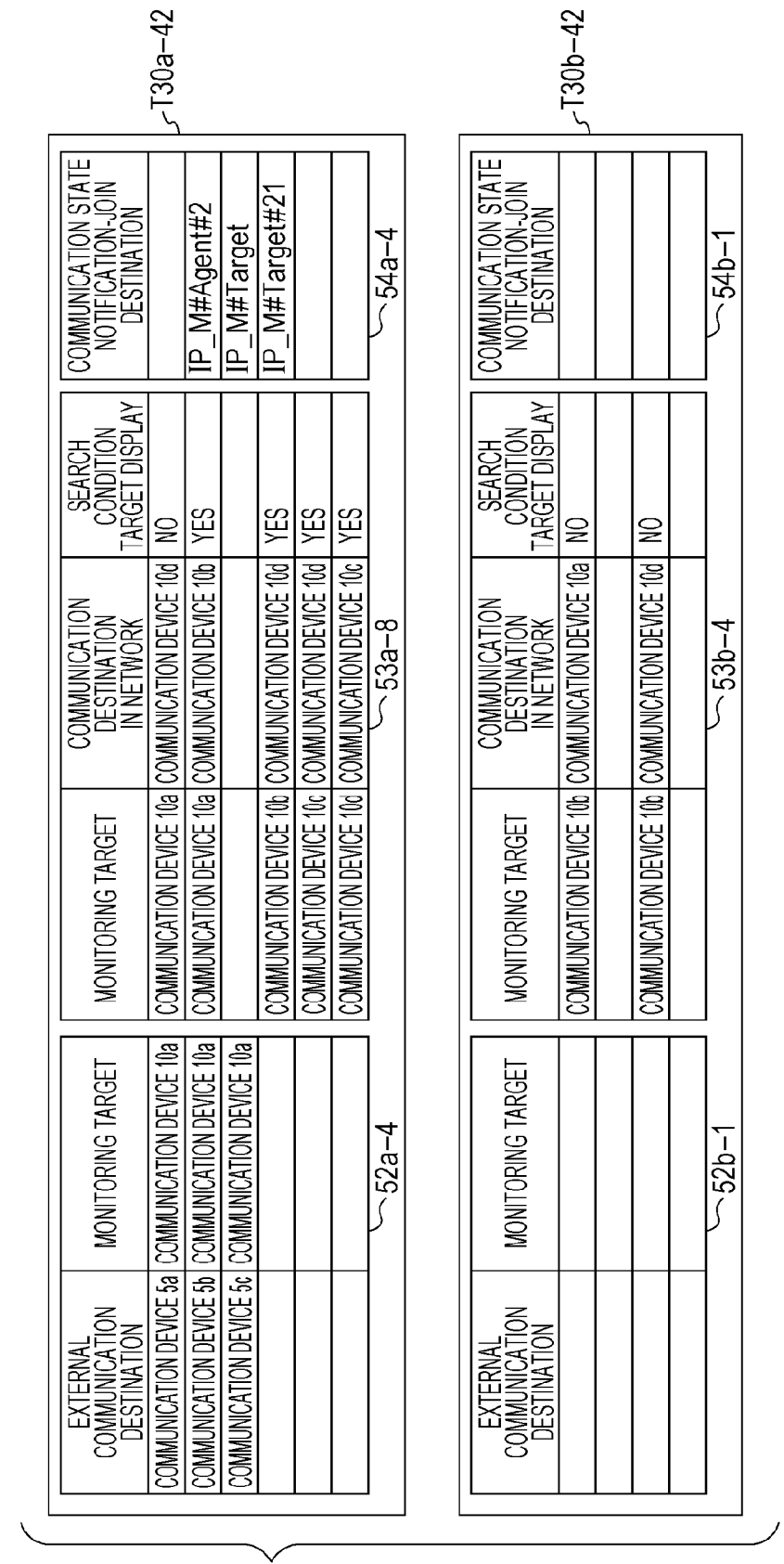

FIG. 30B

| EXTERNAL COMMUNICATION DESTINATION | MONITORING TARGET | MONITORING TARGET | COMMUNICATION DESTINATION IN NETWORK | SEARCH CONDITION TARGET DISPLAY | COMMUNICATION STATE NOTIFICATION-JOIN DESTINATION |
|---|---|---|---|---|---|
| | | COMMUNICATION DEVICE 10d | COMMUNICATION DEVICE 10a | NO | |
| | | COMMUNICATION DEVICE 10d | COMMUNICATION DEVICE 10c | NO | |

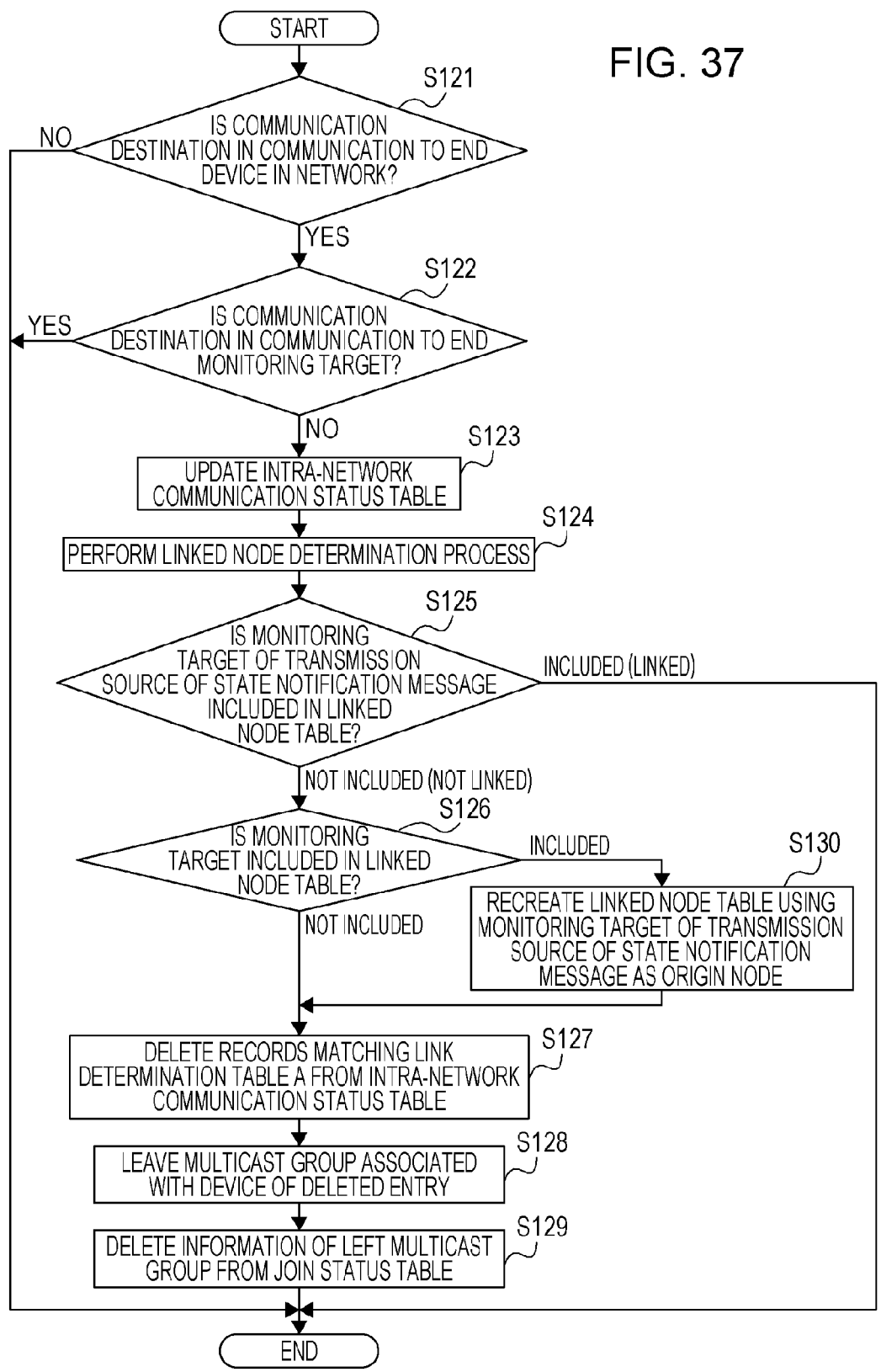

MONITORING DEVICE AND MONITORING METHOD

CROSS-REFERENCE TO RELATED APPLICATION

This application is based upon and claims the benefit of priority of the prior Japanese Patent Application No. 2014-137663, filed on Jul. 3, 2014, the entire contents of which are incorporated herein by reference.

FIELD

The embodiments discussed herein are related to a monitoring device and a monitoring method for monitoring communication which is performed between a plurality of networks.

BACKGROUND

In a local area network (LAN) such as a corporate network, there is a case in which a monitoring device analyses packets which are transmitted and received by each communication device in the network in order to detect unauthorized access by a device which is not included in the LAN. In this case, when the scale of the network that serves as the target for detection of unauthorized access is large, the load on the monitoring device increases, and thus there is a case in which the packets which are transmitted and received by the communication devices in the network are analyzed by a plurality of monitoring devices. When a plurality of the monitoring devices are used, it is possible to detect the unauthorized access to the network using the analysis results which are obtained by all of the monitoring devices by exchanging the analysis results between the monitoring devices.

FIG. 1 illustrates an example of a network. A corporate network 1 is connected to the Internet 3 via an access network 2. The corporate network 1 includes a firewall device 20, communication devices 10 (10$m$, 10$n$, and 10$x$ to 10$z$), switches 15 (15$x$ to 15$z$), and monitoring devices 25 (25$x$ to 25$z$). The communication devices 10 in the corporate network 1 communicate with each other via a communication service network 12, and the monitoring devices 25$x$ to 25$z$ communicate via a monitoring network 17. In the example of FIG. 1, the monitoring device 25$x$ analyses the packets which are transmitted and received by the communication devices 10$x$ to 10$z$. The monitoring device 25$y$ analyses the packets which are transmitted and received by the communication devices 10$m$ and 10$n$, and the monitoring device 25$z$ analyses the packets which are transmitted and received by the firewall device 20. In the following example, confidential data is stored in the communication devices 10$x$ to 10$z$. For example, among communication devices 5$a$ to 5$c$ which are connected to the Internet 3, the communication device 5$c$ establishes communication between the communication device 5$c$ and the communication device 10$m$ with the intent to gain unauthorized access to the communication device 10$z$ in the corporate network 1. Subsequently, the communication device 10$m$ establishes communication with the communication device 10$z$. As a result, the monitoring device 25$y$ recognizes that the communication device 10$m$ is communicating with the communication device 5$c$ which is not included in the corporate network 1, and that the communication device 10$m$ is communicating with the communication device 10$z$. The communication device 10$z$ establishes communication with the communication device 5$c$ using a path which does not pass through the communication device 10$m$. At this time, the monitoring device 25$x$ recognizes that the communication destinations of the communication device 10$z$ are the communication device 10$m$ and the communication device 5$c$. The monitoring device 25$z$ also recognizes that communication is established between the communication device 10$z$ and the communication device 5$c$. In this case, by consolidating the analysis results of the monitoring devices 25$x$ to 25$z$, as illustrated in FIG. 1, it is identified that the communication device 5$c$ is accessing the communication device 10$z$ via the communication device 10$m$, and is receiving packets from the communication device 10$z$.

A network system including servers, clients, and a decoy server is proposed as related technology. In this system, since the address of the decoy server is not published to the clients, clients which attempt to access the decoy server can be said to be infected by a virus. Therefore, when the decoy server detects a client which attempts to access the decoy server, the decoy server transmits a warning to the devices in the network by broadcast indicating that a virus attack is underway (for example, Japanese National Publication of International Patent Application No. 2004-531812). A network system is also proposed in which a boundary relay device which is positioned on the boundary of a network which is provided with a plurality of autonomous systems discards unauthorized packets caused by re-intrusion, and transmits filtering information for discarding the unauthorized packets to all of the boundary relay devices (for example, Japanese Laid-open Patent Publication No. 2002-185539).

SUMMARY

According to an aspect of the invention, a monitoring device to operate as a first monitoring device in a network including a plurality of communication devices and a plurality of monitoring devices, the monitoring device includes: an acquisition unit to acquire information of packets transmitted or received by a first communication device monitored by the first monitoring device; a transmission unit to transmit a first join request message to a first multicast group in which a second monitoring device performs notification of communication information of a second communication device monitored by the second monitoring device, when the first communication device communicates with the second communication device, after the first communication device communicates with an external device not included in the network; and a determination unit to determine whether the external device is performing unauthorized access to the second communication device via the first communication device, based on packets transmitted from the second monitoring device to the first multicast group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a monitoring device table;

FIG. 7 is a diagram illustrating an example of a communication state table;

FIG. 8 is a diagram illustrating an example of a state notification message;

FIG. 14 is a diagram illustrating an example of a join request message;

FIG. 17 is a diagram illustrating an example of information held by the monitoring device;

FIG. 24 is a diagram illustrating an example of information held by the monitoring device;

FIG. 25 is a diagram illustrating an example of a leave request message;

FIG. 27 is a diagram illustrating an example of information held by the monitoring device;

FIG. 29A is a diagram illustrating an example of information held by the monitoring device;

FIG. 30B is a diagram illustrating an example of information held by the monitoring device;

FIG. 37 is a flowchart illustrating an example of the processes of the monitoring device which receives a state notification message which notifies the end of the communication.

DESCRIPTION OF EMBODIMENTS

Since the number of packets which are transmitted and received increases when the scale of the network increases, the number of monitoring devices which analyze the packets also increases. Therefore, the notification of the analysis results between the monitoring devices and the analysis process of the obtained analysis results become complicated. Description will be given of the technology which easily detects the unauthorized access to the network, with reference to the drawings.

Figure 1:
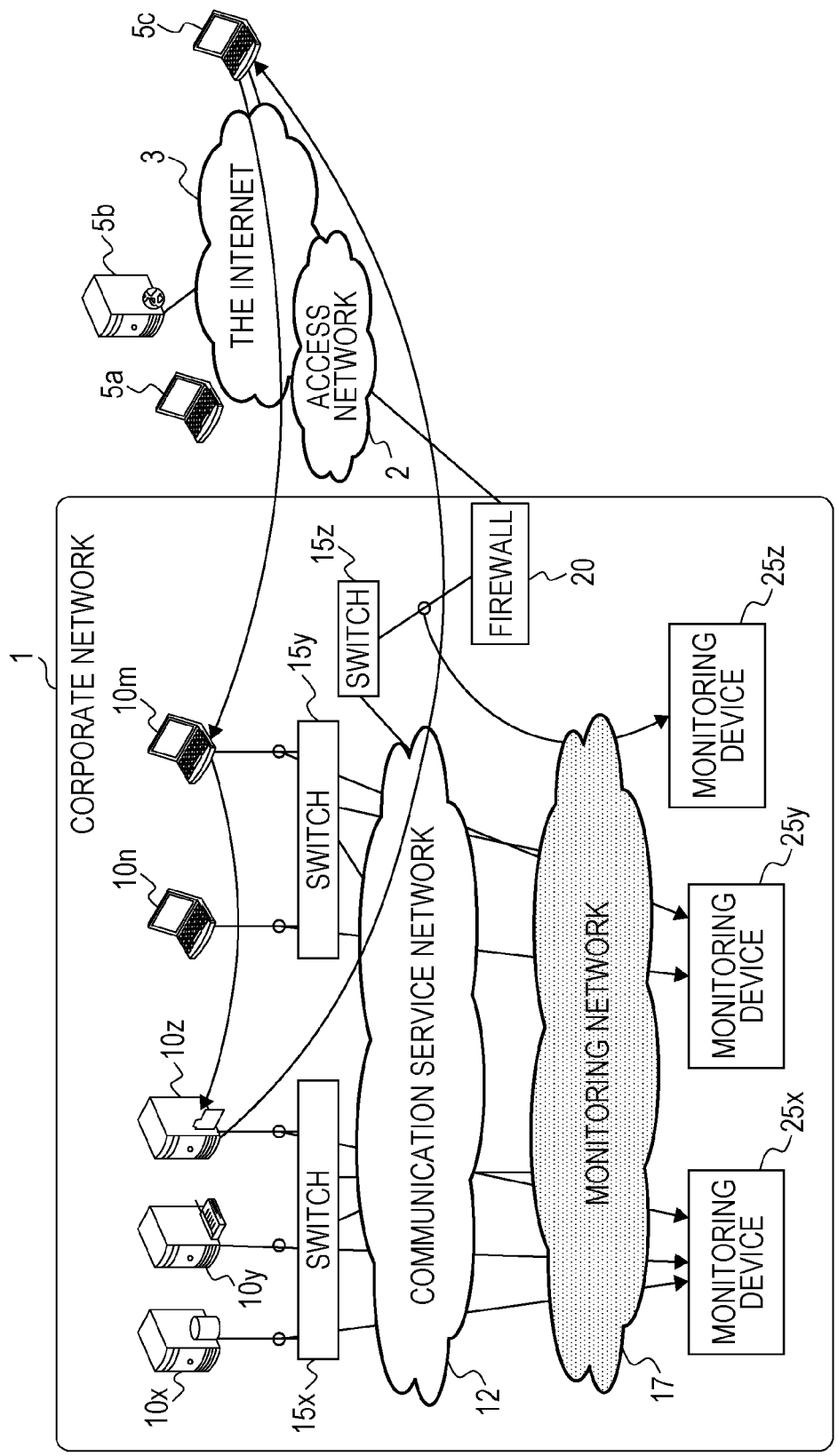
FIG. 1 is a diagram illustrating an example of a network.
Figure 2:
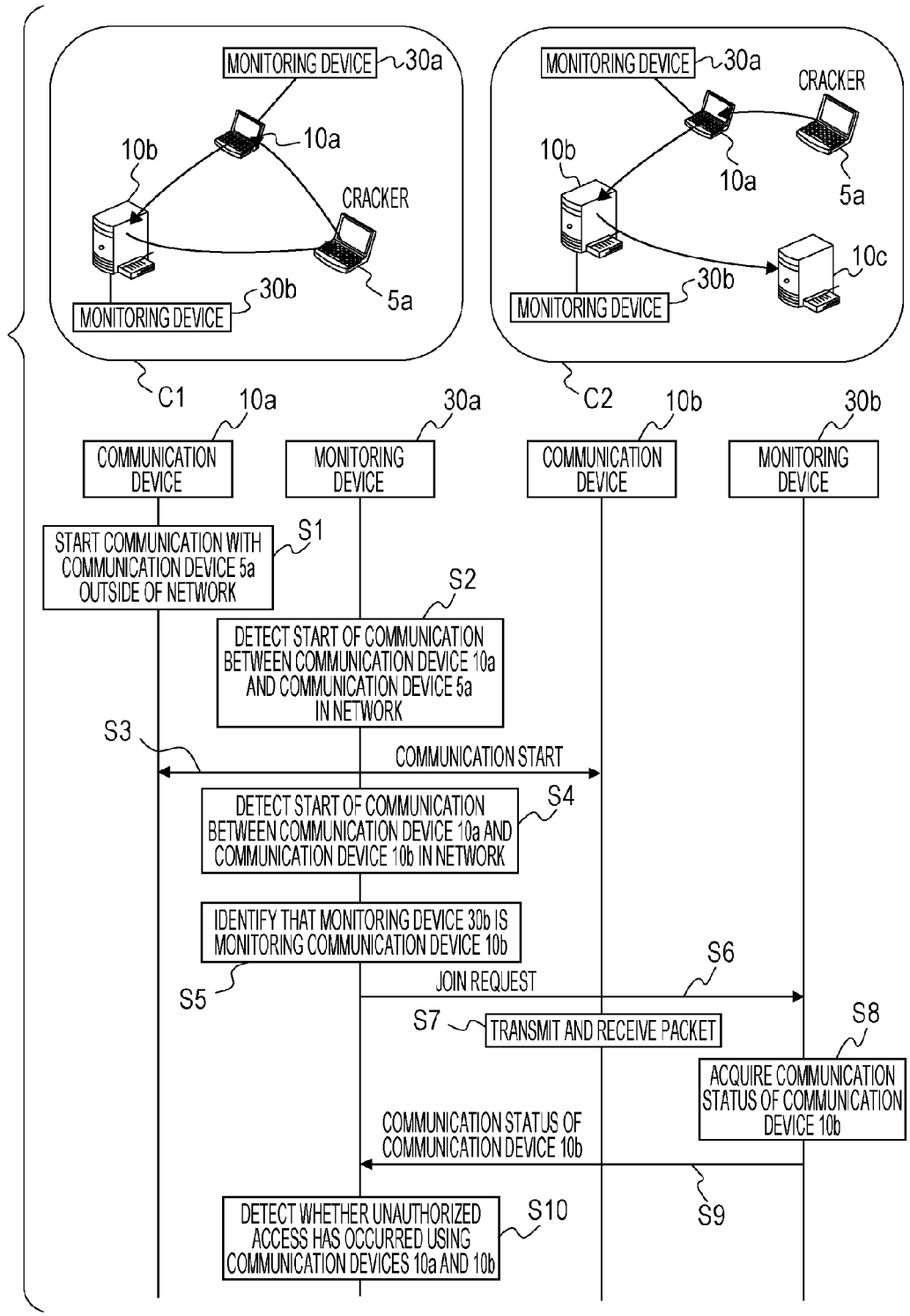
FIG. 2 is a diagram illustrating an example of a monitoring method according to an embodiment.

FIG. 2 is a diagram illustrating an example of a monitoring method according to the embodiment. Case C1 and case C2 in FIG. 2 are examples of communication paths which are used when the communication device 5a which is not included in the LAN performs unauthorized access. In the case C1, the communication device 10b holds confidential information, and in the case C2, the communication device 10c holds the confidential information. Note that, the communication devices 10a to 10c are included in the LAN.

In the case C1, the communication device 5a secures a communication path from the communication device 5a to the communication device 10a, and transmits a request to the communication device 10a to access the communication device 10c. The communication device 5a causes the communication device 10c to transmit the information which is held by the communication device 10c to the communication device 5a by a path which does not pass through the communication device 10a. Therefore, in the case C1, the communication device 5a acquires the confidential information which is held by the communication device 10b without the confidential information passing through the communication device 10a.

In the case C2, the communication device 5a secures a bidirectional communication path between the communication device 5a and the communication device 10a, and secures a bidirectional communication path between the communication device 10a and the communication device 10b. The communication device 5a transmits a request to the communication device 10b, via the communication device 10a, to establish a bidirectional communication path between the communication device 10b and the communication device 10c. When the communication device 10c receives a request for the confidential information from the communication device 10b, since the communication device 10b is a device which is included in the LAN, the communication device 10c transfers the confidential information to the communication device 10b. The communication device 10b transfers the information which is acquired from the communication device 10c to the communication device 10a. Even if the information which is acquired from the communication device 10b contains the confidential information which is stored in the communication device 10c, since the communication device 10a may not be capable of determining whether the information which is received contains the confidential information, the communication device 10a transmits the data which is received from the communication device 10b to the communication device 5a. As a result, the communication device 5a can acquire the confidential information which is stored in the communication device 10c via the communication device 10a and the communication device 10b.

Hereinafter, description will be given of an example of the monitoring method for a monitoring device 30a to easily and efficiently detect unauthorized access in either of the case C1 or the case C2, with reference to the sequence in FIG. 2. Hereinafter, the monitoring device 30a monitors the communication of the communication device 10a, and a monitoring device 30b monitors the communication of the communication device 10b. Each monitoring device 30 transmits information indicating the communication status in the respective communication device 10 which is the monitoring target by multicast. Here, description will be given exemplifying a case in which the communication device 10a starts communication with the communication device 10b, with reference to the sequence in FIG. 2; however, a similar process is performed when the communication device 10a starts communication with a device other than the monitoring target of the monitoring device 30a among the devices in the network.

In operation S1, the communication device 10a starts communication with the communication device 5a which is outside of the network (the LAN). The monitoring device 30a detects that the communication device 10a starts communication with the communication device 5a which is outside of the network (operation S2).

In operation S3, the communication device 10a starts communication with the communication device 10b which is inside the network. The monitoring device 30a detects the start of communication between communication device 10a and the communication device 10b (operation S4). At this time, since the communication device 10a is communicating with a device which is outside of the network, the monitoring device 30a determines that there is a likelihood that unauthorized access will be performed via the communication device 10a. The monitoring device 30a identifies that the monitoring device which is monitoring the communication device 10b which is the communication destination of the communication device 10a is the monitoring device 30b (operation S5). Therefore, the monitoring device 30a requests to join the multicast group which is carrying out notification of information related to the communication status of the monitoring destination of the monitoring device 30b (operation S6).

In operation S7, the communication device 10b transmits or receives a packet. The monitoring device 30b monitors the communication status of the communication device 10b, and acquires the communication status of the communication device 10b (operation S8). When the communication device 10b transmits or receives a packet, the monitoring device 30b transmits the communication status of the communication device 10b to the devices which are participating in the multicast group by multicast (operation S9).

In operation S10, the monitoring device 30a determines whether there is a likelihood of an occurrence of unauthorized access using the communication device 10a and the communication device 10b based on the information which is received from the monitoring device 30b.

Therefore, when the communication device 10b holds the confidential information, and when the communication device 10b starts communication with the communication device 5a, the monitoring device 30a can determine that unauthorized access has occurred by a route such as the one illustrated in the case C1, and can notify the management device (not illustrated). Meanwhile, when the communication device 10b does not hold the confidential information, and when the communication device 10b starts communication with the communication device 10c which holds the confidential information, the monitoring device 30a can determine that unauthorized access has occurred by a route such as the one illustrated in the case C2. When the monitoring device 30a notifies the management device of the occurrence of the unauthorized access, an operator performing the processes using the management device performs a process for not allowing the unauthorized access. Note that, the monitoring target is capable of performing the processes described as the processes of the monitoring device 30a or the processes described as the processes of the monitoring device 30b, according to the communication status of the monitoring target.

In this manner, each monitoring device 30 can acquire the information for determining whether unauthorized access is performed via the communication devices 10 that are the monitoring targets of the monitoring device 30 from the monitoring devices 30 which are monitoring the communication destinations of the communication devices 10 being monitored. Since each monitoring device 30 transmits the communication status of the communication devices 10 that are the monitoring targets by multicast, one monitoring device 30 may not relay the information which is obtained by another monitoring device 30. Therefore, each monitoring device 30 is capable of easily performing notification of the communication status while suppressing an increase in the amount of data which is transmitted by the other monitoring devices 30. The monitoring devices 30 which do not use the communication status of a multicast group are not included in the multicast group, which serves as the transmission destination of information representing the communication status which is transmitted by a certain monitoring device 30. Therefore, it is possible to efficiently transmit and receive the information representing the communication status which is used by the monitoring devices 30 as the processing target, and to perform detection of unauthorized access.

Device Configuration

Figure 3:
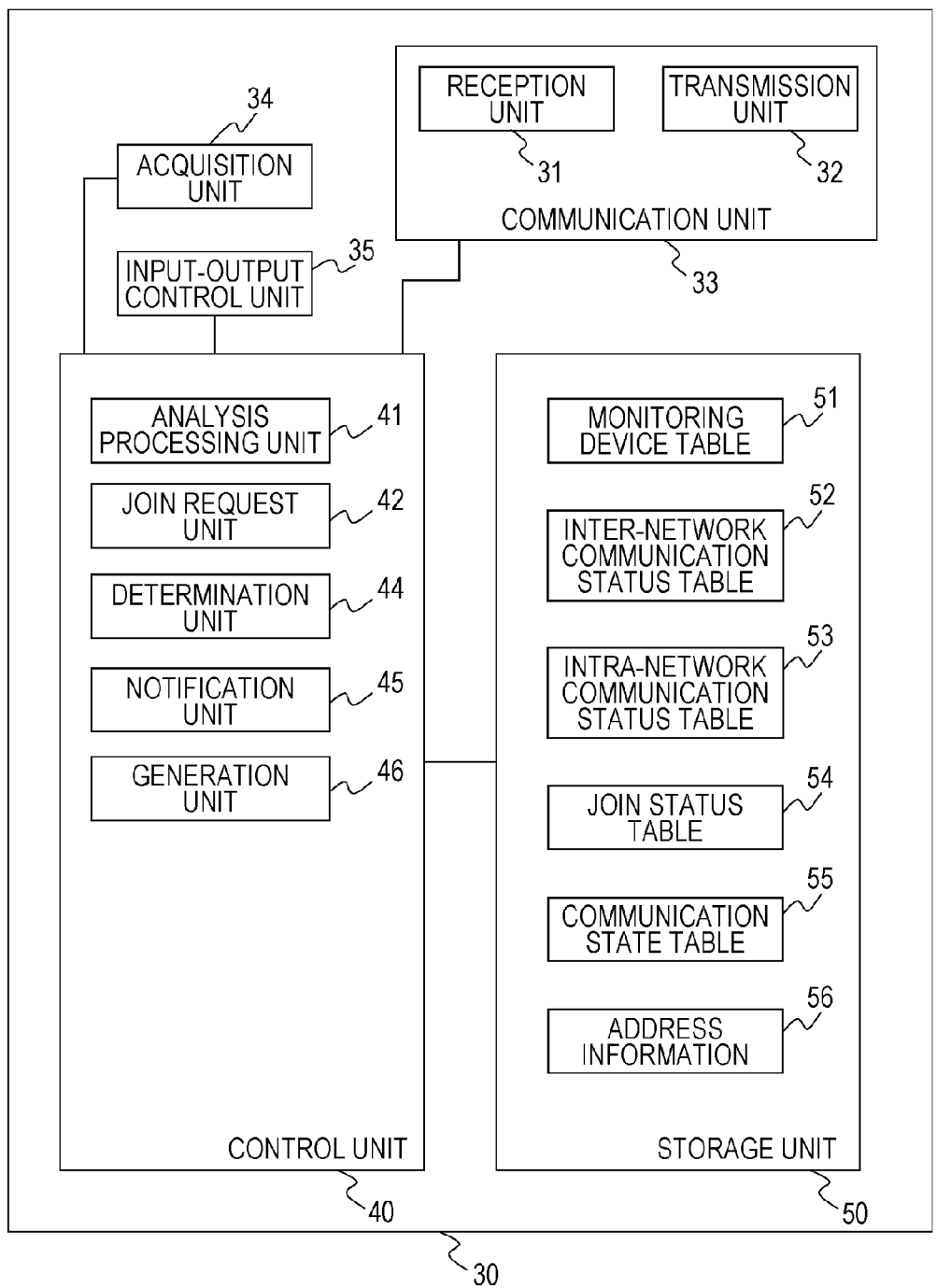
FIG. 3 is a diagram illustrating an example of the configuration of a monitoring device.

FIG. 3 is a diagram illustrating an example of the configuration of the monitoring device 30. Hereinafter, description will be given exemplifying a case in which the LAN which serves as the target for which to suppress unauthorized access from the outside is the corporate network 1. The monitoring device 30 is provided with a communication unit 33, an acquisition unit 34, a control unit 40, and a storage unit 50, and may optionally further be provided with an input-output processing unit 35. The communication unit 33 includes a reception unit 31 and a transmission unit 32. The control unit 40 includes an analysis processing unit 41, a join request unit 42, a determination unit 44, a notification unit 45, and, optionally, a generation unit 46. The storage unit 50 stores a monitoring device table 51, an inter-network communication status table 52, an intra-network communication status table 53, a join status table 54, a communication state table 55, and address information 56.

The reception unit 31 receives packets from another of the monitoring devices 30 via the monitoring network 17. The transmission unit 32 transmits packets to another of the monitoring devices 30 via the monitoring network 17. The acquisition unit 34 acquires information of the packets being transmitted and received by the communication devices 10 which are the monitoring targets. The input-output processing unit 35 is used when the operator inputs setting information into the monitoring device 30.

The analysis processing unit 41 determines whether the communication destinations of the communication devices 10 which are the monitoring targets are included in the corporate network 1 by analyzing the information of the packets which are acquired via the acquisition unit 34. When the communication device 10 which is the monitoring target starts communication with another of the communication devices 10 in the corporate network 1 while communicating with the communication device 5 which is not included in the corporate network 1, the join request unit 42 generates a join request for acquiring the communication status in the communication device 10 which is the communication destination. Here, the join request is a request to join the multicast group which receives the communication status which is transmitted from the monitoring devices 30 which monitor the communication devices 10 which are the communication destinations. The determination unit 44 determines whether unauthorized access is being performed by the communication devices 5 which are not included in the corporate network 1 via the communication devices 10 which are the monitoring targets using the information which is received from the other monitoring devices 30 and the analysis results of the analysis processing unit 41. The notification unit 45 transmits the analysis results of the analysis processing unit 41 by multicast to the monitoring devices 30 which are included in the multicast group. When the likelihood of the communication devices 10 being used for unauthorized access is excluded due to a reason such as that the communication devices 10 which are the monitoring targets ending communication with the communication devices 5 which are outside of the corporate network 1, the generation unit 46 generates a leave request for leaving the multicast group.

The monitoring device table 51 stores information identifying the monitoring devices 30 which perform the monitoring process for each of the communication devices 10 in the corporate network 1. The inter-network communication status table 52 records the communication devices 10 which are the monitoring targets, and the communication status between the communication devices 10 and the communication devices 5 which are not included in the corporate network 1. The intra-network communication status table 53 the communication status between the communication devices 10 which are the monitoring targets and the other communication devices 10 in the corporate network 1. The join status table 54 records the transmission source address of the multicast packets for each multicast group in which the monitoring device 30 is participating. The communication state table 55 stores the addresses and the port numbers of the ports used in communication which are assigned to the communication devices 10 which are the monitoring targets and the communication destinations, respectively. The address information 56 is the multicast address which is used for notifications of communication information. Note that, a multicast address which is shared by all of the monitoring devices 30 is used as the communication information, and the monitoring devices 30, the switches in the corporate network 1, and the like perform identification of the multicast groups using a combination of the multicast address and the transmission source address.

Figure 4:
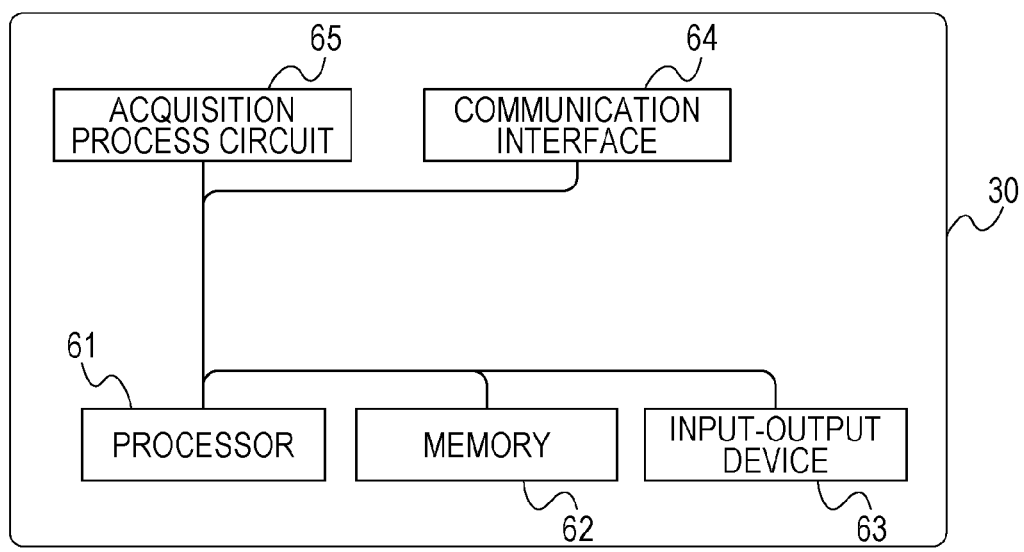
FIG. 4 is a diagram illustrating an example of the hardware configuration of the monitoring device.

FIG. 4 is a diagram illustrating an example of the hardware configuration of the monitoring device 30. The monitoring device 30 is provided with a processor 61, a memory 62, an input-output device 63, a communication interface 64, and an acquisition process circuit 65. The processor 61 is an arbitrary processor including a central processing unit (CPU), and operates as the control unit 40. The memory 62 holds the data which is used in the processes performed by the processor 61, and operates as the storage unit 50. The input-output device 63 operates as the input-output processing unit 35. The communication interface 64 operates as the communication unit 33. The acquisition process circuit 65 is an arbitrary circuit which acquires information of the packets which are transmitted and received by the communication devices 10 which are the monitoring targets by snooping or the like, and operates as the acquisition unit 34.

First Embodiment

Hereinafter, description will be given of an example of the detection of unauthorized access which is performed by the monitoring devices 30, separated into the detection of communication in the monitoring targets performed by each of the monitoring devices 30, and the detection of unauthorized access using notification of the communication status. In the following description, a letter which is assigned to the device which is performing an operation will be appended to the reference numeral of the device in order to facilitate distinction of the devices performing the processes. For example, an acquisition unit 34*a* indicates the acquisition unit 34 included in the monitoring device 30*a*.

(1) Detection of Communication in Monitoring Target by Each Monitoring Device 30

First, in the corporate network 1 including the communication device 10*a* and the communication device 10*d*, the communication device 10*a* starts communication with the communication device 10*d*. When the transmission and reception of packets is performed by the communication device 10*a*, the acquisition unit 34*a* of the monitoring device 30*a* acquires the information in the packets which are transmitted and received using a process such as snooping or mirroring.

Figure 5A:
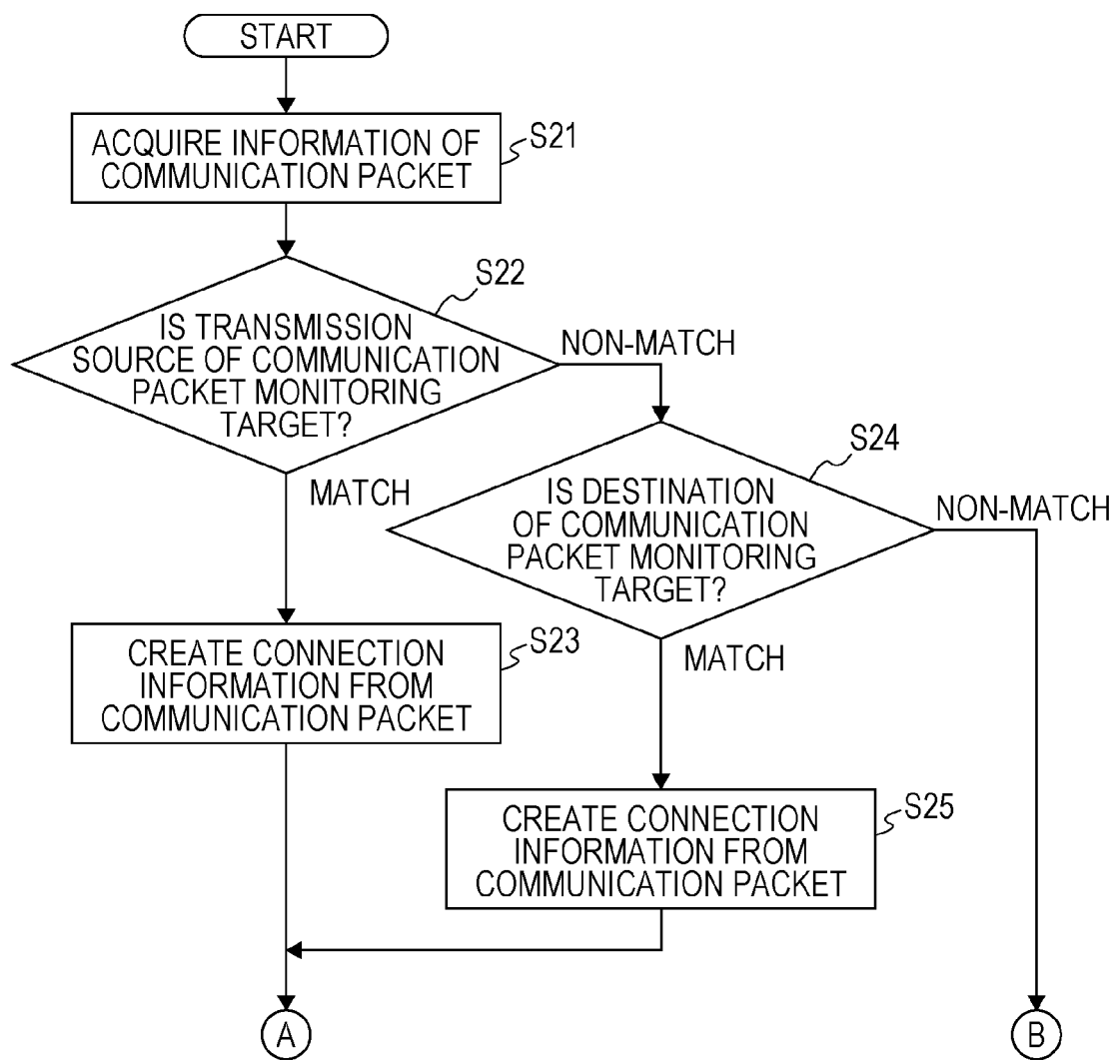
FIG. 5A is a flowchart illustrating an example of an analysis process of a communication status of a monitoring target.
Figure 5B:
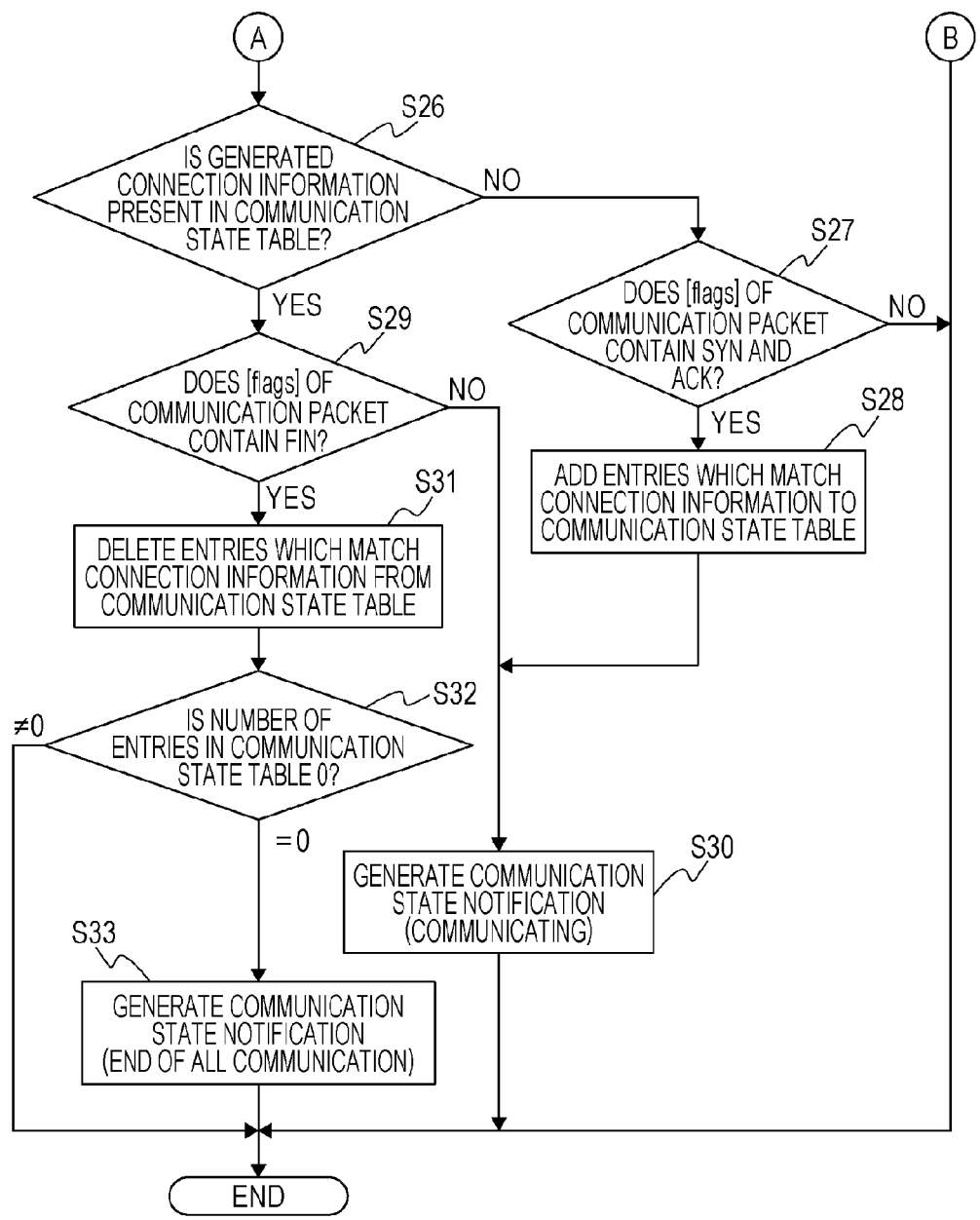
FIG. 5B is a flowchart illustrating an example of an analysis process of a communication status of a monitoring target.

FIGS. 5A and 5B are flowcharts illustrating an example of the analysis process of the communication status of a monitoring target. When the analysis processing unit 41 acquires the information of the packet from the acquisition unit 34, the analysis processing unit 41 determines whether the transmission source of the packet is the communication device 10 which is the monitoring target (operations S21, S22).

FIG. 6 is a diagram illustrating an example of the monitoring device table 51. The monitoring device table 51 associates each of the communication devices 10 which are included in the corporate network 1 with confidential area display, a multicast source address (M-source address), and a monitoring device. The confidential area display indicates whether the communication device 10 is included in the confidential area. The communication devices 10 which are included in the confidential area hold confidential information. The monitoring device column stores information which uniquely identifies the monitoring device 30 which is monitoring the communication device 10. The multicast source address is the address which is assigned to the transmission source of the multicast packet which performs notification of the communication status with regard to the communication devices 10. In the following description, each of the monitoring devices 30 uses a different transmission source address for each of the communication devices 10 which serve as the targets of the communication status notification. In other words, the communication devices 10 which are the notification targets of the communication status are uniquely identifiable by the transmission source address of the multicast packets.

In operation S22 of FIG. 5A, the analysis processing unit 41 identifies the monitoring device 30 which is monitoring the communication device 10 of the transmission source by searching the monitoring device table 51, using the identification information of the transmission source of the packet included in the header information which is acquired from the acquisition unit 34 as a key. Note that, the monitoring device table 51 is held by all of the monitoring devices 30 in the corporate network 1 in a shared manner. When the communication device 10 of the transmission source is the monitoring target of the monitoring device 30 of the analysis processing unit 41, the analysis processing unit 41 creates the connection information from the information which is acquired from the acquisition unit 34 (a match in operation S22, operation S23). Here, the "connection information" is a combination of the transmission source address, the transmission source port number, the destination address, and the destination port number of the packet which is obtained via the acquisition unit 34. The connection information of a case in which the transmission source is the communication device which is the monitoring target of the monitoring device 30 is generated in the connection information which is generated in operation S23.

Meanwhile, when the communication device 10 which is the transmission source is not the monitoring target of the monitoring device 30, the analysis processing unit 41 determines whether the destination of the packet which is acquired from the acquisition unit 34 is the monitoring target of the monitoring device 30 using the monitoring device table 51 (non-match in operation S22, operation S24). Even when the destination communication device 10 is the monitoring target, the analysis processing unit 41 generates the connection information (a match in operation S24, operation S25). Note that, when neither the transmission source nor the destination is the monitoring target, the analysis processing unit 41 ends the process (non-match in operation S24). The analysis processing unit 41 determines whether the generated connection information is included in the communication state table 55 (operation S26).

FIG. 7 is a diagram illustrating an example of the communication state table 55. The communication state table 55 records the device which is the communication device 10 which is the monitoring target and the communication destination of the device which is the monitoring target. In the example of FIG. 7, the communication state table 55 stores a combination of the identification information such as the addresses and the port numbers which are used in the communication for the communication devices 10 which are the monitoring targets and the communication destinations, respectively. For example, the first entry of FIG. 7 records the fact that the communication device 10a which is the monitoring target is communicating with the communication device 10b using port 80 via port 20021 of the communication device 10b.

When the generated connection information is not included in the communication state table 55, the analysis processing unit 41 determines whether the packet which is acquired from the acquisition unit 34 is a packet which is used to start communication (no in operation S26, operation S27). In FIG. 5b, when among the flags in the transmission control protocol (TCP) header, a SYN bit and an ACK bit are set to 1, the analysis processing unit 41 determines that the packet is used to start communication. When the SYN bit and the ACK bit are not set to 1, the analysis processing unit 41 determines that the packet is not used to start communication and ends the process (no in operation S27). When the SYN bit and the ACK bit are set to 1 in the packet which is input from the acquisition unit 34, the analysis processing unit 41 adds the entry which matches the connection information to the communication state table 55 (yes in operation S27, operation S28). The analysis processing unit 41 outputs the fact that communication is detected and the obtained connection information to the notification unit 45. Thereby, the notification unit 45 generates the state notification message (operation S30).

FIG. 8 illustrates an example of a state notification message. The state notification message includes an L2 header, and an Internet protocol (IP) header, and the information (communication information) representing the communication status in the communication device 10 which is the monitoring target is recorded in the data portion. The communication information includes the identification information of the communication device 10 which is the monitoring target, the identification information of the communication destination of the communication device 10 which is the monitoring target, the communication state, and the time stamp. The communication state is set to one of the two types, communicating and communication ended. The communication state is set to communicating in the state notification message which is generated in operation S30.

Meanwhile, when it is determined that the connection information is included in the communication state table 55 in operation S26 of FIG. 5B, the analysis processing unit 41 determines whether the packet which is acquired from the acquisition unit 34 is a packet for ending communication (yes in operation S26, operation S29). In FIG. 5B, when a FIN bit is set to 1 in the TCP header, the analysis processing unit 41 determines that the packet is used to end the communication. When the FIN bit is not set to 1, the notification unit 45 generates a state notification message of communication state=communicating (no in operation S29, operation S30). When the FIN bit is set to 1 in the packet which is input from the acquisition unit 34, the analysis processing unit 41 determines that the communication which can be identified by the connection information will end, and deletes the entry which matches the connection information from the communication state table 55 (yes in operation S29, S31). The analysis processing unit 41 outputs the fact that the end of the communication is detected and the obtained connection information to the notification unit 45. The notification unit 45 generates a state notification message including communication state=all communication ended in relation to the communication device 10 for which there is no longer an entry in the communication state table 55 due to the deletion of the connection information (operations S32, S33).

(2) Detection of Unauthorized Access Using Notified Communication Status

Figure 9:
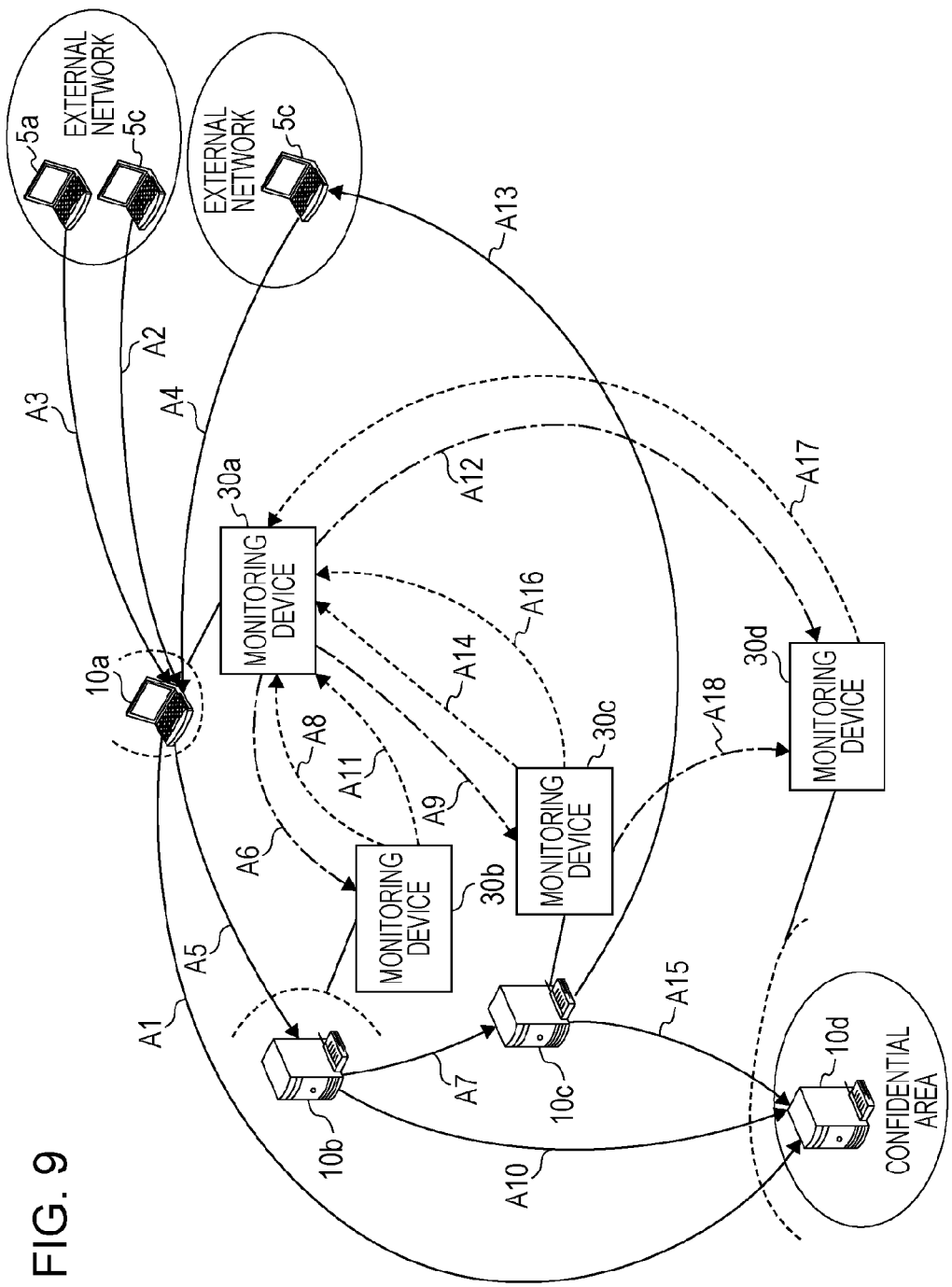
FIG. 9 is a diagram illustrating an example of a network including the monitoring devices.
Figure 10:
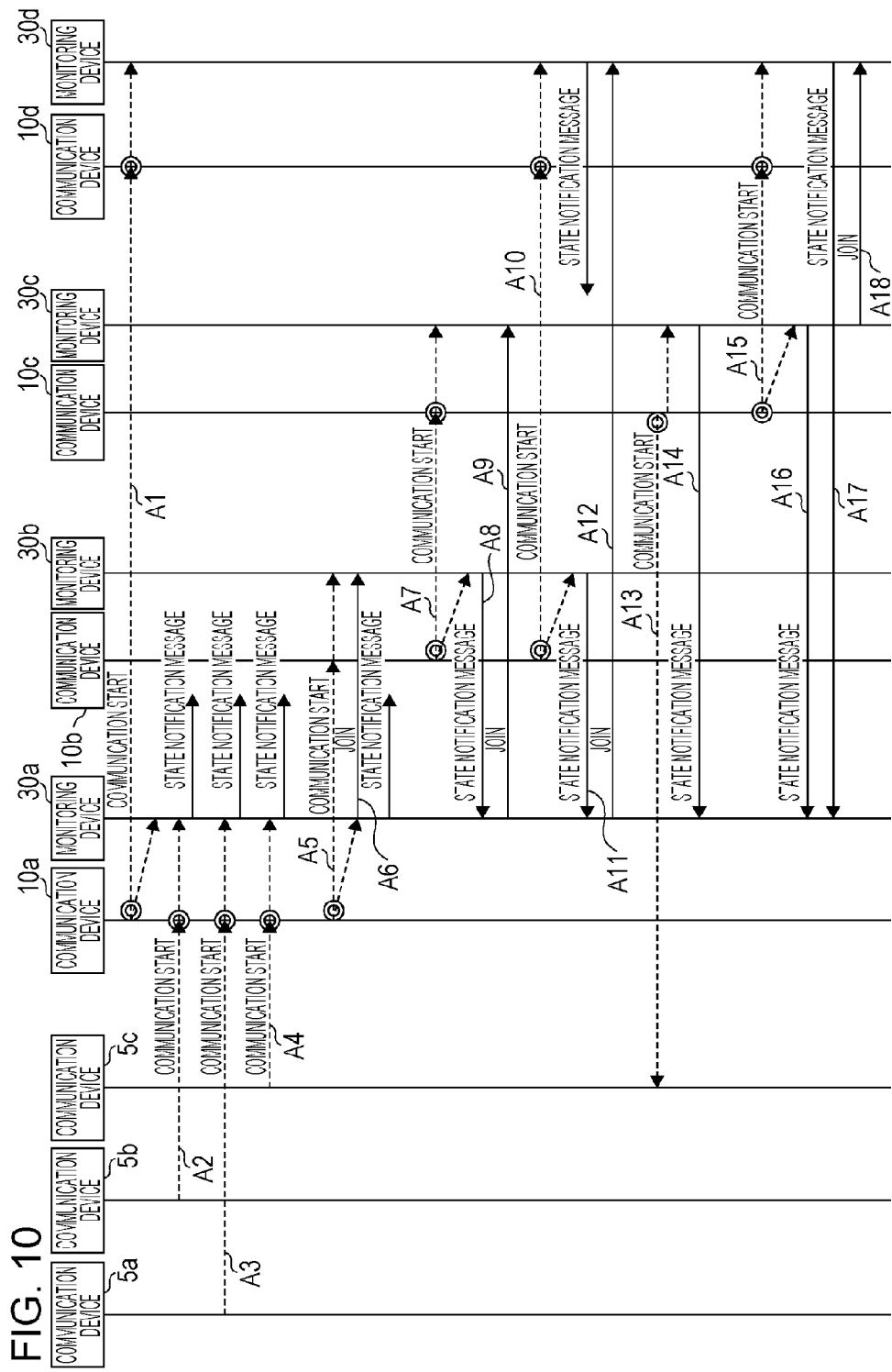
FIG. 10 is a sequence diagram illustrating an example of a communication process.

Next, description is given of the processes of a case in which the unauthorized access is detected by the monitoring devices 30 transmitting and receiving the communication status of the communication devices 10 which are the monitoring targets, with reference to FIGS. 9 and 10. Note that, each of the monitoring devices 30 detects the start and the end of the communication using the processes described using FIGS. 5A to 8.

FIG. 9 is a diagram illustrating an example of a network including the monitoring devices 30. In the network illustrated in FIG. 9, the corporate network 1 includes the communication devices 10*a* to 10*d*, and monitoring devices 30*a* to 30*d*. The communication device 10*d* is a device which stores the confidential information. In FIG. 9, an area containing the communication device 10*d* is represented as the confidential area. The monitoring device 30*a* monitors the communication status of the communication device 10*a*. Similarly, the monitoring devices 30*b*, 30*c*, and 30*d* monitor the communication statuses of the communication devices 10*b*, 10*c*, and 10*d*, respectively. In FIG. 9, one of the monitoring targets of each of the monitoring devices 30 is depicted in order to facilitate description; however, the number of the communication devices 10 which are monitored by each of the monitoring devices 30 is arbitrary. The communication devices 5*a* to 5*c* which are included in an external network are illustrated in FIG. 9. Arrows A1 to A18 in FIG. 9 illustrate the transmission and reception of packets. The solid line arrows illustrate communication between the communication devices. The dot-and-dash line arrows illustrate the transmission of join requests to the multicast groups, and the dashed line arrows illustrate the notification of the communication status to the devices which are participating in the multicast groups. Note that, in FIG. 9 and the like, to facilitate description, the join requests are illustrated by arrows pointing at the transmission source of the multicast packet; however, the join request is also processed by a switch which performs filtering of the multicast packets or the like.

FIG. 10 is a sequence diagram illustrating an example of the communication process. Note that, the arrows A1 to A18 of FIG. 10 correspond to the arrows A1 to A18 of FIG. 9. Note that, the double circles of FIG. 10 illustrate the transmission source and the transmission destination of the packets.

As illustrated by the arrow A1, the communication device 10*a* establishes communication with the communication device 10*d*. Next, an analysis processing unit 41*a* of the monitoring device 30*a* detects the start of communication using the processes described with reference to FIGS. 5A to 8, and outputs the detected information to the notification unit 45*a*. Since there are no entries in an intra-network communication status table 53*a* relating to the communication with the other communication devices 10 in the corporate network 1, the notification unit 45*a* determines that there is no monitoring device 30 which uses the detected communication status, and ends the process without transmitting the communication status by multicast.

The analysis processing unit 41*a* determines whether the corporate network 1 includes the communication destination of the communication device 10*a* using a monitoring device table 51*a* (FIG. 6). In this example, the communication device 10*d* which serves as the communication destination of the communication device 10*a* is a device in the corporate network 1 which is being monitored by the monitoring device 30*d*. Therefore, the analysis processing unit 41*a* records the information of the communication between the communication device 10*a* and the communication device 10*d* in the intra-network communication status table 53*a*.

Figure 11:
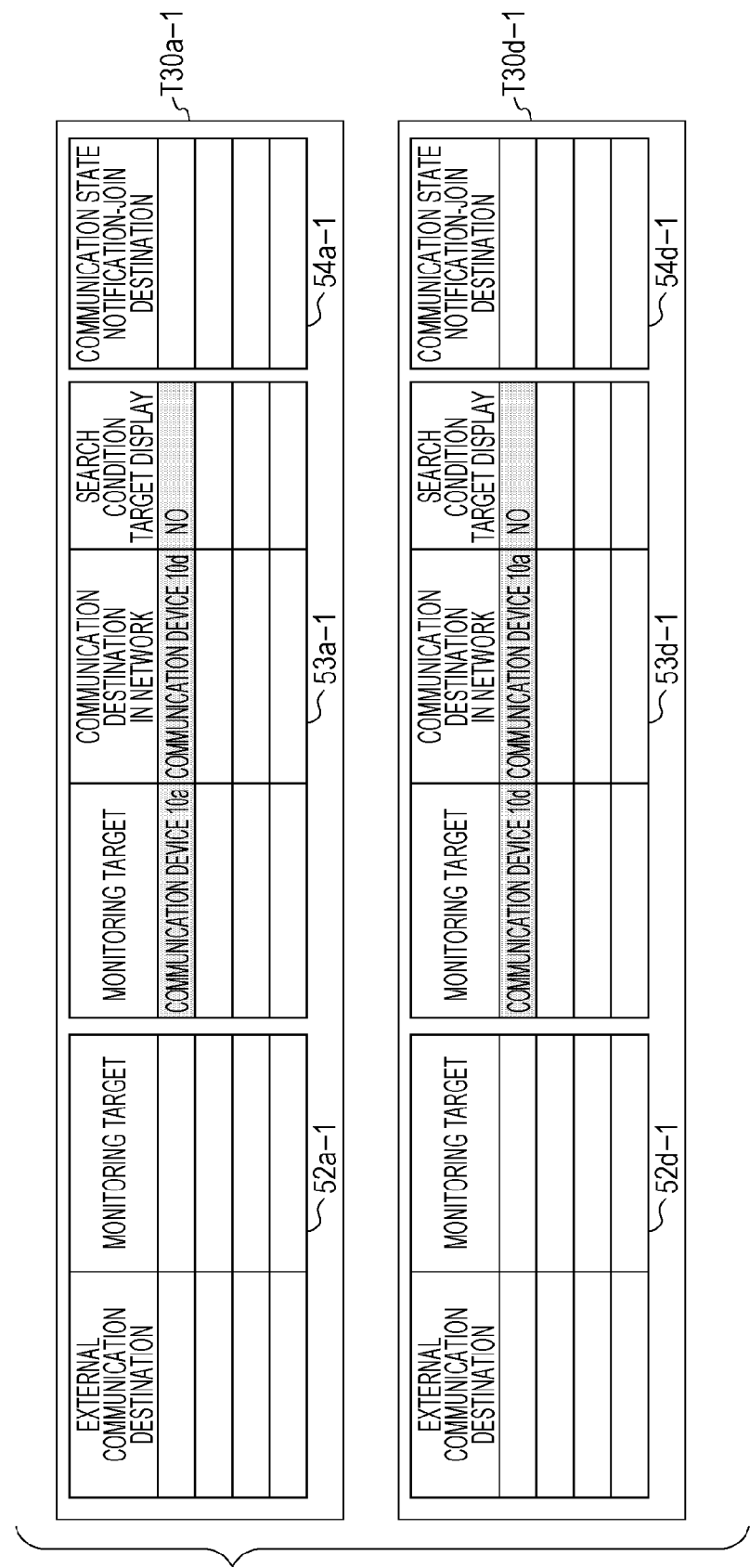
FIG. 11 is a diagram illustrating an example of information held by the monitoring device.

T30*a*-1 of FIG. 11 illustrates an example of the information which is acquired by the monitoring device 30*a* using the processes relating to the communication of the arrow A1. Meanwhile, T30*d*-1 of FIG. 11 is an example of the information which is held by the monitoring device 30*d* using the processes relating to the communication of the arrow A1.

The intra-network communication status table 53 includes the monitoring target, the communication devices in the corporate network 1 which serve as the communication destinations which are the monitoring targets, and a detection condition target display. The detection condition target display is a value of either yes or no. Since the communication which is set to detection condition target display=no is a communication path in the corporate network 1 which is started before the communication with devices outside of the corporate network 1 is started, the communication path is considered not to be used for unauthorized access. Meanwhile, when the detection condition target display=yes, since the communication path in the corporate network 1 is started after the communication with devices outside of the corporate network 1 is started, there is a concern that the communication path will be used in unauthorized access. Therefore, the analysis processing unit 41*a* records the information of the communication between the communication device 10*a* and the communication device 10*d* as depicted in the intra-network communication status table 53*a*-1 inside T30*a*-1. Note that, at the time of the communication of the arrow A1, as depicted in the inter-network communication status table 52*a*-1 and the join status table 54*a*-1, the monitoring device 30*a* does not detect the communication with the outside of the corporate network 1, and is not participating in any of the multicast groups.

Similar processes to those of the monitoring device 30*a* are also performed by the monitoring device 30*d*. Therefore, as depicted in T30*d*-1 of FIG. 11, the monitoring device 30*d* is provided with the inter-network communication status table 52*d*-1, the intra-network communication status table 53*d*-1, and the join status table 54*d*-1.

Figure 12:
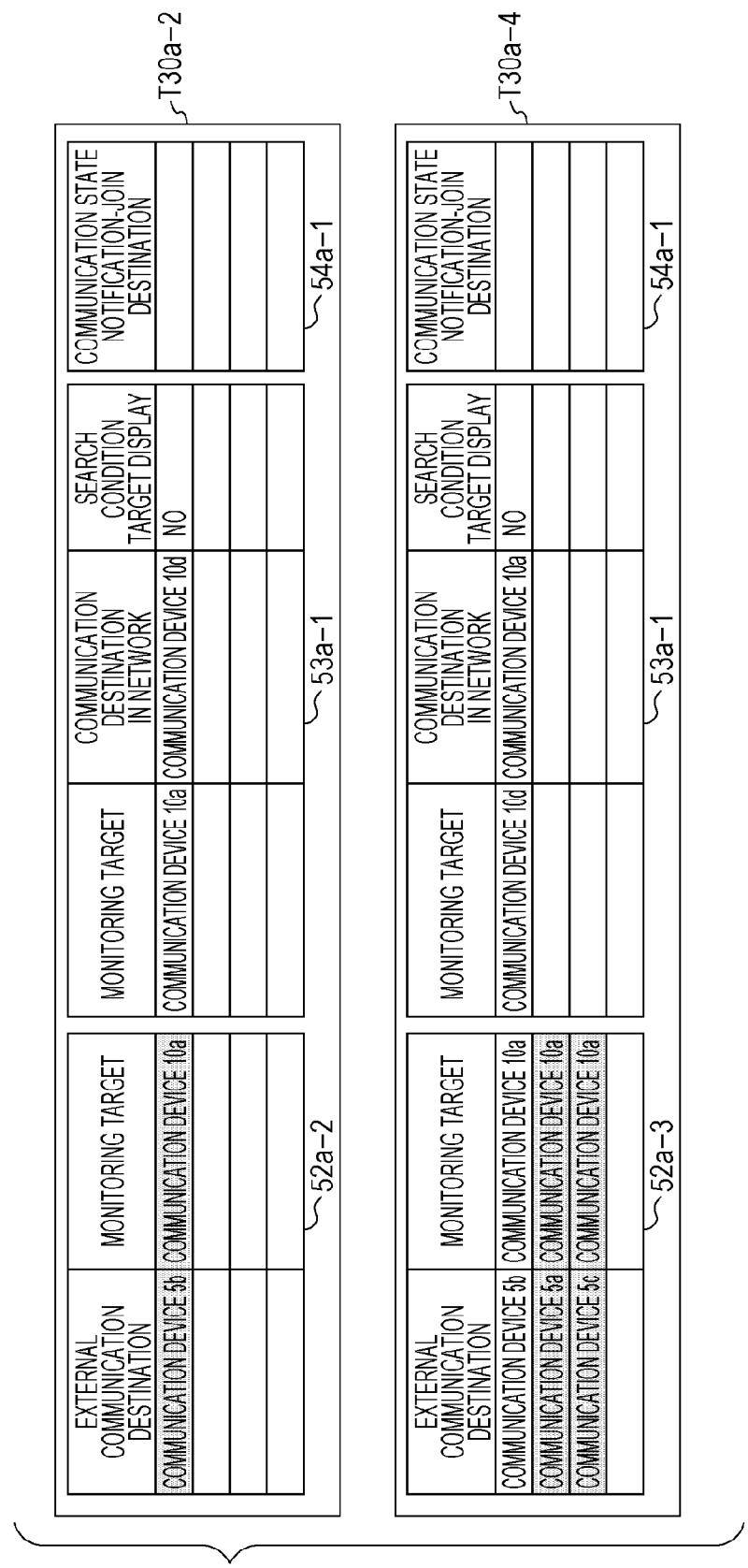
FIG. 12 is a diagram illustrating an example of information held by the monitoring device.

T30*a*-2 of FIG. 12 is an example of the information which is acquired by the monitoring device 30*a* using the processes relating to the communication of the arrow A2 (FIGS. 9 and 10). As illustrated by the arrow A2, the communication device 10*a* establishes communication with the communication device 5*b* which is outside of the corporate network 1. At this time, since there is an entry relating to the communication with the communication device 10*d* in the intra-network communication status table 53*a*-1, the notification unit 45*a* transmits the communication status of the communication device 10*a* by multicast. Note that, at this stage, since none of the monitoring devices 30 are participating in the multicast group of the monitoring device 30*a*, the state notification message does not reach any of the monitoring devices 30.

The analysis processing unit 41*a* determines that the corporate network 1 does not include the communication device 5*b* which is the communication destination of the communication device 10*a* using the monitoring device table 51*a* (FIG. 6). Therefore, the analysis processing unit 41*a* changes the inter-network communication status table 52a-1 as depicted in the inter-network communication status table 52a-2, and ends the process.

T30a-4 of FIG. 12 is an example of the information which is held by the monitoring device 30a when the processes relating to the communication of the arrows A3 and A4 are ended. As illustrated by the arrows A3 and A4, even when the communication device 10a establishes communication with the communication devices 5a and 5c which are outside of the corporate network 1, the same processes as those described with relation to the arrow A2 are performed. Therefore, using the processes relating to the communication illustrated by the arrows A3 and A4, the monitoring device 30a updates the inter-network communication status table 52a-2 to the inter-network communication status table 52a-3. Meanwhile, the intra-network communication status table 53 and the join status table 54 are not updated by the communication illustrated by the arrows A3 and A4.

Figure 13:
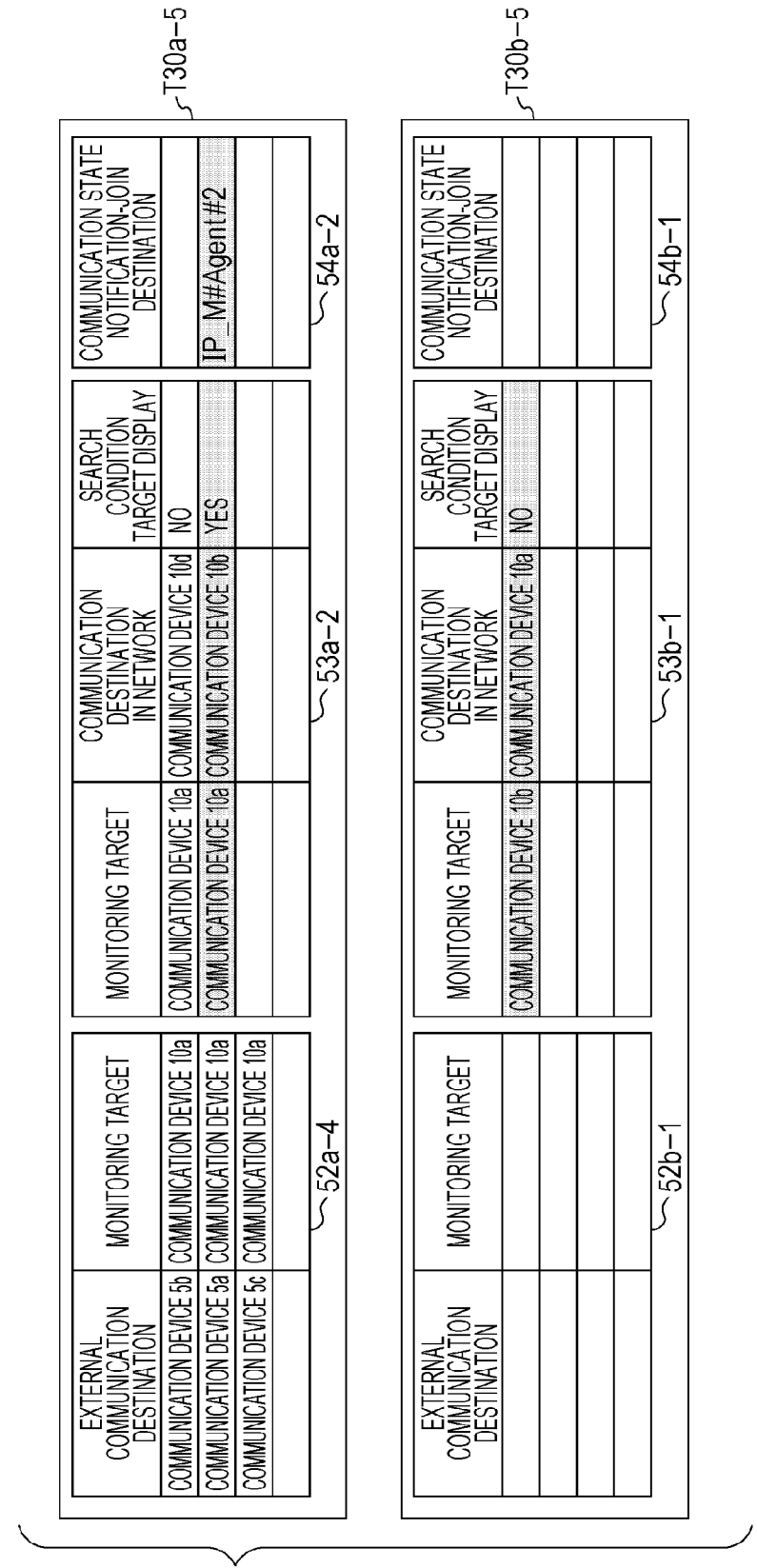
FIG. 13 is a diagram illustrating an example of information held by the monitoring device.

FIG. 13 is a diagram illustrating an example of the information held by each of the monitoring devices 30 according to the processes relating to the communication illustrated by the arrow A5. T30a-5 is an example of the information which is held by the monitoring device 30a after the processing of the communication of the arrow A5, and T30b-5 is an example of the information which is held by the monitoring device 30b after the processing of the communication of the arrow A5. At the time at which the communication of the arrow A5 is started, since the communication device 10b is not communicating with any of the devices, the operation which is performed when the monitoring device 30b processes the communication illustrated by the arrow A5 is the same as the operation performed when the monitoring device 30a performs the process in relation to the communication of the arrow A1. Therefore, the monitoring device 30b holds the intra-network communication status table 53b-1 according to the communication of the arrow A5.

Meanwhile, for the communication device 10a, the arrow A5 (FIGS. 9 and 10) is communication between the communication device 10a and a device in the corporate network 1 which is started after the communication device 10a starts communication with the communication devices 5a to 5c which are outside of the corporate network 1. Therefore, when the analysis processing unit 41a determines that the communication destination (the communication device 10b) of the communication device 10a is a device in the corporate network 1, the intra-network communication status table 53a-1 is updated to the intra-network communication status table 53a-2. Here, since the communication of the arrow A5 is communication in the corporate network 1 which is started after the communication with a device outside of the corporate network 1 is started, the analysis processing unit 41a sets the detection condition target display=yes. The analysis processing unit 41a notifies the join request unit 42a that communication (communication in which the detection condition target display=yes) in the corporate network 1 which is started after the communication with a device outside of the corporate network 1 is started has occurred.

The join request unit 42a acquires the transmission source address of the multicast group in which the communication status relating to the communication device 10b which is the communication destination is notified by searching the monitoring device table 51a. Here, as illustrated in FIG. 6, IP_M#Agent#2 is the transmission source address of the multicast group in which the communication status of the communication device 10b is notified. Therefore, the join request unit 42a updates the join status table 54a-1 to the join status table 54a-2, and generates the join request message.

FIG. 14 is a diagram illustrating an example of a join request message. FIG. 14 illustrates an example of the join request message when the join request is performed using multicast listener discovery version 2 (MLDv2). The join request message includes an L2 header, an IP header, and data. Information indicating that the data portion is a multicast listener report, and a combination of the multicast address and the transmission source address relating to the multicast group to join are included in Type of the data portion. Therefore, according to the join request message of FIG. 14, the multicast address is Multicast Addr#m, and setting is performed such that the monitoring device 30a can receive packets in which the transmission source address is set to IP_M#Agent#2. The situation in which the join request message is transmitted which is illustrated in FIG. 14 is depicted by the arrow A6 (FIGS. 9 and 10).

Figure 15:
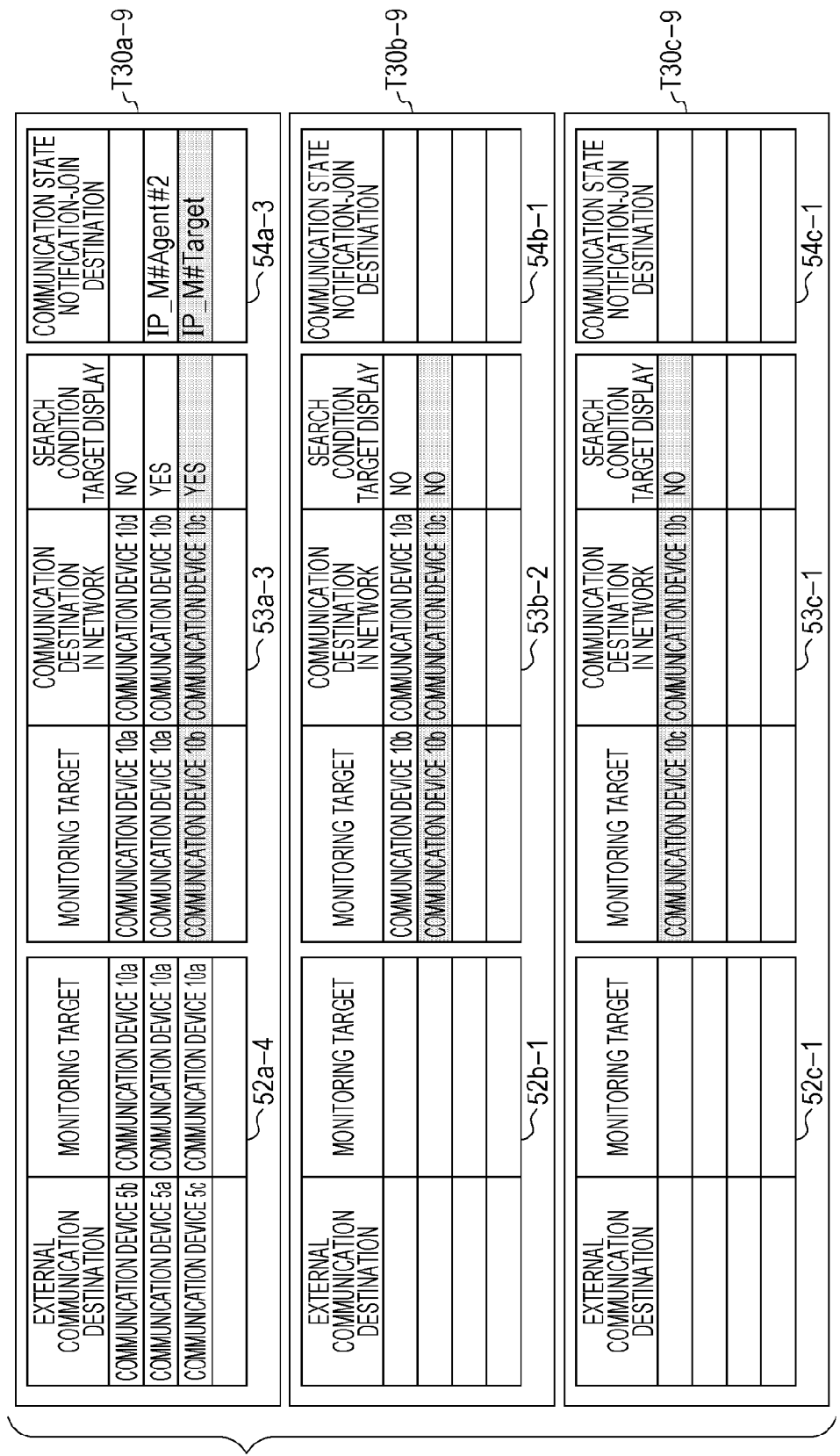
FIG. 15 is a diagram illustrating an example of information held by the monitoring device.

T30a-9 of FIG. 15 is an example of the information which is held by the monitoring device 30a after the communication illustrated by the arrows A7 to A9 (FIGS. 9 and 10) is ended. Similarly, when the communication of the arrow A9 ends, the monitoring device 30b holds T30b-9 and the monitoring device 30c holds T30c-9. At the time at which the communication of the arrow A7 is started, since the communication device 10c is not communicating with any of the devices, the operation which is performed when the monitoring device 30c processes the communication illustrated by the arrow A7 is the same as the operation performed when the monitoring device 30a performs the process in relation to the communication of the arrow A1.

The arrow A7 of FIGS. 9 and 10 illustrates the start of the communication between the communication device 10b and the communication device 10c. The analysis processing unit 41b determines that the communication device 10c is a device in the corporate network 1 using the monitoring device table 51, and updates the intra-network communication status table 53b-1 (FIG. 13) to the intra-network communication status table 53b-2 (FIG. 15). At the time at which the communication between the communication device 10b and the communication device 10c is started, since the communication device 10b is not communicating with a device outside of the corporate network 1, the communication between the communication device 10b and the communication device 10c is set to detection condition target display=no in the monitoring device 30b. At the time at which the communication of the arrow A7 is performed, since the communication device 10b and the communication device 10a are communicating with each other, the notification unit 45b transmits a state notification message including the communication status of the communication device 10b by multicast.

The arrow A8 of FIGS. 9 and 10 illustrates the transmission path of the state notification message which is transmitted from the monitoring device 30b by multicast, the determination unit 44a of the monitoring device 30a acquires the state notification message of the arrow A8 via the reception unit 31a. The determination unit 44a identifies that the communication device 10b starts communication with the communication device 10c from the state notification message. The determination unit 44a determines whether a device which is not included in the corporate network 1 is capable of communicating with the communication devices 10 in a confidential area via the monitoring target of the monitoring device 30a. In the determination, the determination unit 44a determines whether a device outside of the corporate network 1 is capable of accessing the communication devices 10 in the confidential area using the communication which is started after the communication between the communication devices 10 which are the monitoring targets and a device outside of the corporate network 1 is started. In the example of FIGS. 9 and 10, the determination unit 44a determines whether the communication devices 5a to 5c which are outside of the corporate network 1 are capable of accessing the communication device 10d in the confidential area according to the arrows A2 to A5 and A7. Here, since none of the communication devices 5a to 5c are capable of accessing the communication device 10d according to the communication of the arrows A2 to A5 and A7, the determination unit 44a determines that unauthorized access is not occurring.

The determination unit 44a updates he intra-network communication status table 53a-2 (FIG. 13) to the intra-network communication status table 53a-3 (FIG. 15) using the information which is obtained from the state notification message which is received according to the arrow A8. Here, the determination unit 44a records the information of the communication device 10b which is being monitored in the transmission source (the monitoring device 30b) of the state notification message, to the monitoring target field, and records the communication device 10c in the intra-network communication status table 53 as the communication destination of the communication device 10b. Since the communication between the communication device 10b and the communication device 10c is also started after the communication device 10a communicates with the communication devices 5a to 5c which are outside of the corporate network 1, the communication device 10b and the communication device 10c are set as targets (detection condition target display=yes) for which to consider the likelihood of unauthorized access by the monitoring device 30a. Since communication in which there is a likelihood of unauthorized access is not newly detected, the determination unit 44a notifies the join request unit 42a of the information of the communication between the communication device 10b and the communication device 10c. The join request unit 42a updates the join status table 54a-2 (FIG. 13) to the join status table 54a-3 (FIG. 15), and generates the join request message using the same processes as those described with reference to FIG. 13. According to the join request message which is generated at this time, the monitoring device 30a joins the multicast group which serves as the destination of the communication information relating to the communication device 10c (arrow A9).

Figure 16:
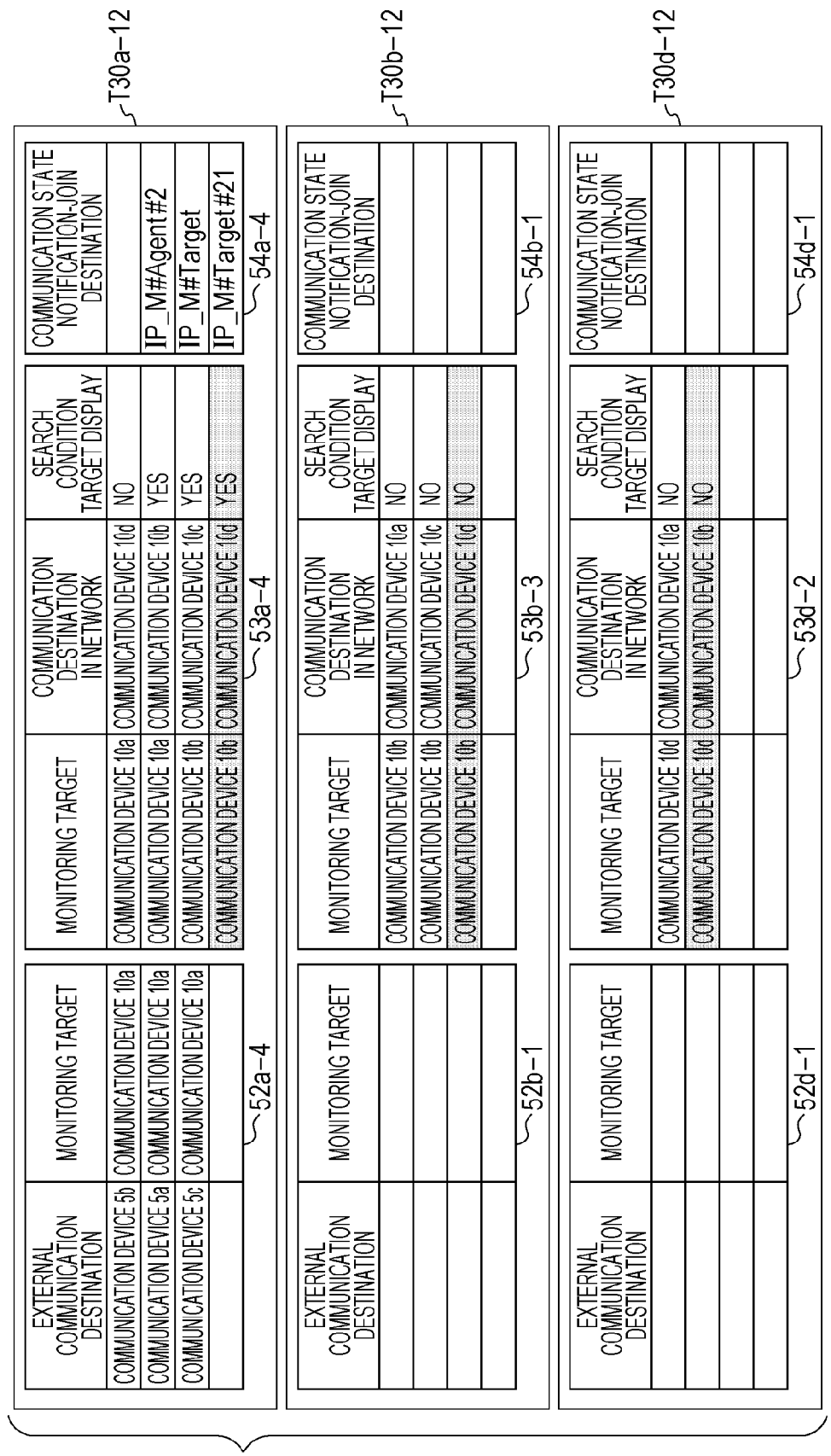
FIG. 16 is a diagram illustrating an example of information held by the monitoring device.

T30a-12 of FIG. 16 is an example of the information which is held by the monitoring device 30a after the communication illustrated by the arrows A10 to A12 (FIGS. 9 and 10) is ended. Similarly, when the communication of the arrow A12 ends, the monitoring device 30b holds T30b-12 and the monitoring device 30d holds T30d-12.

The arrow A10 of FIGS. 9 and 10 illustrates the start of the communication between the communication device 10b and the communication device 10d. When the communication illustrated by the arrow A10 starts, neither the communication device 10b nor the communication device 10d is communicating with a device which is outside of the corporate network 1. Therefore, the monitoring device 30b and the monitoring device 30d perform the same processes which are performed by the monitoring device 30b when the communication of the arrow A7 starts. Therefore, in the monitoring device 30b, the intra-network communication status table 53b-2 (FIG. 15) is updated to the intra-network communication status table 53b-3 (FIG. 16). In the communication device 10d, the intra-network communication status table 53d-1 (FIG. 11) is updated to the intra-network communication status table 53d-2 (FIG. 16).

As illustrated by the arrow A11 of FIGS. 9 and 10, when the communication illustrated by the arrow A10 starts, the monitoring device 30b transmits a state notification message indicating that the communication device 10b has started communicating with the communication device 10d by multicast. The determination unit 44a of the monitoring device 30a determines whether the unauthorized access is occurring using the state notification message of the arrow A11. In other words, the determination unit 44a determines whether the communication devices 5a to 5c which are outside of the corporate network 1 are capable of accessing the communication device 10d in the confidential area according to the arrows A2 to A5, A7, and A10. As illustrated in FIG. 9 and the like, the communication device 5c is capable of accessing the communication device 10d via the communication device 10a and the communication device 10b due to the bidirectional communication illustrated in the arrows A4, A5, and A10. Therefore, the determination unit 44a determines that unauthorized access has occurred.

The determination unit 44a updates the intra-network communication status table 53a-3 (FIG. 15) to the intra-network communication status table 53a-4 (FIG. 16) using the state notification message of the arrow A11. Here, since the communication between the communication device 10b and the communication device 10d is also started after the communication device 10a communicates with the communication devices 5a to 5c which are outside of the corporate network 1, the communication device 10b and the communication device 10d are set as targets (detection condition target display=yes) for which to consider the likelihood of unauthorized access by the monitoring device 30a. Therefore, the join request unit 42a updates the join status table 54a-3 (FIG. 15) to the join status table 54a-4 (FIG. 16), and generates the join request message to the multicast group which is notified of the communication state of the communication device 10d. The monitoring device 30a joins the multicast group in which the state notification messages including the communication status of the communication device 10d is transmitted using the join request message (arrow A12).

FIG. 17 is a diagram illustrating an example of the information held by the monitoring device 30c when the communication illustrated by the arrow A13 occurs. When the communication device 10c starts performing communication with the communication device 5c, the acquisition unit 34c of the monitoring device 30c outputs the information of the packet of the communication which is newly started to the analysis processing unit 41c. The analysis processing unit 41c determines that the communication destination (the communication device 5c) of the communication device 10c is not included in the corporate network 1 using the monitoring device table 51 (FIG. 6). The analysis processing unit 41c updates the inter-network communication status table 52c-1 (FIG. 15) to the inter-network communication status table 52c-2 (FIG. 17).

Since the communication device 10c is communicating with the communication device 10b in the corporate network 1, the notification unit 45c generates a state notification message for notifying that the communication device 10c has started communicating with the communication device 5c, and transmits the state notification message via the transmission unit 32c by multicast. At this time, the monitoring device 30a is participating in the multicast group in which the monitoring device 30*c* transmits notifications of the communication information of the communication device 10*c* (arrow A9). Therefore, the monitoring device 30*a* receives the state notification messages relating to the communication device 10*c* (arrow A14).

The determination unit 44*a* of the monitoring device 30*a* determines whether the unauthorized access has newly occurred using the state notification message illustrated by the arrow A14. In other words, the determination unit 44*a* determines whether the communication devices 5*a* to 5*c* which are outside of the corporate network 1 are capable of accessing the communication device 10*d* in the confidential area using the path illustrated by the arrow A13, and either the communication path of the arrows A2 to A5, or the arrows A7 and A10. As illustrated in FIG. 9 and the like, the communication device 5*c* is capable of accessing the communication device 10*d* using the path of the arrows A4, A5, and A10, and is further capable of transmitting the data in the communication device 10*d* to the communication device 5*c* using the path of the arrows A10, A7, and A13. Therefore, the determination unit 44*a* determines that a new unauthorized access has occurred.

Figure 18:
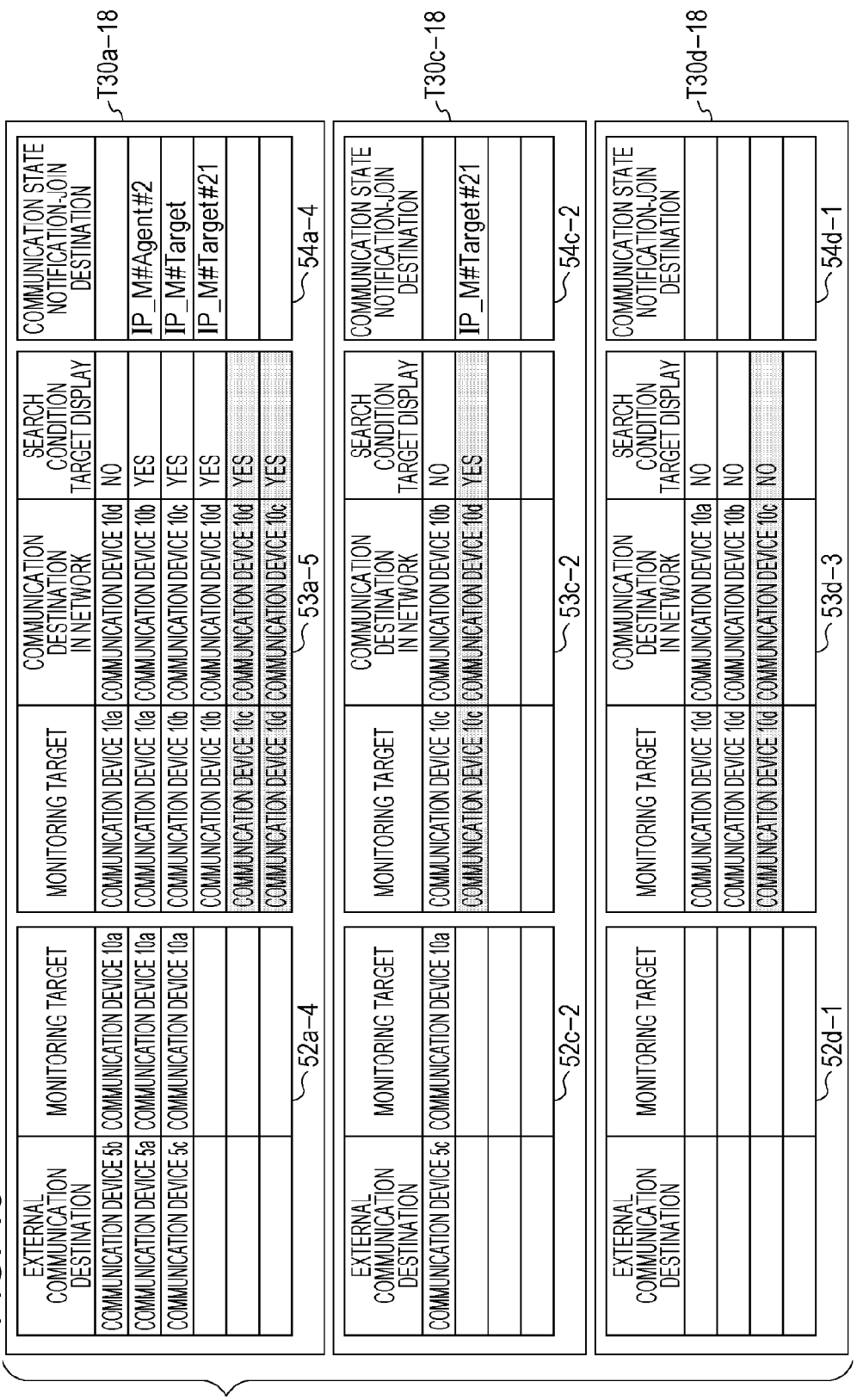
FIG. 18 is a diagram illustrating an example of information held by the monitoring device.

As illustrated by the arrow A15 (FIGS. 9 and 10), FIG. 18 is a diagram illustrating an example of the information which is held by each of the monitoring devices 30 when the communication device 10*c* starts performing communication with the communication device 10*d*. T30*a*-18 is an example of the information which is held by the monitoring device 30*a* after the communication illustrated by the arrows A15 to A18 is ended. Similarly, when the communication of the arrow A18 ends, the monitoring device 30*c* holds T30*c*-18 and the monitoring device 30*d* holds T30*d*-18.

The analysis processing unit 41*c* of the monitoring device 30*c* updates the intra-network communication status table 53*c* according to the occurrence of the communication illustrated by the arrow A15. At this time, since the communication device 10*c* is already performing communication with the communication device 5*c* which is outside of the corporate network 1, it is determined that there is a concern that the communication path between the communication device 10*c* and the communication device 10*d* will be used for unauthorized access (detection condition target display=yes). Therefore, the intra-network communication status table 53*c*-1 (FIG. 17) is updated as illustrated in the intra-network communication status table 53*c*-2 (FIG. 18). The notification unit 45*c* transmits a state notification message relating to the communication status of the communication device 10*c* via the transmission unit 32*c* by multicast (arrow A16). The analysis processing unit 41*c* notifies the join request unit 42*c* of the fact that the communication which may be used for unauthorized access has occurred between the communication device 10*c* and the communication device 10*d*. The join request unit 42*c* identifies that the transmission source of the multicast of the state notification message relating to the communication device 10*d* is IP_M#Target#21 using the monitoring device table 51. The join request unit 42*c* generates a join request for receiving the multicast packets which are addressed to Multicast Addr#m which are transmitted from IP_M#Target#21, and transmits the join request via the transmission unit 32*c* (arrow A18).

When the monitoring device 30*d* acquires the information of the communication between the communication device 10*c* and the communication device 10*d* via the acquisition unit 34*d*, the monitoring device 30*d* updates the intra-network communication status table 53*d*-2 (FIG. 16) to the intra-network communication status table 53*d*-3 (FIG. 18). The processes at this time are the same as those performed by the monitoring device 30*d* when the communication of the arrow A10 starts. The notification unit 45*d* transmits a state notification message relating to the communication status of the communication device 10*d* via the transmission unit 32*d* by multicast (arrow A17).

When the monitoring device 30*a* receives the state notification message illustrated by the arrow A16, the determination unit 44*a* determines whether the unauthorized access has newly occurred. Here, the determination unit 44*a* determines whether the communication devices 5*a* to 5*c* which are outside of the corporate network 1 are capable of accessing the communication device 10*d* in the confidential area using the path illustrated by the arrow A15, and either the communication path of the arrows A2 to A5, or the arrows A7, A10, and A13. As illustrated in FIG. 9 and the like, when the communication device 5*c* uses the arrows A4, A5, A10, A15, and A13, it is possible to secure the communication path which passes from the communication device 5*c*, through the communication device 10*a*, the communication device 10*b*, the communication device 10*d*, and the communication device 10*c*, and returns to the communication device 5*c*. Therefore, the determination unit 44*a* determines that a new unauthorized access has occurred.

The determination unit 44*a* updates the intra-network communication status table 53*a*-4 (FIG. 16) as illustrated in the intra-network communication status table 53*a*-5 (FIG. 18) using the notification of the state notification message by the arrow A18.

Note that, the processes which are described with reference to FIGS. 9 to 18 are exemplary. For example, the transmission and reception timing of the state notification messages and the join request messages in the arrows A16 to A18 may be changed according to the implementation.

Figure 19:
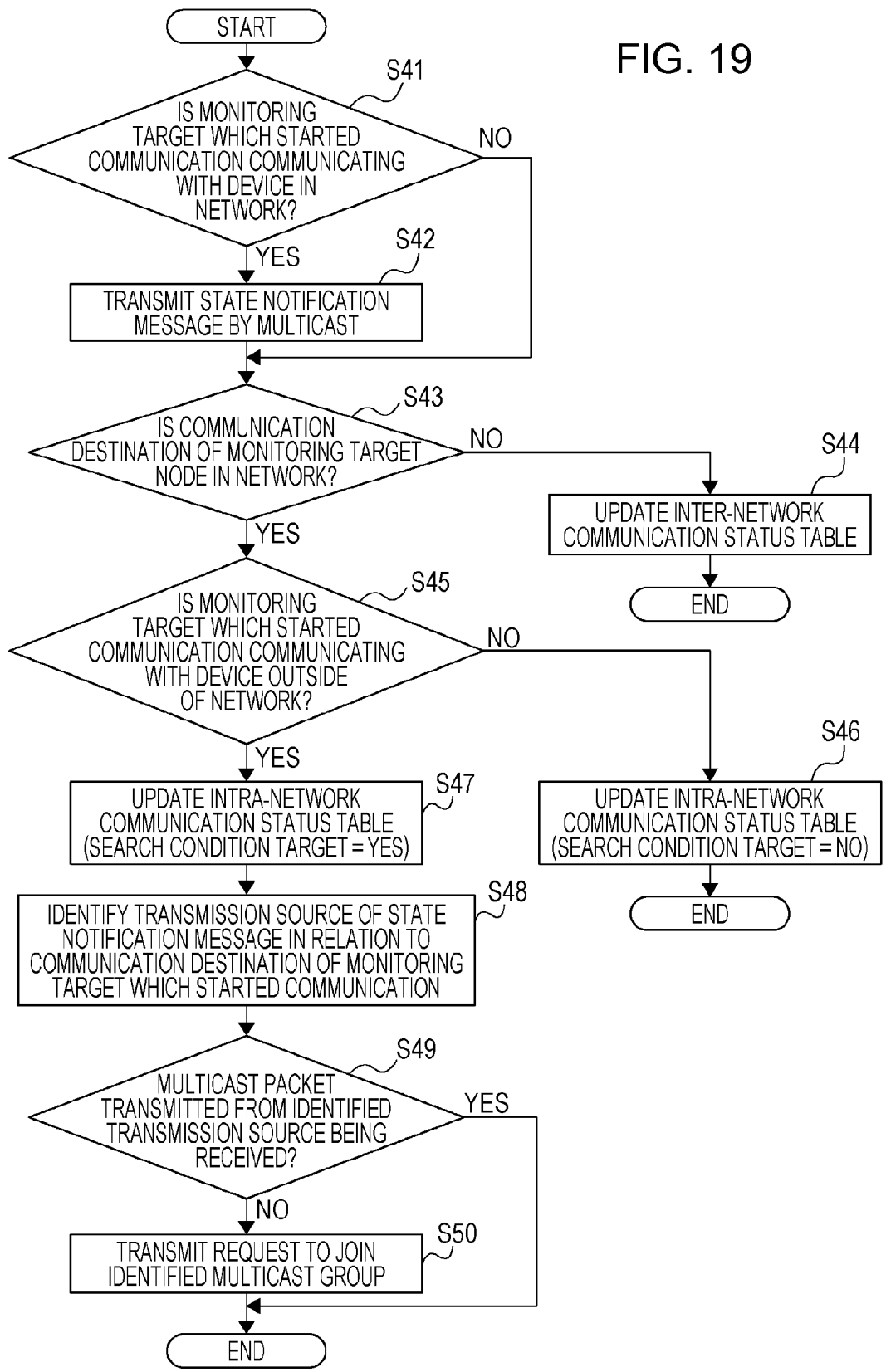
FIG. 19 is a flowchart illustrating an example of the processes which are performed by the monitoring device which transmits a state notification message.

FIG. 19 is a flowchart illustrating an example of the processes which are performed by the monitoring device 30 which transmits a state notification message. Note that, in FIG. 19, the network is the corporate network 1. When there is a notification from the analysis processing unit 41 indicating that the communication device 10 which is the monitoring target has started communicating, the notification unit 45 determines whether the communication device 10 which is the monitoring target which has started communicating is communicating with a device in the network (operation S41). When the communication device 10 which is the monitoring target which has started communicating is performing communication with a device in the network, the notification unit 45 transmits a state notification message by multicast (yes in operation S41, operation S42). The analysis processing unit 41 determines whether the communication destination of the device which has started communicating is a node in the network (operation S43). When the communication destination is not a node in the network, the analysis processing unit 41 updates the inter-network communication status table 52 and ends the process (operation S44).

Meanwhile, when the communication destination is a node in the network, the analysis processing unit 41 determines whether the monitoring target which has started communicating is communicating with a device which is outside of the network (operation S45). When the monitoring target which has started communicating is not communicating with a device which is outside of the network, the analysis processing unit 41 determines that the communication path in the network which is newly generated is not generated by unauthorized access. Therefore, the analysis processing unit 41 updates the intra-network communication status table 53 by adding the information of the communication which is newly generates after setting the detection condition target=no (no in operation S45, operation S46).

In operation S45, when the monitoring target which has started communicating is determined to be communicating with a device which is outside of the network, the analysis processing unit 41 determines that there is a likelihood that the communication path in the network which is newly generated is generated by unauthorized access. Therefore, the analysis processing unit 41 updates the intra-network communication status table 53 by adding the information of the communication which is newly generates after setting the detection condition target=yes (yes in operation S45, operation S47). The join request unit 42 identifies the transmission source of the state notification message indicating the communication status in relation to the communication destination of the monitoring target which has started communicating (operation S48). When the join request unit 42 has not received the multicast packet which is transmitted from the identified transmission source, the join request unit 42 transmits a join request for joining the identified multicast group using the transmission source (no in operation S49, operation S50). When the multicast packets which are transmitted from the identified transmission source are being received, the reception unit 42 ends the process (no in operation S49).

Figure 20:
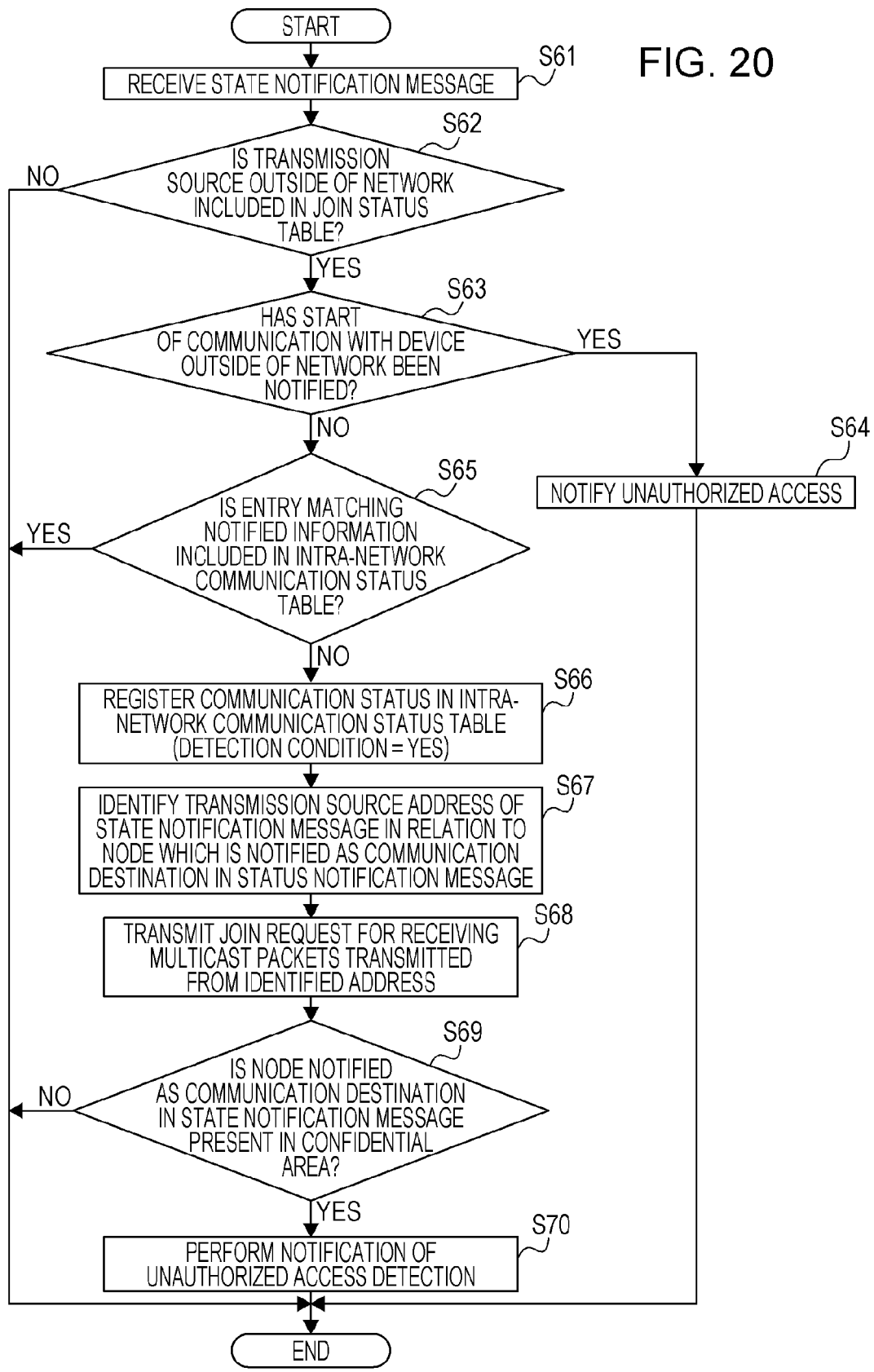
FIG. 20 is a flowchart illustrating an example of the processes which are performed by the monitoring device which receives a state notification message.

FIG. 20 is a flowchart illustrating an example of the processes which are performed by the monitoring device 30 which receives a state notification message. Note that, when the communication device 10 which is the monitoring target is communicating with a device which is outside of the corporate network 1, the monitoring device 30 receives the state notification message. Note that, the processes in FIG. 20 are exemplary, and modifications such as performing the processes of the operations S69 and S70 before the processes of the operations S65 to S68 may be performed.

The reception unit 31 receives the state notification message (operation S61). The determination unit 44 determines whether the transmission source of the state notification message is included in the join status table 54 (operation S62). When the determination unit 44 determines that the transmission source of the state notification message is not included in the join status table 54, the determination unit 44 ends the process (no in operation S62). When the determination unit 44 determines that the transmission source of the state notification message is included in the join status table 54, the determination unit 44 determines whether notification of the start of communication with a device which is outside of the network has been performed using the monitoring device table 51 (yes in operation S62, operation S63). When notification of the start of communication with a device which is outside of the network has been performed, the determination unit 44 notifies the device which carries out the operation of the fact that unauthorized access is detected (yes in operation S63, operation S64).

When notification of the start of communication with a device which is inside the network has been performed, the determination unit 44 determines whether an entry which matches the notified information is included in the intra-network communication status table 53 (no in operation S63, operation S65). When the intra-network communication status table 53 includes an entry which matches the notified information, the determination unit 44 ends the process (yes in operation S65). When the entry which matches the notified information is not registered, the determination unit 44 registers the communication status to the intra-network communication status table 53 (operation S66). At this time, the determination unit 44 sets detection condition target display=yes in the entry which is newly registered. The join request unit 42 identifies the transmission source address of the state notification message in relation to the node which is notified as the communication destination in the state notification message (operation S67). The join request unit 42 transmits a join request for receiving the multicast packets which are transmitted from the identified address via the transmission unit 32 (operation S68). The determination unit 44 determines whether the node which is notified as the communication destination by the state notification message is in the confidential area using the monitoring device table 51 (operation S69). When the node which is notified as the communication destination is not within the confidential area, the determination unit 44 ends the process (no in operation S69). Meanwhile, when the node which is notified as the communication destination is within the confidential area, the determination unit 44 notifies the device which carries out the operation of the fact that unauthorized access is detected (yes in operation S69, operation S70)

In the case in which the operation S63 of FIG. 20 is determined to be yes, the monitoring target of the monitoring device 30 is communicating with the outside of the corporate network 1, and the device which is the monitoring target and is communicating in the corporate network 1 has started communication with the outside of the corporate network 1. Accordingly, in the process of the operation S63, as in the case C1 of FIG. 2, it is possible to detect a type of unauthorized access in which the intrusion path from the outside and the transmission path of the data are different. Meanwhile, in the case in which the operation S70 is determined to be yes, the monitoring target of the monitoring device 30 is communicating with the outside of the corporate network 1, and the device which is the monitoring target and is communicating in the corporate network 1 is accessing the confidential area. Therefore, in the process of the operation S69, as in the case C2 of FIG. 2, it is possible to detect a type of unauthorized access in which the intrusion path from the outside and the transmission path of the data are the same.

In this manner, each monitoring device 30 can acquire the information for detecting unauthorized access via the communication devices 10 that are being monitored from the monitoring devices 30 which are monitoring the communication destinations of the communication devices 10 being monitored. Here, since each of the monitoring devices 30 transmits the communication status of the communication devices 10 which are the monitoring targets by multicast, the transmission and reception of the communication status can be expected to be performed efficiently in a short time.

Figure 21:
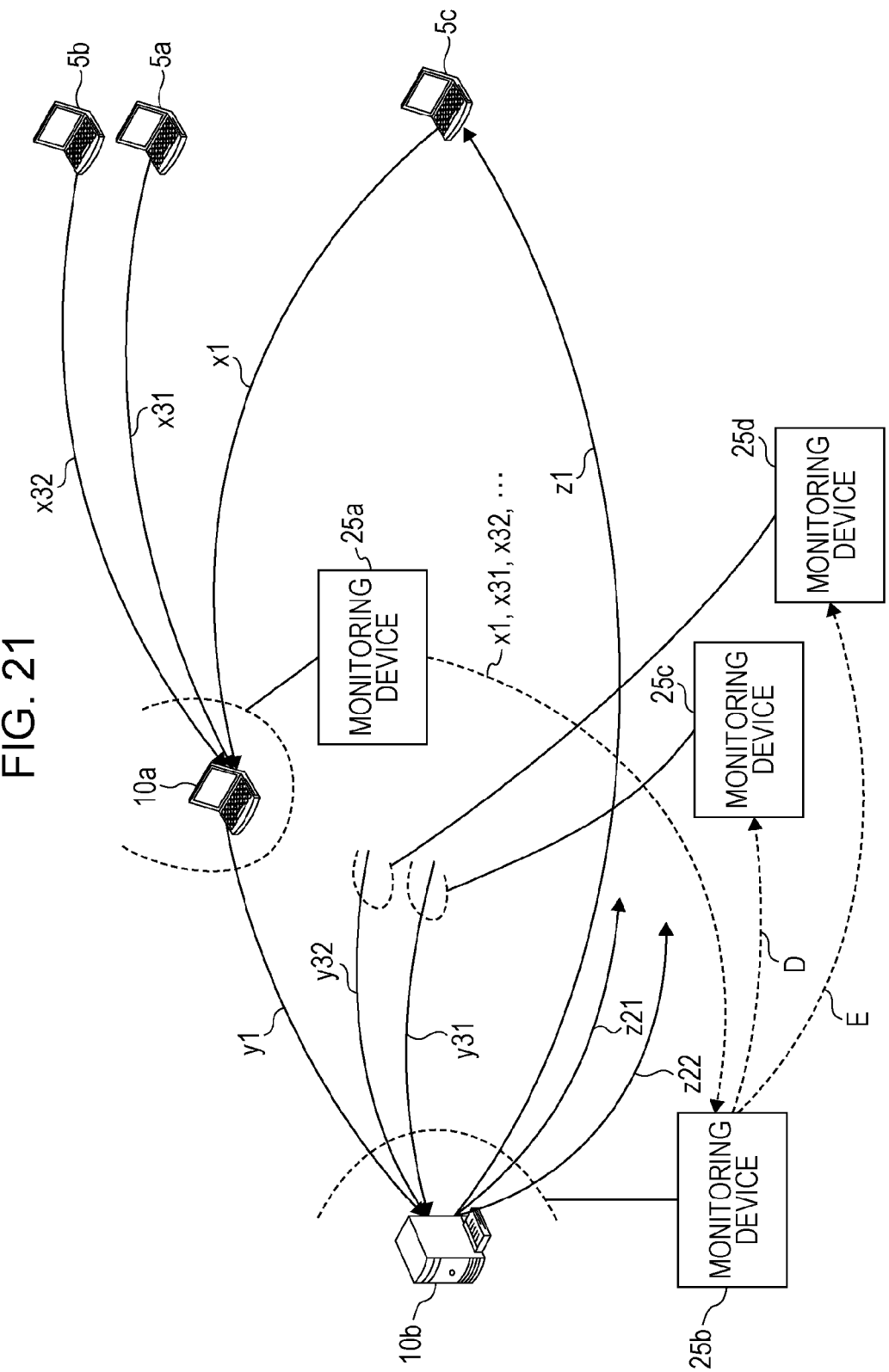
FIG. 21 is a diagram illustrating an example of a case in which the state notification is performed by unicast communication.

On the other hand, FIG. 21 exemplifies a case in which the state notification is performed using unicast communication. In FIG. 21, the monitoring device 25 is used instead of the monitoring device 30. A monitoring device 25a monitors the communication status of the communication device 10a, and the monitoring device 25b monitors the communication status of the communication device 10b. In FIG. 21, the communication paths are illustrated with solid lines, and the transmission and reception paths of the state notifications are illustrated with dotted lines. In FIG. 21, in the same manner as the example described with reference to FIGS. 2 to 18, the communication devices 5a to 5c are devices which are not included in the corporate network 1, and the communication device 10a and the communication device 10b are devices in the corporate network 1.

The communication device 10a starts communication x1 with the communication device 5c, starts communication x31 with the communication device 5a, and starts communication x32 with the communication device 5b. The monitoring device 30a notifies the monitoring device of the device which is communicating with the communication device 10a of the communication status of the communication device 10a after identifying the device which is communicating with the communication device 10a in the corporate network 1. In FIG. 21, in order to render the drawing easy to understand, only the communication device 10b is illustrated as the communication destination of the communication device 10a in the corporate network 1; however, the number of communication destinations is arbitrary and may further change dynamically. Therefore, when the monitoring device transmits the state notification using unicast communication, the processing load of the monitoring device which notifies the information of the device which is the monitoring target is great.

When the notification of the communication status is performed using unicast communication, there is a case in which the monitoring device relays the communication status to another monitoring device. In the example of FIG. 21, the monitoring device 25a notifies the monitoring device 25b of the information of the communications x1, x31, and x32 using the notification (x1, x31, and x32). Meanwhile, the communication device 10b which is the monitoring target of the monitoring device 25b performs communication y1, y32, y31, z1, z21, and z22. Therefore, for example, the monitoring device 25b transmits both the information which is acquired from the monitoring device 25a and the information which is obtained from the monitoring target of the monitoring device 25b to the monitoring device 25c which is monitoring the communication destination of the communication y31. In other words, the monitoring device 25b transmits a notification D which contains the information of the communication x1, x31, x32, y1, y32, z1, z21, and z22 to the monitoring device 25c. The monitoring device 25b also transmits a notification E which contains the information of the communication x1, x31, x32, y1, y31, z1, z21, and z22 to the monitoring device 25d in the same manner. In this manner, when the monitoring information is relayed using unicast transmission, there is a concern that, in addition to the processing load of each monitoring device being great, the delay time from when a certain communication starts until the information relating to the communication is notified will be increased.

Therefore, in the method according to the first embodiment, since a certain monitoring device may not relay the information which is obtained by another monitoring device, the monitoring device is capable of easily notifying the communication status while suppressing an increase in the amount of data which is transmitted by the monitoring device. Since the delay time from when the start of communication until notification of the information relating to the started communication is performed is short in comparison to a case in which the communication status is notified by unicast, it is possible to swiftly perform the detection of unauthorized access.

In the first embodiment, as described with reference to FIGS. 9 and 10, the information relating to communication in the corporate network 1 which is started by the communication device 10 in the corporate network 1 before the communication device 10 starts the communication with the communication device 5 which is outside of the corporate network 1 is not transmitted and received by the monitoring devices 30. Here, the communication in the corporate network 1 which is started before the communication with the communication device 5 which is outside of the corporate network 1 is performed is considered not to be communication which is started by unauthorized access from the communication device 5. In other words, in the monitoring method according to the first embodiment, since information other than the communication which is highly likely to be started by unauthorized access is not transmitted and received between the monitoring devices 30, the monitoring method is efficient, and the processing load of the monitoring devices 30 is also reduced.

Since the amount of information of the processing target in the monitoring device 30 is reduced, the detection process of unauthorized access in the monitoring device 30 is simplified. When the communication device 10 which is the monitoring target of the monitoring device 30 communicates with a device which is outside of the corporate network 1, and subsequently, the communication device 10 which can be accessed from the monitoring target accesses a device which is outside of the corporate network 1, there is a likelihood of unauthorized access of the case C1 illustrated in FIG. 2. Meanwhile, when the communication device 10 which is the monitoring target of the monitoring device 30 communicates with a device which is outside of the corporate network 1, and subsequently, the communication device 10 which can be accessed from the monitoring target accesses a device which is in the confidential area, there is a likelihood of unauthorized access of the case C2 illustrated in FIG. 2. Therefore, as illustrated in FIG. 20, each of the monitoring devices 30 detects unauthorized access when the monitoring device 30 receives notification that the communication device 10 in the corporate network 1 has accessed either the communication device 5 which is outside of the corporate network 1 or the communication device 10 which is in the confidential area (operations S64, S70). In other words, until the monitoring device 30 detects communication in the monitoring target with the communication device 5 which is outside of the corporate network 1, the monitoring device 30 does not acquire the communication status of the communication device 10 which can be accessed from the communication device 10 which is the monitoring target, and thus the determination process can be said to be simplified.

Second Embodiment

In the second embodiment, description will be given of an example of the processes which are performed when ending the acquisition of the state notification message due to the communication device 10 which is the monitored destination of the monitoring device 30 ending the communication. Note that, in the following description, the corporate network 1 and the devices which are included in the external network, the connection relationships between the communication devices 10 and the monitoring devices 30, and the like are the same as in the first embodiment. Accordingly, the communication devices 5a to 5c are devices which are not included in the corporate network 1. In the initial state, as illustrated in FIG. 18, the monitoring device 30a holds T30a-18, the monitoring device 30c holds T30c-18, and the monitoring device 30d holds T30d-18. The monitoring device 30b holds the information illustrated in T30b-12 of FIG. 16.

(1) End of Communication with Device Outside of Corporate Network 1

Figure 22:
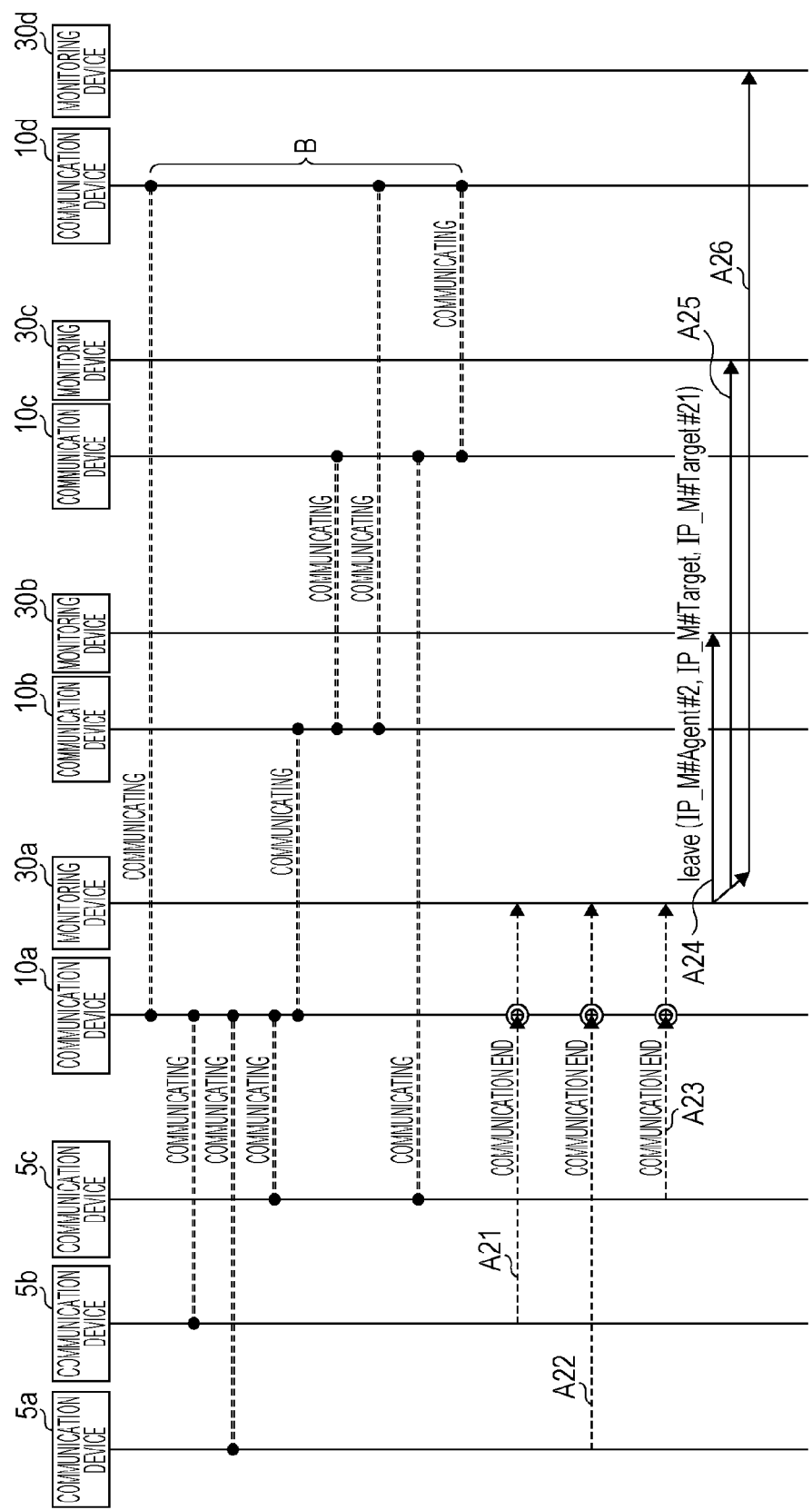
FIG. 22 is a sequence diagram illustrating an example of the processes which are performed when a communication device ends communication with a communication device outside of a corporate network.

FIG. 22 is a sequence diagram illustrating an example of the processes which are performed when the communication device 10a ends communication with all of the communication devices 5 outside of the corporate network 1. In the initial state, the communication of the arrows A1 to A5, A7, A10, A13, and A15 in FIG. 9 is being performed. B in FIG. 22 illustrates the paths which are communicating.

As illustrated in the arrow A21, when a control message for ending the communication between the communication device 5b and the communication device 10a is transmitted and received, the monitoring device 30a detects that the communication between the communication device 5b and the communication device 10a will end. Note that, the end of the communication is detected using the procedure which is described with reference to FIGS. 5A and 5B of the first embodiment.

Figure 23:
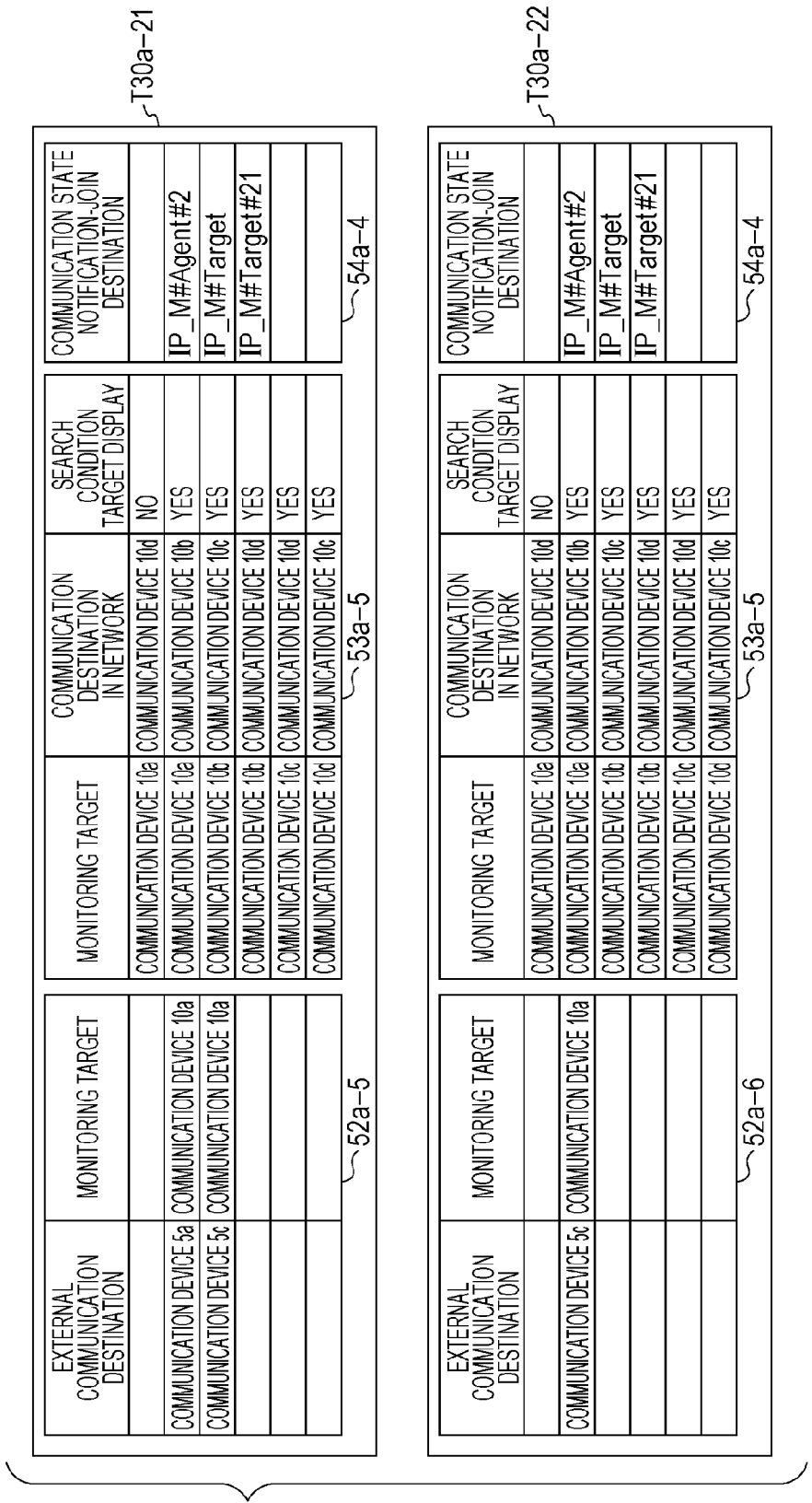
FIG. 23 is a diagram illustrating an example of information held by the monitoring device.

T30a-21 of FIG. 23 is an example of the information which is held by the monitoring device 30a when the end of the communication according to the arrow A21 is detected. The analysis processing unit 41a identifies that the communication destination (the communication device 5a) of the communication device 10a in the communication which ends is not included in the corporate network 1 using the monitoring device table 51 (FIG. 6). The analysis processing unit 41 deletes the entry which corresponds to the communication which ends from the inter-network communication status table 52a. Accordingly, the inter-network communication status table 52a-4 (FIG. 18) is updated as illustrated in the inter-network communication status table 52a-5 (FIG. 23). Since the entry remains in the inter-network communication status table 52a-5 after the update, the analysis processing unit 41 ends the process.

Next, as illustrated by the arrow A22, the monitoring device 30a detects that the communication between the communication device 5a and the communication device 10a will end. In the monitoring device 30a, since the same process as that described with the arrow A21 is performed, the inter-network communication status table 52a-5 is updated to the inter-network communication status table 52a-6. Therefore, the monitoring device 30a holds the information illustrated in T30a-22.

As illustrated by the arrow A23, FIG. 24 is an example of the information which is held by the monitoring device 30a when the communication between the communication device 5c and the communication device 10a ends. When the analysis processing unit 41a which detects the end of the communication between the communication device 5c and the communication device 10a updates the inter-network communication status table 52a-6 to the inter-network communication status table 52a-7, the entry is removed from the post-update inter-network communication status table 52a. Since all of the communication with devices which are outside of the corporate network 1 have ended, the analysis processing unit 41a determines that there is no longer a likelihood of unauthorized access which uses the communication path between the communication device 10a and the devices which are outside of the corporate network 1 occurring. Therefore, the analysis processing unit 41a deletes the information of the communication zone in which notification of the start of communication is transmitted from another of the monitoring devices 30 while the communication device 10a is communicating with a device which is outside of the corporate network 1 from the intra-network communication status table 53a. The analysis processing unit 41 sets detection condition target display=no in relation to all of the entries which remain in the intra-network communication status table 53a. Therefore, the intra-network communication status table 53a-5 (FIG. 23) is updated as illustrated in the intra-network communication status table 53a-6. The analysis processing unit 41a notifies the generation unit 46a of the fact that the communication device 10a is not communicating with a device which is outside of the corporate network 1.

The generation unit 46a updates the join status table 54a-4 (FIG. 23) to the join status table 54a-5 by deleting all the entries from the join status table 54a. The generation unit 46a generates the leave request message in order to end the reception of the multicast packets which are transmitted from all of the transmission sources which are included in the join status table 54a-4.

FIG. 25 is an example of the leave request message. FIG. 25 illustrates an example of the leave request message when the leave request is performed using multicast listener discovery version 2 (MLDv2). The leave request message includes an L2 header, an IP header, and data. Information indicating that the data portion is a multicast listener report, and a combination of the multicast address and the transmission source address relating to the multicast group to leave are included in Type of the data portion. Therefore, according to the leave request message of FIG. 25, the multicast address is Multicast Addr#m, and setting is performed such that the packets in which the transmission source address is set to IP_M#Agent#2 are no longer transferred to the monitoring device 30a. Similarly, the setting is performed such that packets in which the multicast address is Multicast Addr#m and the transmission source address is set to IP_M#Target or IP_M#Target#2 are no longer transferred to the monitoring device 30a. The arrows A24 and A25 of FIG. 22 illustrate a situation in which the leave request message is transmitted. Note that, the leave request message being transmitted to the transmission source of the multicast packet is also depicted with regard to the leave request message; however, the leave request message is used in the setting of packets which transfer the multicast packets, or the like.

Figure 26:
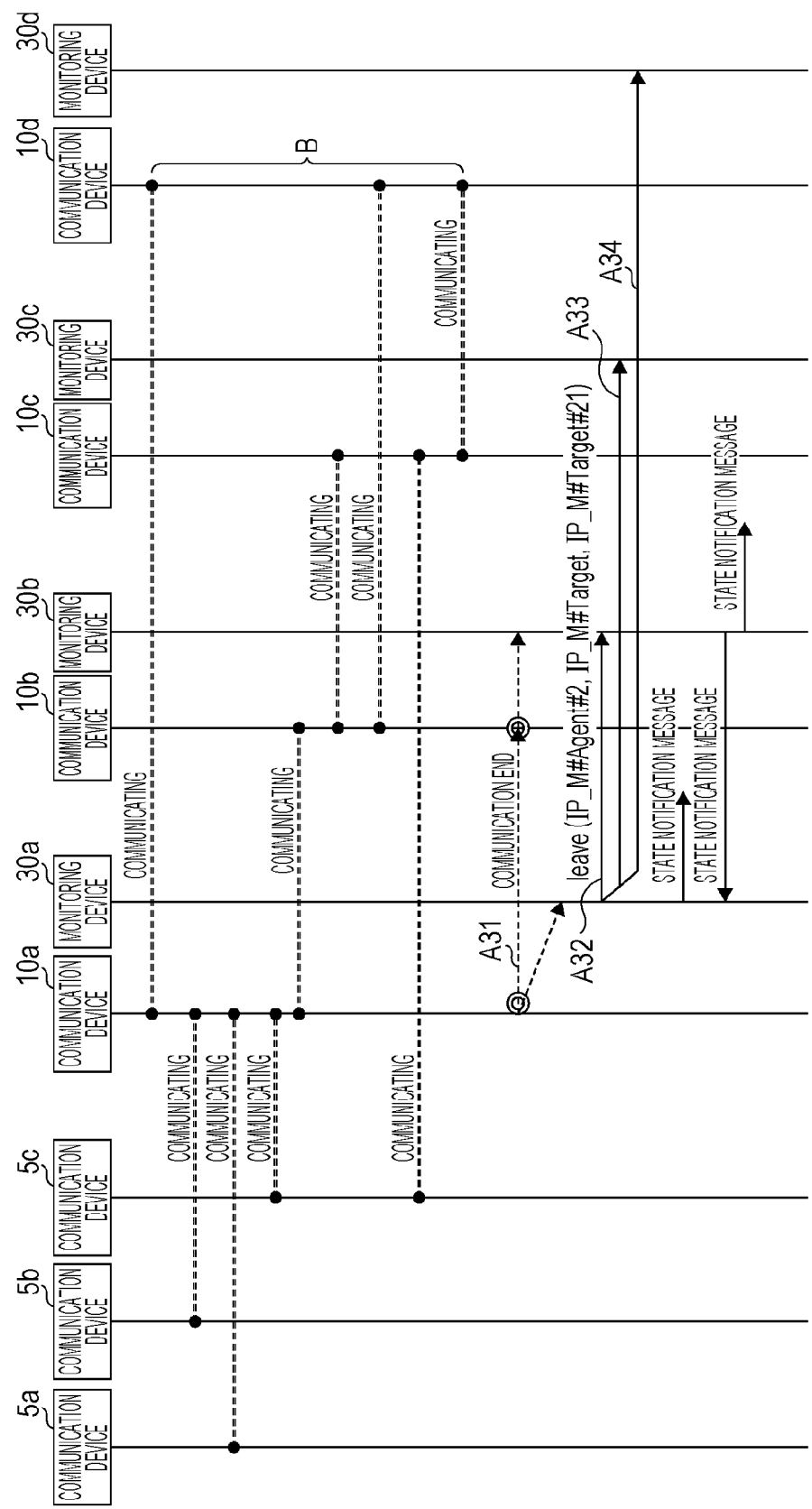
FIG. 26 is a sequence diagram illustrating an example of the processes which are performed when ending the communication in the corporate network which is started after the communication device starts performing communication with the outside.

(2) End of Communication in Corporate Network 1 Started after Start of Communication with Outside FIG. 26 is a sequence diagram illustrating an example of the processes which are performed by the monitoring device 30 when ending the communication in the corporate network 1 which is started after the communication device 10 starts performing communication with the outside. In FIG. 26, in the initial state, the communication illustrated by B is assumed to be established. Accordingly, as illustrated by the arrows A1 to A5, A7, A10, A13, and A15 in FIG. 9, the communication device 10a does not directly communicate with devices in the corporate network 1 other than the communication device 10b and the communication device 10d, and performs communication via the communication device 10b.

As illustrated by the arrow A31, the communication between the communication device 10a and the communication device 10b is ended. The analysis processing unit 41a which detects the end of the communication between the communication device 10b and the communication device 10a classifies the communication devices 10 which are accessible into communication devices 10 which the communication device 10a accesses via the communication device 10b and terminals which the communication device 10a is directly communicating with. Note that, the communication devices 10 which are accessible are the communication devices 10 which are registered in the intra-network communication status table 53a-5 (FIG. 18). Specific examples of the classification method will be described later. The analysis processing unit 41a deletes information of the communication with the communication device 10 for which communication has ended and information of the communication devices 10 which are accessed via the communication device 10b from the intra-network communication status table 53a.

FIG. 27 is an example of the information which is held by the monitoring device 30a when the communication between the communication device 10a and the communication device 10b ends. According to the processes of the analysis processing unit 41a, the intra-network communication status table 53a-5 is updated as illustrated in the intra-network communication status table 53a-7 in FIG. 27. The generation unit 46a identifies the transmission source of the multicast packet which is received in order to acquire the communication status of the devices included in entries which are deleted from the intra-network communication status table 53a due to the end of the communication between the communication device 10a and the communication device 10b. Note that, the generation unit 46a can identify the transmission source address using the monitoring device table 51, as appropriate. The generation unit 46a updates the join status table 54a-4 (FIG. 18) to the join status table 54a-6 (FIG. 27) by deleting the entries which include the identified transmission source address from the join status table 54a. The generation unit 46a generates a leave request message in order to end the reception of the multicast packets which are transmitted from the transmission sources which are deleted from the join status table 54a-4. Here, the leave request message is also generated for packets in which the multicast address is Multicast Addr#m and the transmission source address is set to IP_M#Agent#2, IP_M#Target, or IP_M#Target#2. The arrows A32 to A34 of FIG. 26 illustrate a situation in which the leave request message is transmitted. In the example of FIG. 26, the state notification message which is transmitted from the monitoring device 30b corresponding to the communication ended illustrated by the arrow A31 is transmitted to the monitoring device 30a; however, the state notification messages which are subsequently generated by the monitoring devices 30b to 30d stop reaching the monitoring device 30a.

(3) End of Communication with Portion of Devices in Corporate Network 1

Figure 28:
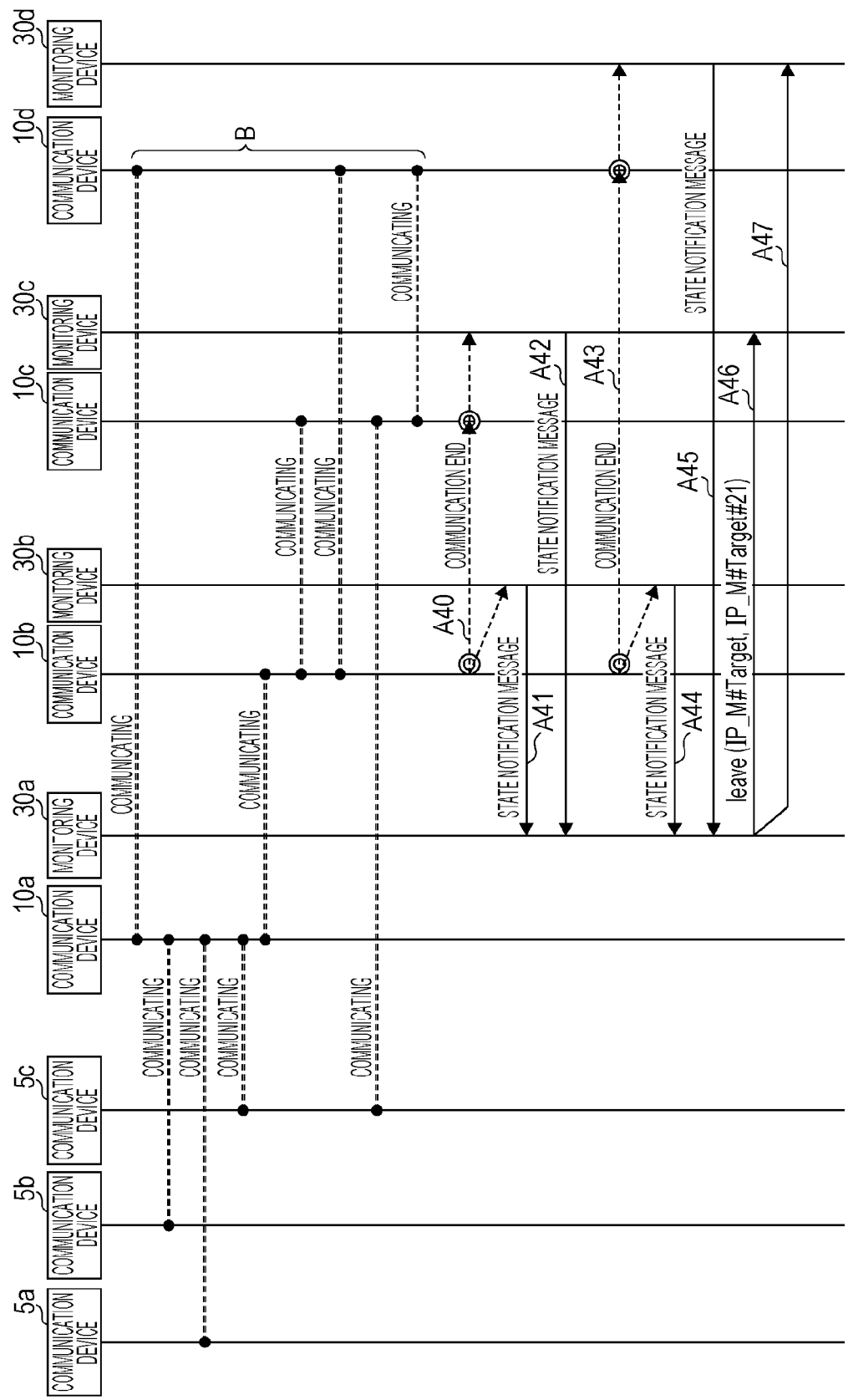
FIG. 28 is a sequence diagram illustrating an example of the processes which are performed by the monitoring device which monitors a communication device which ends communication with a portion of the communication devices in the corporate network.

FIG. 28 is a sequence diagram illustrating an example of the processes which are performed by the monitoring device 30 which monitors the communication device 10 which ends communication with a portion of the devices in the corporate network 1. In FIG. 28, in the initial state, the communication illustrated by B is assumed to be established. Hereinafter, description will be given of the processes in a case in which the communication with a portion of the devices in the corporate network 1 is ended with the ending of the corporate network with devices other than the communication device 10a.

As illustrated by the arrow A40, the communication between the communication device 10b and the communication device 10c is ended. A state notification message notifying the end of the communication between the communication device 10b and the communication device 10c is transmitted from both the monitoring device 30b and the monitoring device 30c (arrows A41 and A42). The determination unit 44a identifies the communication devices 10 which will no longer be capable of communication due to the end of communication between the communication device 10b and the communication device 10c using the state notification message. In this example, as illustrated in FIG. 9, even if the communication between the communication device 10b and the communication device 10c is disconnected, the communication device 10a can communicate with the communication device 10b via the path of the arrow A5. The communication device 10a is capable of accessing the communication device 10d using bidirectional communication by the communication path illustrated by the arrows A5 and A10, and is capable of accessing the communication device 10c using bidirectional communication by the communication path illustrated by the arrows A5, A10, and A15. Therefore, the determination unit 44 determines that there are no communication devices 10 which may not be accessed. Therefore, the determination unit 44a deletes the information of a zone in which the end of the communication is notified using the state notification message from the intra-network communication status table 53a.

T30a-42 of FIG. 29A is an example of the information which is held by the monitoring device 30a after the processes of the state notification messages illustrated by the arrows A41 and A42. According to the processes of the determination unit 44a, the intra-network communication status table 53a-5 (FIG. 18) is updated as illustrated in the intra-network communication status table 53a-8. According to the arrows A40 to A42, the updating of the information in the monitoring device 30b and the monitoring device 30c is also performed.

T30b-42 of FIG. 29A is an example of the information which is held by the monitoring device 30b. When the analysis processing unit 41b of the monitoring device 30b recognizes that the communication between the communication device 10b and the communication device 10c is ended via the acquisition unit 34b, the information relating to the communication between the communication device 10b and the communication device 10c is deleted from the intra-network communication status table 53b. Therefore, the intra-network communication status table 53b-3 (FIG. 16) is updated as illustrated in the intra-network communication status table 53b-4.

Figure 29B:
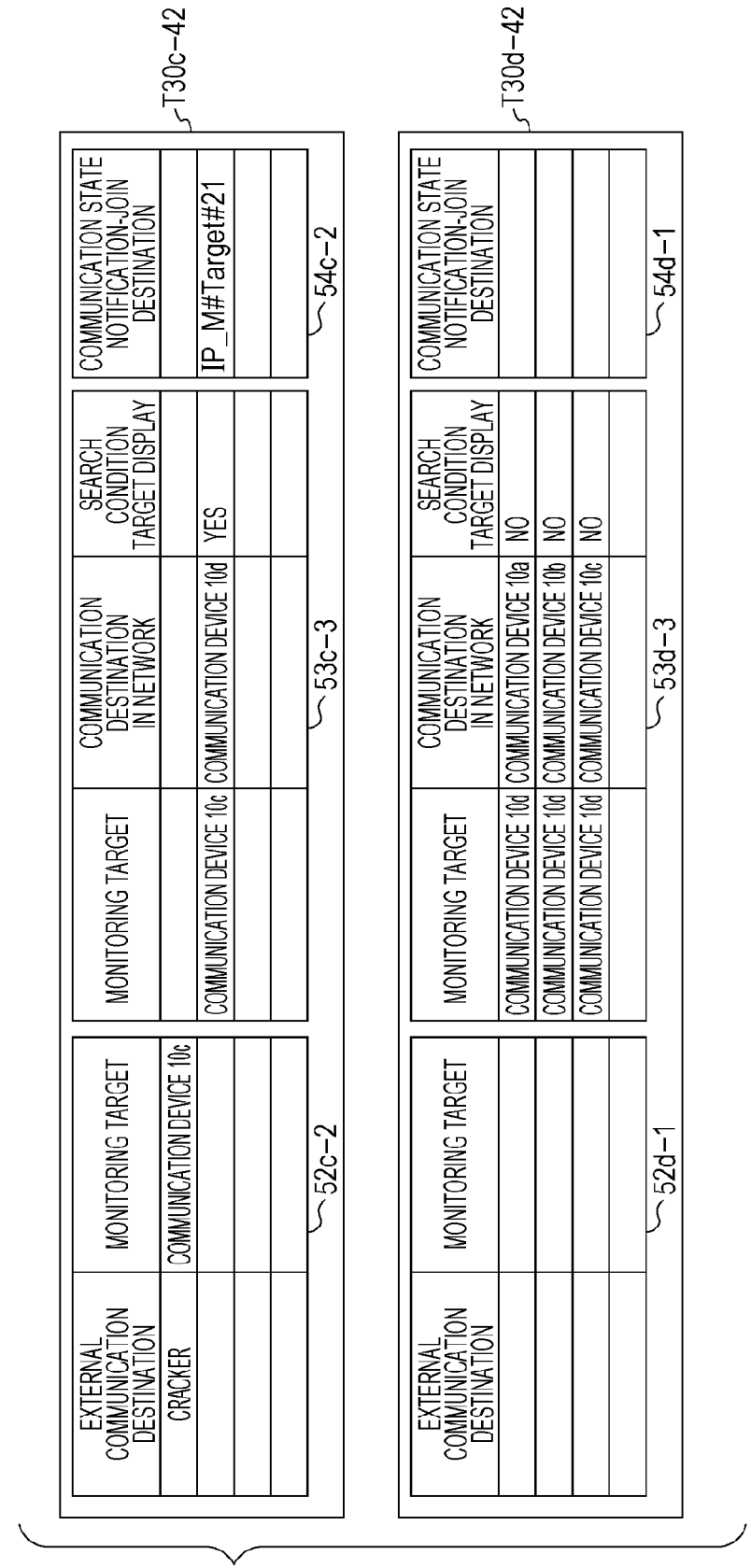
FIG. 29B is a diagram illustrating an example of information held by the monitoring device.

T30c-42 of FIG. 29B is an example of the information which is held by the monitoring device 30c at a stage after the process of the arrow A42. When the analysis processing unit 41c of the monitoring device 30c recognizes that the communication between the communication device 10b and the communication device 10c is ended via the acquisition unit 34c, the information relating to the communication between the communication device 10b and the communication device 10c is deleted from the intra-network communication status table 53c. Therefore, the intra-network communication status table 53c-2 (FIG. 18) is updated as illustrated in the intra-network communication status table 53c-3. Note that, the communication device 10c is not generating the path which accesses the other communication devices 10 via the communication device 10b after establishing communication with a device which is outside of the corporate network 1. Therefore, even if the communication between the communication device 10b and the communication device 10c ends, the join status table 54c-2 is not updated. Note that, since the updating of the information based on the communication of the arrows A40 to A42 is not performed by the communication device 10d, the communication device 10d holds the information illustrated in T30d-42 of FIG. 29B.

Next, as illustrated by the arrow A43 of FIG. 28, the end of the communication between the communication device 10b and the communication device 10d has ended. The monitoring device 30a receives a state notification message notifying the end of the communication between the communication device 10b and the communication device 10d from both the monitoring device 30b and the monitoring device 30d (arrows A44 and A45).

The determination unit 44a identifies the communication devices 10 which will no longer be capable of communication due to the end of communication between the communication device 10b and the communication device 10d using the state notification message. In this example, after the path illustrated by the arrow A7 in FIG. 9 is disconnected, the path illustrated by the arrow A10 is also disconnected. Therefore, the communication device 10a may no longer be capable of accessing the communication device 10c and the communication device 10d using the paths which are not disconnected among the communication paths in the corporate network 1 which are generated after the communication device 10a establishes communication with a device outside of the corporate network 1. Therefore, the determination unit 44a deletes entries of communication which is established after the communication with a device outside of the corporate network 1 and which includes either the communication device 10c or the communication device 10d from the intra-network communication status table 53a.

Figure 30A:
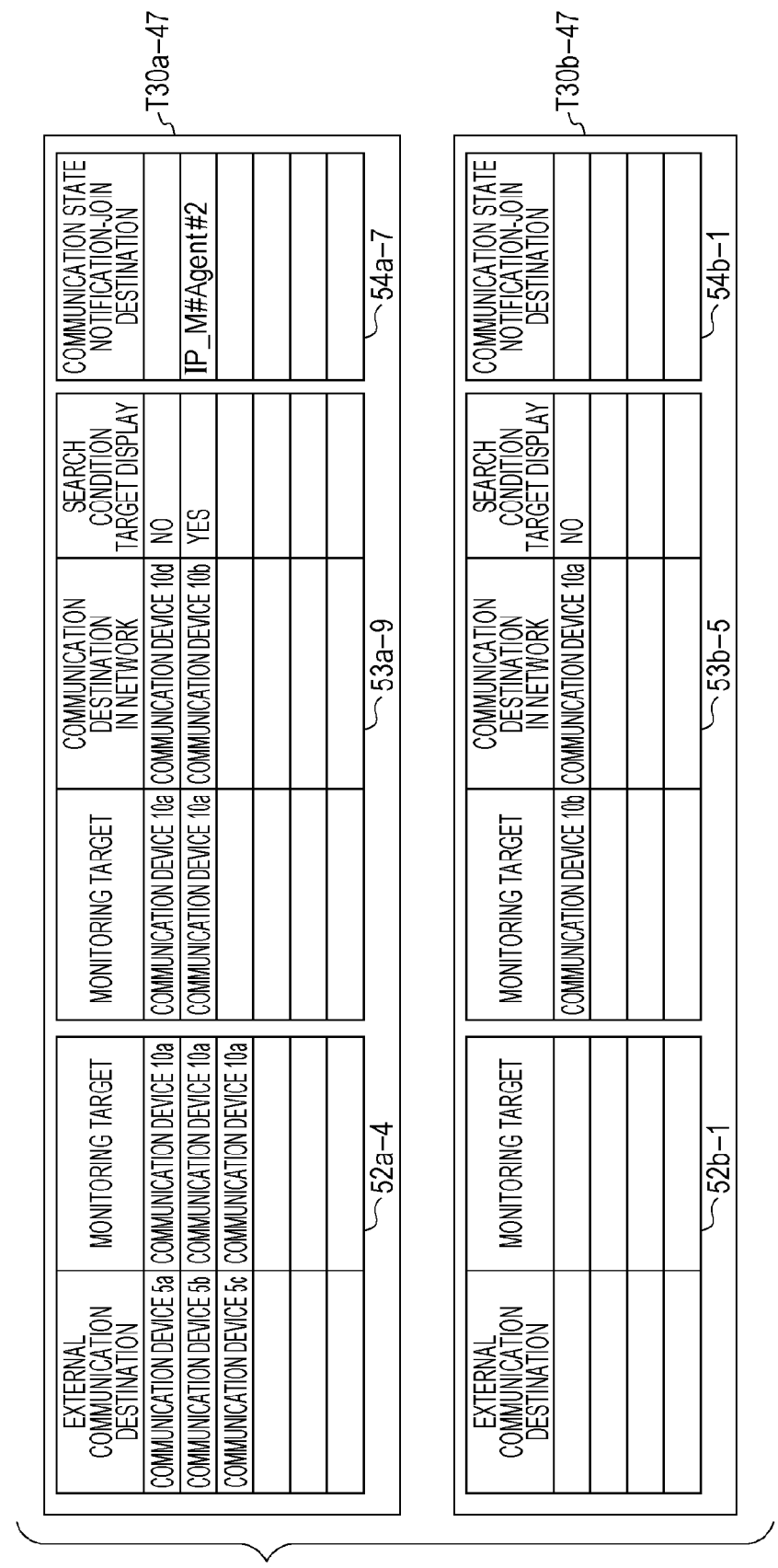
FIG. 30A is a diagram illustrating an example of information held by the monitoring device.

T30a-47 of FIG. 30A is an example of the information which is held by the monitoring device 30a at a stage after the process of the arrow A47. According to the processes of the determination unit 44a, the intra-network communication status table 53a-8 (FIG. 29A) is updated as illustrated in the intra-network communication status table 53a-9. The generation unit 46a identifies the transmission source of the multicast packet which is received in order to acquire the communication statuses which are included in the entries which are deleted from the intra-network communication status table 53a due to the end of the communication between the communication device 10b and the communication device 10d. Also at this time, the generation unit 46a uses the monitoring device table 51, as appropriate. The generation unit 46a updates the join status table 54a-4 (FIG. 29A) to the join status table 54a-7 (FIG. 30A) by deleting the entries which include the identified transmission source address from the join status table 54a. The generation unit 46a generates a leave request message in order to end the reception of the multicast packets which are transmitted from the transmission sources which are deleted from the join status table 54a-4. Here, the leave request message is also transmitted for packets in which the multicast address is Multicast Addr#m and the transmission source address is set to IP_M#Target or IP_M#Target#2 (arrows A46 and A47).

T30b-47 of FIG. 30A is an example of the information which is held by the monitoring device 30b at a stage after the process of the arrow A47. When the analysis processing unit 41b of the monitoring device 30b recognizes that the communication between the communication device 10b and the communication device 10d has ended via the acquisition unit 34b, the information of the communication between the communication device 10b and the communication device 10d is deleted from the intra-network communication status table 53b. Therefore, the intra-network communication status table 53b-4 (FIG. 29A) is updated as illustrated in the intra-network communication status table 53b-5.

FIG. 30B is an example of the information which is held by the monitoring device 30d at a stage after the process of the arrow A47. The processes of the monitoring device 30d which accompany the end of the communication between the communication device 10b and the communication device 10d are the same as those of the monitoring device 30b. Therefore, the intra-network communication status table 53d-3 (FIG. 29B) is updated as illustrated in the intra-network communication status table 53d-4.

(4) Example of Detection Method of Accessible Communication Devices 10

Hereinafter, description will be given of an example of a search method of connected paths, exemplifying a case in which the end of communication is performed as illustrated in FIG. 28. Note that, even when the communication in the corporate network 1 ends as illustrated in FIG. 26, the same processes are executed. In the following description, the determination unit 44 uses three types of table, a link determination table A, a link determination table B, and a linked node table. The link determination table A records communication zones which are accessible using the communication path which is established during the communication with a device which is outside of the corporate network 1 from the node (the origin node) which is specified as the origin. Meanwhile, the link determination table B records communication zones which may not be accessible using the communication path which is established during the communication with a device which is outside of the corporate network 1 from the origin node. The linked node table is a list of the nodes which are accessible using the communication path which is established during the communication with a device which is outside of the corporate network 1 from the origin node.

Figure 31:
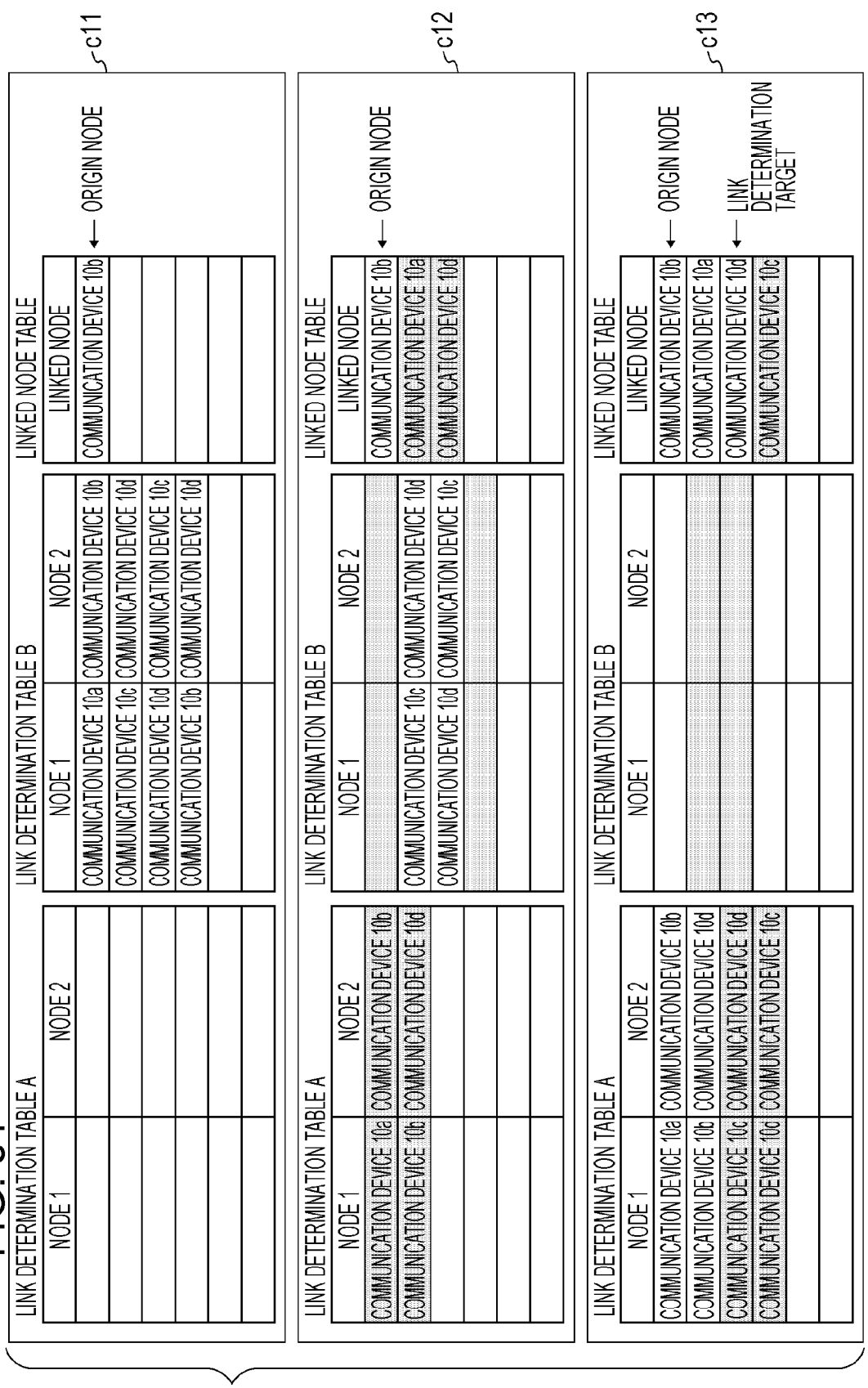
FIG. 31 is a diagram illustrating an example of a search method of a connected path.

FIG. 31 illustrates an example of the data which is held when the determination unit 44a of the monitoring device 30a receives the state notification messages illustrated by the arrows A41 and A42. A case c11 is the data for the process which is generated when the determination unit 44a receives the state notification messages illustrated by the arrows A41 and A42. The determination unit 44a assumes that the information of a communication zone which is accessible via another communication device 10 in the intra-network communication status table 53a is a communication zone which may not be accessible. Note that, the determination unit 44a excludes the communication zone for which the end of communication has been notified by the state notification message from the determination targets. In other words, the determination unit 44a copies the information other than that of the zones for which the end of communication has been notified by the state notification message among the zones which are set as detection condition target display=yes in the intra-network communication status table 53a to the link determination table B. When the monitoring device 30a receives the state notification messages of the arrows A41 and A42, since the monitoring device 30a is holding the intra-network communication status table 53a-5 (FIG. 18), the determination unit 44a generates the link determination table B as illustrated in the case c11. The determination unit 44a specifies the device of one of the ends of the communication zone for which the end of communication is notified as the origin node. In the example of the case c11, the determination unit 44a records the communication device 10b in the linked node table as the origin node.

Next, the determination unit 44a determines that the zone in which the devices which are included in the linked node table are set to a node 1 or a node 2 is a zone in which communication is possible. Therefore, the determination unit 44a deletes the information of the zone in which the devices which are included in the linked node table are set to a node 1 or a node 2 from the link determination table B and records the information in the link determination table A. The determination unit 44a adds the information of the devices which are not registered in the linked node table of the ends of the zone which are recorded in the link determination table A to the linked node table. Therefore, the information which is illustrated in the case c11 is updated as illustrated in a case c12.

The determination unit 44a sets one of the devices other than the origin node in the linked node table to the device which is the link determination target. Here, it is assumed that the communication device 10d is selected as the link determination target. The determination unit 44a deletes the communication zone which includes the link determination target from the link determination table B as a zone in which communication is possible, and records the communication zone in the link determination table A, the determination unit 44a repeats the same determination process while changing the link determination target until there are either no more entries in the link determination table B or the determination process is performed using all of the devices other than the origin node in the linked node table as the link determination target. The zones remaining in the link determination table B when the determination process has ended are the zones which the origin node may not be capable of accessing from the communication paths which are established during the communication with the devices which are outside of the corporate network 1. Meanwhile, the zones which are included in the link determination table A when the determination process has ended are the communication zones which the origin node can access from the communication paths which are established during the communication with the devices which are outside of the corporate network 1 even after the end of the communication which is notified by the state notification message.

Here, Here, since the communication device 10d is the link determination target, the link determination table A, the link determination table B, and the linked node table of the case c12 are updated as illustrated in a case c13. When the communication unit 10a which is the monitoring target is included in the linked node table, the determination unit 44a determines that the communication device 10a is capable of accessing the devices which are included in the linked node table. Since there are no entries in the link determination table B, when the communication of the arrows A40 to A42 is performed, the determination unit 44a determines that the zone which the communication device 10a may no longer be capable of accessing is not present outside of the zone between the communication device 10b and the communication device 10c for which the communication has ended.

Note that, description is given of a case in which the communication device 10b is the origin node with reference to FIG. 31; however, the origin node may be set as the communication device 10c.

Figure 32A:
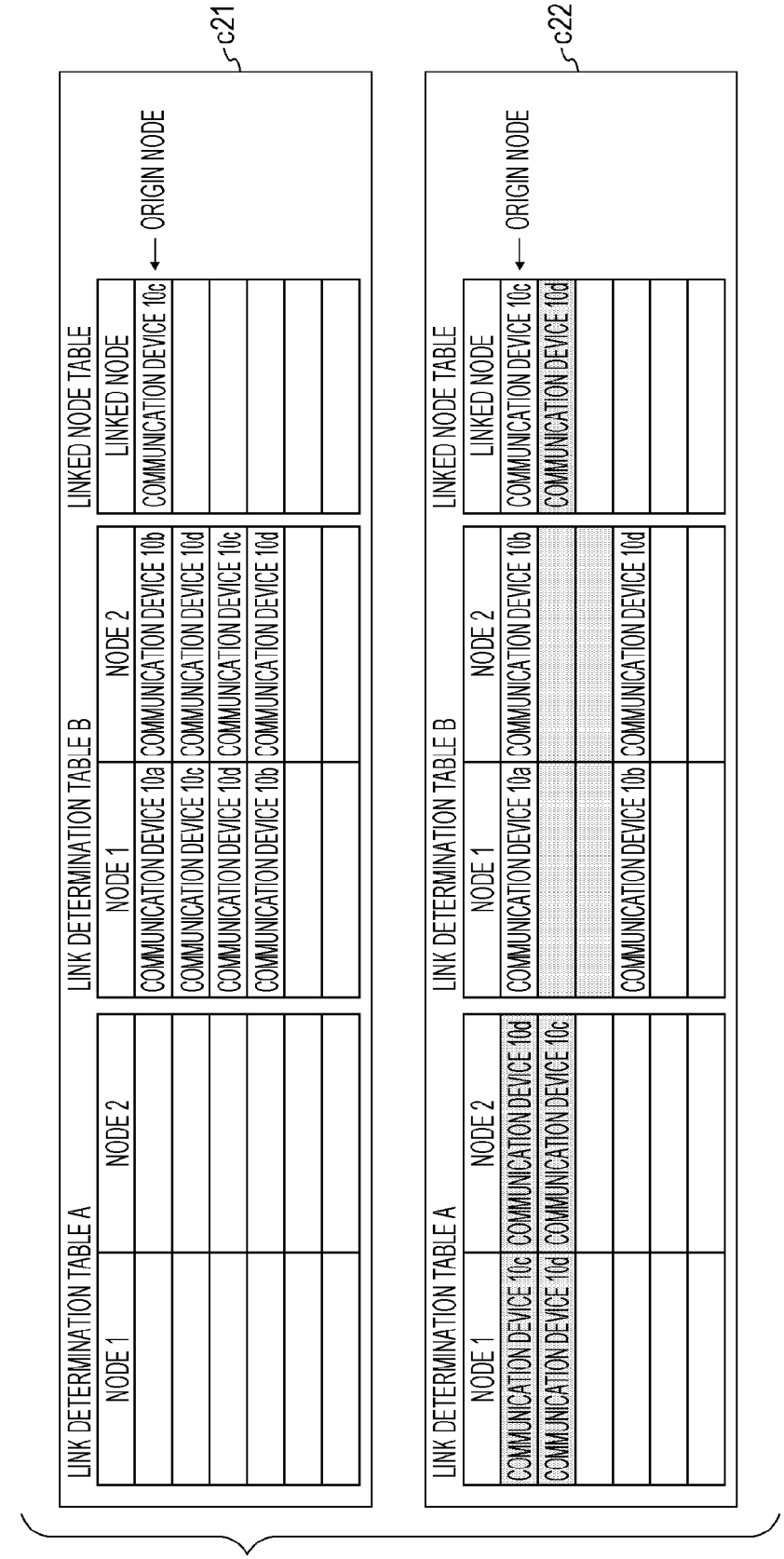
FIG. 32A is a diagram illustrating an example of a search method of a connected path.
Figure 32B:
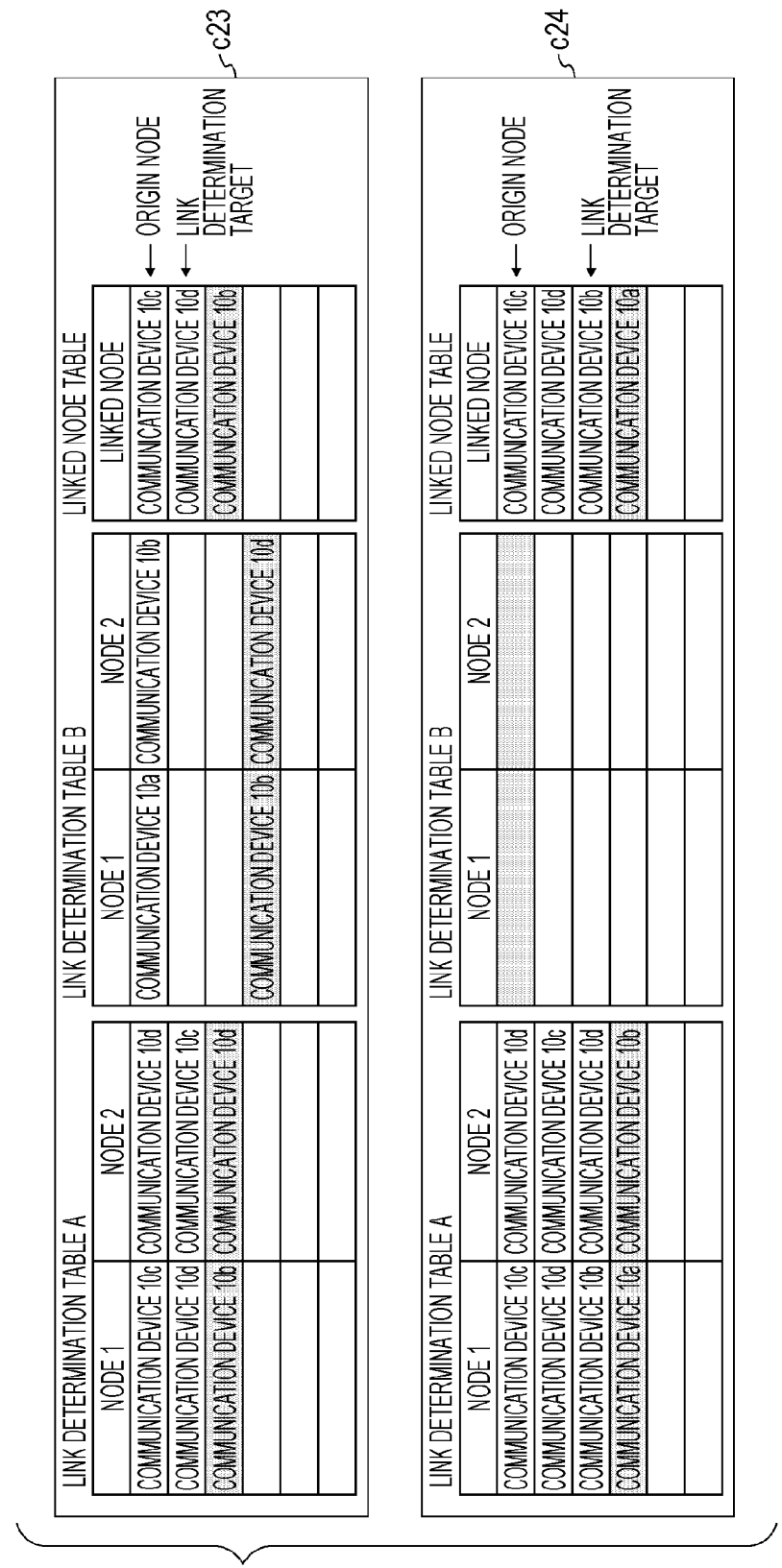
FIG. 32B is a diagram illustrating an example of a search method of a connected path.

FIGS. 32A and 32B are an example of a case in which the determination unit 44a sets the origin node as the communication device 10c and searches the connected paths when the state notification messages illustrated by the arrows A41 and A42 are received. The determination unit 44a generates the information illustrated in a case c21 by setting the origin node as the communication device 10c and performing the same processes as in the case c11. Next, the determination unit 44a deletes the information of the zone in which the communication device 10c is set to a node 1 or a node 2 from the link determination table B and records the information in the link determination table A. The determination unit 44a adds the information of the devices which are not registered in the linked node table of the ends of the zone which are recorded in the link determination table A other than the communication device 10c to the linked node table. Therefore, the information which is illustrated in the case c21 is updated as illustrated in a case c22. The determination unit 44a sets the communication device 10d as the device which is the link determination target, deletes the communication zone between the communication device 10d and the communication device 10b from the link determination table B, and records the communication zone in the link determination table A. The determination unit 44a adds the communication device 10b to the linked node table. Therefore, the information which is illustrated in the case c22 is updated as illustrated in a case c23. Subsequently, the determination unit 44a sets the communication device 10b as the device which is the link determination target, deletes the communication zone between the communication device 10b and the communication device 10a from the link determination table B, and records the communication zone in the link determination table A. The determination unit 44a adds the communication device 10a to the linked node table. Therefore, the information which is illustrated in the case c23 is updated as illustrated in a case c24.

As described with reference to FIGS. 31 to 32B, when there are no communication zones which the communication devices 10, which are the monitoring targets, may not be capable of accessing with the end of the communication in a certain communication zone, the devices accessible to the monitoring target will not change whichever of the ended zones is used as the origin node. However, when there is a communication zone which the communication devices 10, which are the monitoring targets, may not be capable of accessing with the end of the communication, the devices (the linked nodes) which the monitoring target can access differ depending on the origin node.

Figure 33:
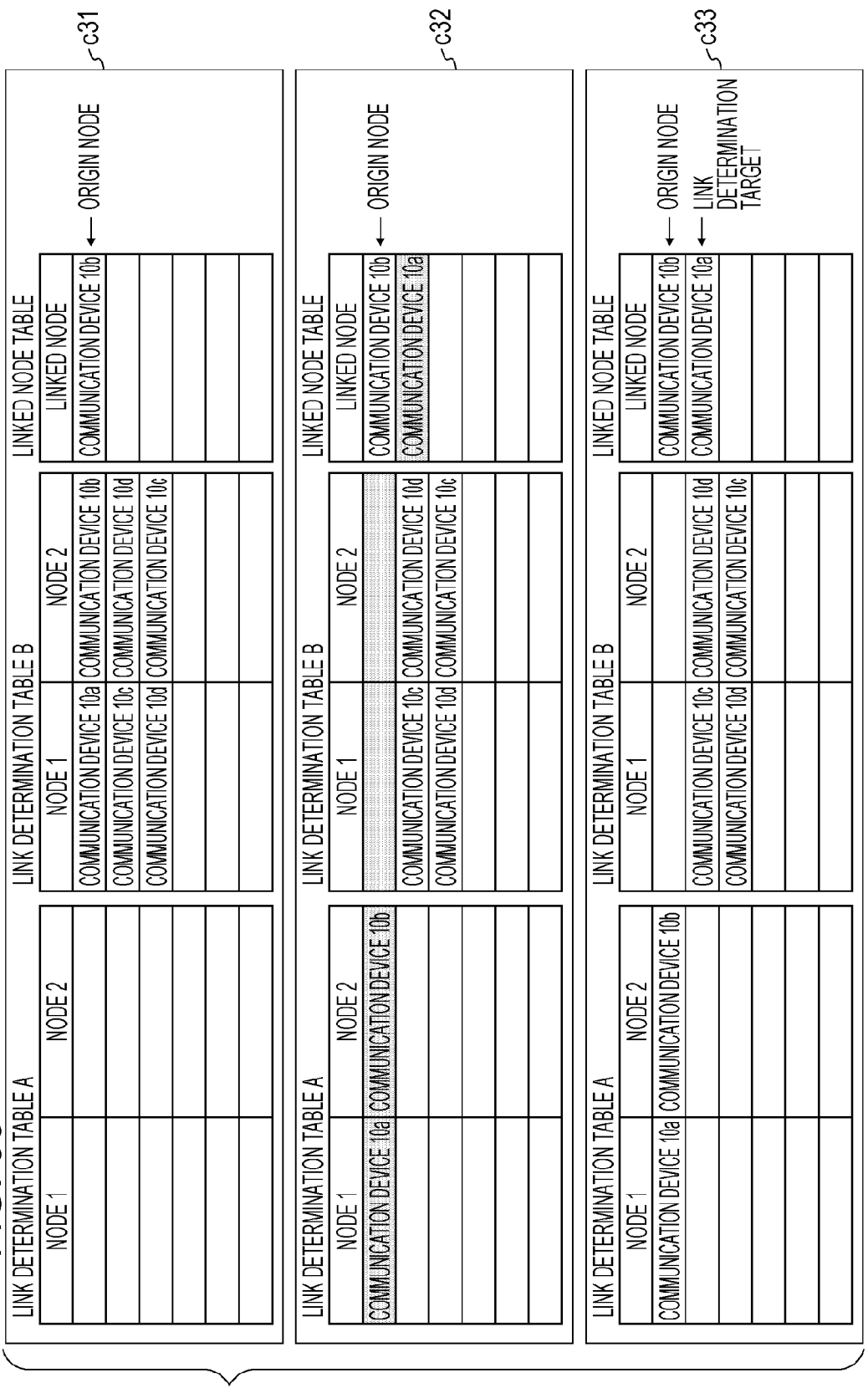
FIG. 33 is a diagram illustrating an example of a search method of a connected path.

FIG. 33 illustrates an example of the data which is held when the determination unit 44a of the monitoring device 30a receives the state notification messages illustrated by the arrows A45 and A46. When the monitoring device 30a receives the state notification messages of the arrows A45 and A46, since the monitoring device 30a is holding the intra-network communication status table 53a-8 (FIG. 29A), the determination unit 44a generates the link determination table B as illustrated in a case c31. In the case c31, the communication device 10b is registered in the linked node table as the origin node.

Next, the determination unit 44a deletes the information of the zone between the communication device 10a and the communication device 10b from the link determination table B and records the information in the link determination table A. The determination unit 44a adds the information of the communication device 10a to the linked node table. Therefore, the information which is illustrated in the case c31 is updated as illustrated in a case c32.

The determination unit 44a searches the zones which include the communication device 10a in the link determination table B using the communication device 10a as the link determination target. Here, there is no zone including the communication device 10a in the link determination table B. Therefore, as illustrated in a case c33, the communication zone between the communication device 10c and the communication device 10d remains in the link determination table B. Therefore, the determination unit 44a determines that the communication device 10a which is the monitoring target of the monitoring device 30a may not be capable of accessing the communication zone between the communication device 10c and the communication device 10d. Therefore, the communication device 10d deletes the zone in which the end of the communication with the zones remaining in the link determination table B is notified from the intra-network communication status table 53*a*-8 (FIG. 29A), and generates the intra-network communication status table 53*a*-9 (FIG. 30A).

Figure 34:
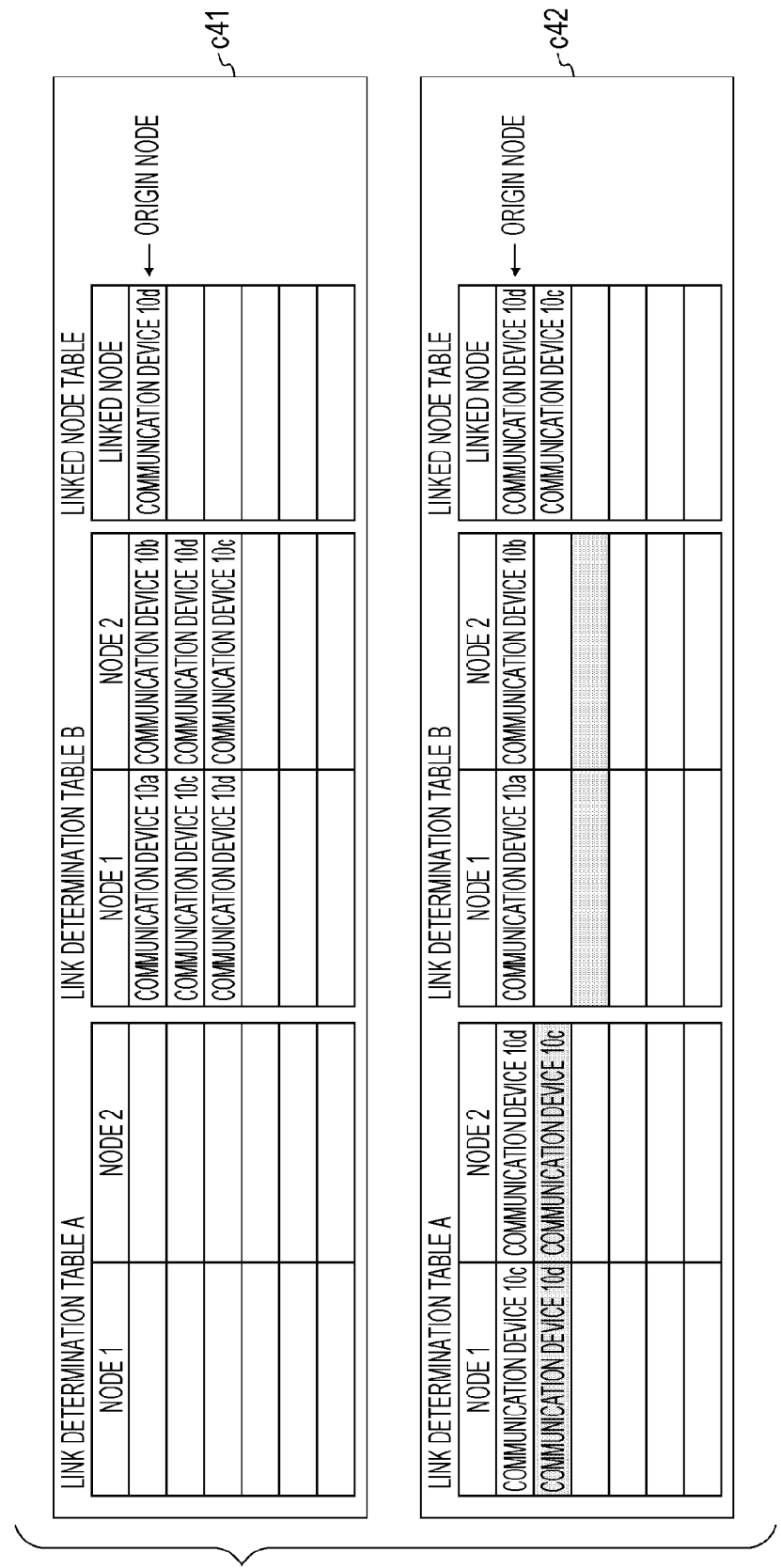
FIG. 34 is a diagram illustrating an example of a search method of a connected path.

A case c41 of FIG. 34 illustrates an example of the data which the determination unit 44*a* generates based on the state notification messages illustrated by the arrows A45 and A46 when the communication device 10*d* is specified as the origin node. The determination unit 44*a* generates the link determination table B as illustrated in the case c41 using the intra-network communication status table 53*a*-8 (FIG. 29A). Next, the determination unit 44*a* deletes the information of the zone between the communication device 10*d* and the communication device 10*c* from the link determination table B and records the information in the link determination table A. The determination unit 44*a* adds the information of the communication device 10*c* to the linked node table. Therefore, the information which is illustrated in the case c41 is updated as illustrated in a case c42. The determination unit 44*a* searches the zones which include the communication device 10*c* in the link determination table B using the communication device 10*c* as the link determination target; however, there are no zones which include the communication device 10*c* in the link determination table B. Therefore, the communication zone between the communication device 10*a* and the communication device 10*b* which is included in the link determination table B of the case c42 remains as a zone in which communication from the communication device 10*d* may not be possible. In the processes illustrated in FIG. 34, the communication device 10*a* is not included in the linked node table. Therefore, it can be understood that the communication device 10*a* may not be capable of accessing the devices which are included in the linked node table which is illustrated in the case c42 from the communication path which the communication device 10*a* established during the communication with a device which is outside of the corporate network 1. The determination unit 44*a* identifies the zones which are included in the link determination table A as zones which the communication device 10*a* may not be capable of accessing via the communication path which is established during communication with devices which are outside of the corporate network 1.

Figure 35:
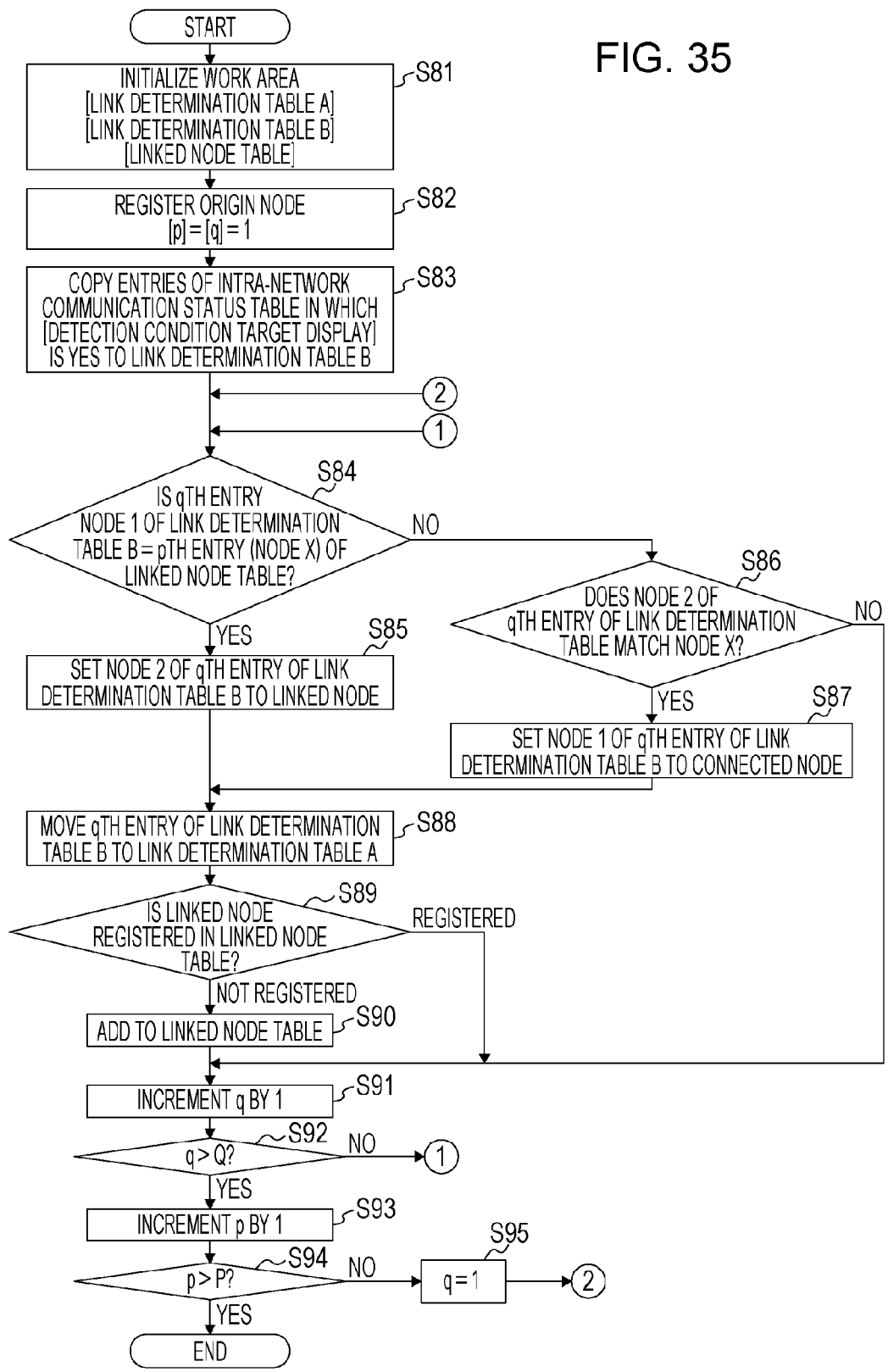
FIG. 35 is a flowchart illustrating an example of a search method of a connected path.

FIG. 35 is a flowchart illustrating an example of the search method of a connected path. When the determination unit 44 detects the end of the communication, the determination unit 44 initializes the link determination table A, the link determination table B, and the linked node table as the working area (operation S81). The determination unit 44 registers the origin node, and sets the variable p and the variable q to 1 (operation S82). Here, the variable p is used in order to sum the number of nodes in the linked node table which serve as the origin node or the link determination target, and the variable q is used in order to sum the number of entries in the link determination table B which serve as the targets of the determination process. The determination unit 44 copies the entries in which the detection condition target display=yes is set in a zone other than that in which the end of the communication has been notified in the intra-network communication status table 53 to the link determination table B (operation S83). The determination unit 44 determines whether the node 1 of the qth entry of the link determination table B is the pth entry (node X) of the linked node table (operation S84). When the node 1 of the qth entry of the link determination table B matches the node X, the determination unit 44 sets the node 2 of the qth entry of the link determination table B as the linked node (yes in operation S84, operation S85).

Meanwhile, when the node 1 of the qth entry of the link determination table B does not match the node X, the determination unit 44 determines whether the node 2 of the qth entry of the link determination table B matches with the node X (no in operation S84, operation S86). When the node 2 of the qth entry of the link determination table B matches the node X, the determination unit 44 sets the node 1 of the qth entry of the link determination table B to the linked node (yes in operation S86, operation S87). After the process of the operation S85 or the operation S87, the determination unit 44 moves the qth entry of the link determination table B to the link determination table A (operation S88). The determination unit 44 determines whether the linked node which is set in the operation S85 or the operation S87 is registered in the linked node table (operation S89). When the linked node which is set in the operation S85 or the operation S87 is not registered in the linked node table, the determination unit 44 adds the linked node to the linked node table (not registered in operation S89, operation S90). Subsequently, the variable q is incremented by 1 and compared with a constant Q (operations S91, S92). Here, the constant Q is the total number of entries in the link determination table B. The processes of the operations S84 to S91 are repeated until the variable q exceeds the constant Q (no in operation S92). Meanwhile, when the variable q exceeds the constant Q, the determination unit 44 increments the variable p by 1 and compares the variable p with a constant P (yes in operation S92, operations S93, S94). Here, the constant P is the total number of entries in the linked node table at present. When the variable p is less than or equal to the constant P, the determination unit 44 sets the variable q to 1 and repeats the processes from the operation S84 onward (no in operation S94, operation S95). Meanwhile, when the variable p exceeds the constant P, the determination unit 44 ends the process (yes in operation S94). Note that, in the operation S86, when the node 2 of the qth entry of the link determination table B does not match the node X, the processes of operation S91 onward are performed.

Figure 36A:
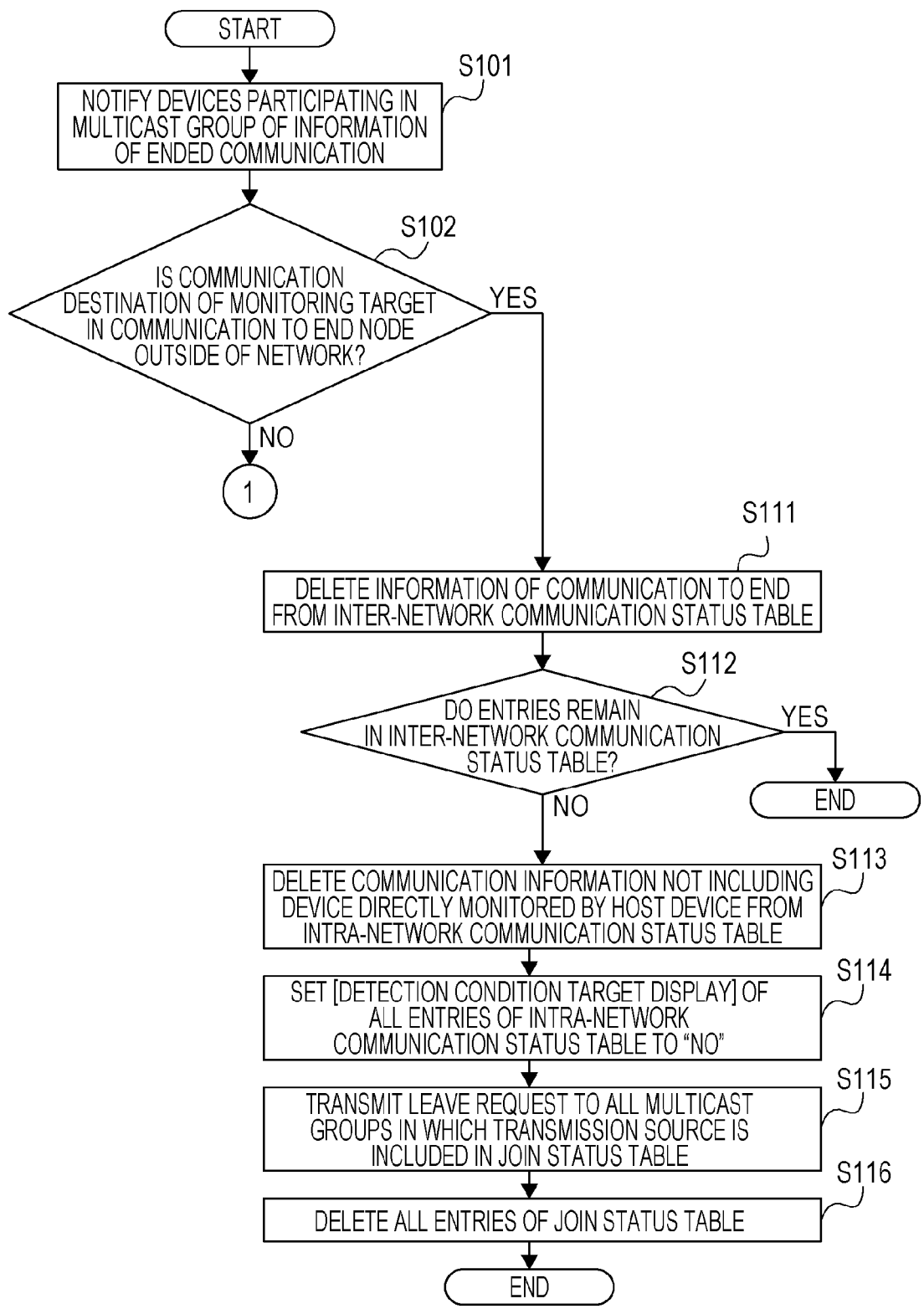
FIG. 36A is a flowchart illustrating an example of the processes of the monitoring device which detects the end of the communication.
Figure 36B:
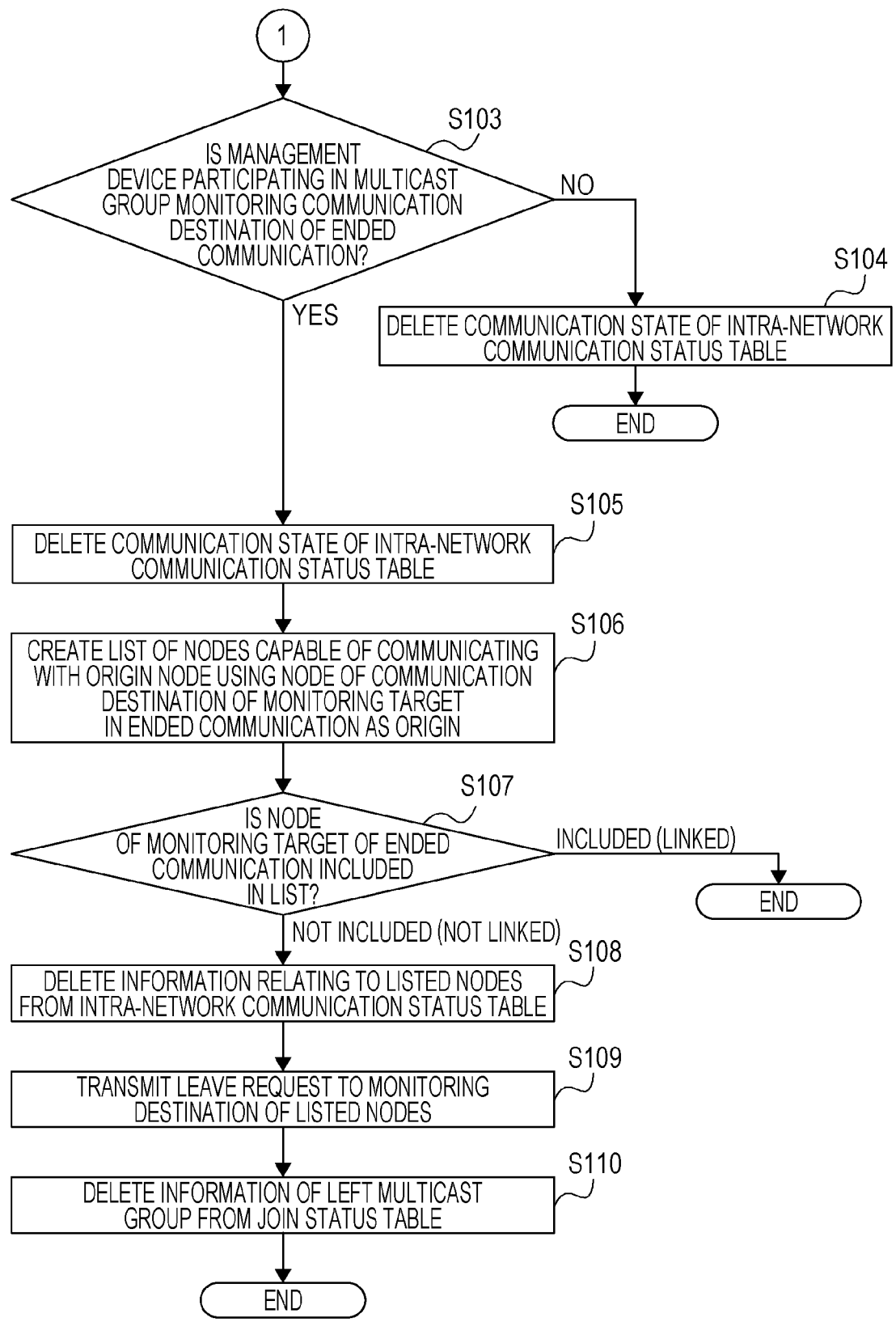
FIG. 36B is a flowchart illustrating an example of the processes of the monitoring device which detects the end of the communication.

FIGS. 36A and 36B are flowcharts illustrating an example of the processes of the monitoring device 30 which detects the end of the communication. The notification unit 45 of the monitoring device 30 which is monitoring the communication device 10 which will end the communication notifies the devices which are participating in the multicast group of the information of the communication which will end (operation S101). The analysis processing unit 41 determines whether the communication destination of the monitoring target in the communication which will end is a node which is outside of the network (operation S102). When the communication destination of the monitoring target is a node which is outside of the network, the analysis processing unit 41 deletes the information of the communication which will end from the inter-network communication status table 52 (yes in operation S102, operation S111). When entries remain in the inter-network communication status table 52, the analysis processing unit 41 ends the process (yes in operation S112). When entries do not remain in the inter-network communication status table 52, the analysis processing unit 41 deletes the communication information which does not include devices which are directly monitored by the monitoring device 30 from the intra-network communication status table 53 (operation S113). The analysis processing unit 41 sets detection condition target display=no in relation to all of the entries in the intra-network communication status table 53 (operation S114). The generation unit 46 transmits a leave request to all of the multicast groups in which the transmission source is included in join status table 54 via the transmission unit 32 (operation S115). The generation unit 46 deletes all of the entries in the join status table 54 (operation S116).

Meanwhile, when the communication destination of the monitoring target is a node in the network, the analysis processing unit 41 determines whether the communication destination is participating in the multicast group which monitors the communication destination of the monitoring target in the ended communication (operation S103). When the communication destination is not participating in the multicast group which monitors the communication destination, the analysis processing unit 41 deletes the information relating to the ended communication from the intra-network communication status table 53, and ends the process (no in operation S103, operation S104).

When the communication destination is participating in the multicast group which monitors the communication destination, the analysis processing unit 41 deletes the information relating to the ended communication from the intra-network communication status table 53, and ends the process (yes in operation S103, operation S105). The analysis processing unit 41 creates a list of nodes which are capable of communicating with the origin node using the node of the communication destination of the monitoring target in the ended communication as the origin node (operation S106). When the node of the monitoring target in the ended communication is included in the list, the analysis processing unit 41 ends the process (linked in operation S107). When the node of the monitoring target in the ended communication is not included in the list, the analysis processing unit 41 deletes the information including the listed nodes from the intra-network communication status table 53 (not linked in operation S107, operation S108). The generation unit 46 transmits a leave request to the monitoring device 30 which is monitoring the listed nodes (operation S109). The generation unit 46 deletes the information of the transmission source of the multicast group which is left from the join status table 54 (operation S110).

FIG. 37 is a flowchart illustrating an example of the processes which are performed by the monitoring device 30 which receives a state notification message which notifies the end of the communication. The determination unit 44 determines whether communication destination of monitoring target of transmission source of state notification message is a device in the network in relation to the communication for which the end of communication has been notified by the state notification message (operation S121). When the communication destination of the monitoring target of the transmission source of the state notification message is a device which is outside of the network, the determination unit 44 ends the process (no in operation S121). When the communication destination of the monitoring target of the transmission source of the state notification message is a device in the network, the determination unit 44 determines whether the communication destination in the ended communication is the monitoring target of the monitoring device 30 (yes in operation S121, operation S122). When the communication destination in the communication which will end is the monitoring target of the monitoring device 30, the determination unit 44 ends the process (no in operation S122).

Meanwhile, when the communication destination in the communication which will end is not the monitoring target of the monitoring device 30, the determination unit 44 deletes the information of the communication for which the end of the communication has been notified by the state notification message from the intra-network communication status table 53 (yes in operation S122, operation S123). The determination unit 44 performs the linked node determination process (operation S124). The details of the linked node determination process are as described using FIGS. 31 to 35. Note that, in the example of FIG. 37, the determination unit 44 sets the communication destination of the device which is being monitored by the monitoring device 30 of the transmission source of the state notification message as the origin node. When the device which is being monitored by the monitoring device 30 of the transmission source of the state notification message is included in the linked node table, the determination unit 44 ends the process (linked in operation S125).

When the device which is being monitored by the monitoring device 30 of the transmission source of the state notification message is not included in the linked node table, the determination unit 44 determines whether the monitoring target of the monitoring device 30 is included in the linked node table (operation S126). When the monitoring target of the monitoring device 30 is not included in the linked node table, the determination unit 44 deletes the entries which match the entries which are included in the link determination table A from the intra-network communication status table 53 ("not included" in operation S126, operation S127). The generation unit 46 performs the process for leaving the multicast group using the information of the transmission source which is associated with the devices of the entries which are deleted from the intra-network communication status table 53 (operation S128). The generation unit 46 deletes the information of the multicast group which is left from the join status table 54 (operation S129).

When the determination unit 44 determines that the monitoring target of the monitoring device 30 is included in the linked node table in the operation S126 (no in operation S126), the determination unit 44 changes the origin node to the device which the monitoring device 30 of the transmission source of the state notification message is monitoring. The determination unit 44 recreates the linked node table (operation S130). Subsequently, the processes of operation S127 onward are performed using the linked node table and the link determination table A which are created in the operation S130.

As described in the second embodiment, the generation unit 46 is capable of quickly stopping the reception of the multicast packets which are used in the notification of the information relating to the zones which are no longer accessed by the monitoring target due to the end of the communication by the generation unit 46 generating the leave request. Therefore, in the second embodiment, it is possible to suppress the wasteful transmission of multicast packets to the monitoring devices 30, the load of the monitoring devices 30 is reduced, and the increase in traffic in the network is also decreased. The monitoring device 30 is capable of leaving the multicast group of a zone which may not be accessible via the monitoring target using a leave request while still participating in a multicast group for acquiring the communication information of zones which the external communication devices 5 are capable of accessing via the communication devices 10. Therefore, the monitoring device 30 may acquire the information which is used in the detection of unauthorized access while suppressing the wasteful reception of packets.

In the description given above, description is given of a case in which communication using TCP is performed; however, when it is possible to detect the start and the end of the communication, modifications may be made so as to use another arbitrary protocol.

In the description given above, format of the tables and the messages is exemplary, and the information elements which are included in the tables and each message may be modified depending on the implementation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring device to operate as a first monitoring device in a network including a plurality of communication devices and a plurality of monitoring devices, the monitoring device comprising:
   an acquisition unit configured to acquire information of packets transmitted or received by a first communication device monitored by the first monitoring device;
   a transmission unit configured to transmit a first join request message to a first multicast group in which a second monitoring device performs notification of communication information of a second communication device monitored by the second monitoring device, wherein the first join request message is transmitted in response to (i) the first communication device communicating with the second communication device via intra-network communications and (ii) the first communication device subsequently communicating with an external device outside of the network after communicating with the second communication device; and
   a determination unit configured to determine whether the external device is performing unauthorized access to the second communication device via the first communication device, based on packets being transmitted from the second monitoring device to the first multicast group and collected from the notification of communication information corresponding to the first join request message sent by the first monitoring device.

2. The monitoring device according to claim 1, further comprising:
   a reception unit configured to receive a communication status message of the second communication device from the second monitoring device; and
   a join request unit configured to generate a second join request message used to request for joining in the first multicast group in which a third monitoring device to monitor a third communication device transmits the communication status message of the third communication device in a case where the third communication device which is a communication destination of a communication which is newly started by the second communication device is included in the network,
   wherein the transmission unit transmits the second join request message to the first multicast group, and
   wherein the determination unit determines whether the external device is performing unauthorized access via the second or the third communication device via the first and the second communication devices, based on the packets transmitted from the second or the third monitoring device to the first multicast group.

3. The monitoring device according to claim 1,
   wherein the determination unit determines that the unauthorized access has occurred when the notification of a start of communication with the external device is received or the notification of a start of communication with a device to store information to which access from the external device is not permitted is received, based on packets which are addressed to the first multicast group in which the first monitoring device is joining.

4. The monitoring device according to claim 1, further comprising:
   a notification unit configured to generate a state notification message used to notify a second multicast group which is a notification destination of communication information acquired by the first monitoring device of the communication information acquired by the acquisition unit,
   wherein the transmission unit transmits the state notification message to the second multicast group.

5. The monitoring device according to claim 1, further comprising:
   a generation unit configured to generate a leave request message used to request leaving from the first multicast group in which the first monitoring device is joining when the first communication device stops communicating with the external device,
   wherein the transmission unit transmits the leave request message.

6. The monitoring device according to claim 5,
   wherein, when communication between the first communication device and the second communication device ends after the first monitoring device joins the first multicast group and a third multicast group in which a fourth monitoring device performs notification of communication information, the generation unit identifies target devices which are devices with which the first communication device is not capable of communicating without passing through the second communication device in the network, and
   wherein, when the target device is not a forth communication device communicating with the first communication device among fourth communication devices monitored by the fourth monitoring device, the generation unit generates a leave request message used to leave the first multicast group without leaving the third multicast group.

7. A monitoring device to operate as a first monitoring device in a network including a plurality of communication devices and a plurality of monitoring devices, the monitoring device comprising:
   a memory to store tables including an intra-network communication status table; and a processor to execute a process, the process comprising:
   acquiring information of packets transmitted or received by a first communication device monitored by the first monitoring device;
   transmitting a first join request message to a first multicast group in which a second monitoring device performs notification of communication information of a second communication device monitored by the second monitoring device, wherein the first join request message is transmitted in response to (i) the first communication device communicating with the second communication device via intra-network communications and (ii) the first communication device subsequently communicating with an external device outside of the network after communicating with the second communication device; and determining whether the external device is performing unauthorized access to the second communication device via the first communication device, based on packets transmitted from the second monitoring device to the first multicast group with referring to data of the tables.

8. A monitoring method executed by a monitoring device to operate as a first monitoring device in a network including a plurality of communication devices and a plurality of monitoring devices, the monitoring method comprising:

acquiring information of packets transmitted or received by a first communication device monitored by the first monitoring device;

transmitting a first join request message to a first multicast group in which a second monitoring device performs notification of communication information of a second communication device monitored by the second monitoring device, wherein the first join request message is transmitted in response to (i) the first communication device communicating with the second communication device via intra-network communications and (ii) the first communication device subsequently communicating with an external device outside of the network after communicating with the second communication device; and determining whether the external device is performing unauthorized access to the second communication device via the first communication device, based on packets transmitted from the second monitoring device to the first multicast group.

* * * * *